(12) United States Patent
Sakai

(10) Patent No.: US 9,317,899 B2
(45) Date of Patent: Apr. 19, 2016

(54) INFORMATION PROCESSING APPARATUS AND INFORMATION PROCESSING METHOD, AND COMPUTER PROGRAM

(71) Applicant: Sony Corporation, Tokyo (JP)

(72) Inventor: Yusuke Sakai, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/369,834

(22) PCT Filed: Dec. 26, 2012

(86) PCT No.: PCT/JP2012/083751
§ 371 (c)(1),
(2) Date: Jun. 30, 2014

(87) PCT Pub. No.: WO2013/015443
PCT Pub. Date: Jul. 18, 2013

(65) Prior Publication Data
US 2014/0354695 A1    Dec. 4, 2014

(30) Foreign Application Priority Data

Jan. 13, 2012   (JP) .................. 2012-005438

(51) Int. Cl.
*G06T 3/60*   (2006.01)
*G09G 5/00*   (2006.01)
(Continued)

(52) U.S. Cl.
CPC . *G06T 3/60* (2013.01); *G06F 3/011* (2013.01); *G06F 3/0482* (2013.01); *G06F 3/0485* (2013.01); *G06F 3/0486* (2013.01); *G06F 3/0487* (2013.01); *G06F 3/04845* (2013.01); *G06F 3/04883* (2013.01); *G09G 5/00* (2013.01); *G09G 5/14* (2013.01); *H04N 21/4312* (2013.01);

(Continued)

(58) Field of Classification Search
None
See application file for complete search history.

(56) References Cited

U.S. PATENT DOCUMENTS

| 2002/0138734 A1* | 9/2002 | David | G06T 1/0071 |
| | | | 713/176 |
| 2005/0132015 A1* | 6/2005 | Swinton | G06Q 10/107 |
| | | | 709/207 |

(Continued)

FOREIGN PATENT DOCUMENTS

| JP | 7-092938 A | 4/1995 |
| JP | 2004-094410 A | 3/2004 |

(Continued)

OTHER PUBLICATIONS

International Search Report from International Publication mailed Mar. 12, 2013.

(Continued)

*Primary Examiner* — Phi Hoang
(74) *Attorney, Agent, or Firm* — Lerner, David, Littenberg, Krumholz & Mentlik, LLP

(57) ABSTRACT

There is provided an information processing apparatus including a display part to display video content on a screen, a rotation angle detection part to detect a rotation angle of the screen, a display formation determination part to determine a display formation of video content at any rotation angle of the screen or during transition of the rotation, and an image processing part to perform an image processing in accordance with the display formation determined by the display formation determination part such that the video content is conformed to the screen which is tilted by the rotation angle detected by the rotation angle detection part.

6 Claims, 62 Drawing Sheets

(51) Int. Cl.
*G09G 5/14* (2006.01)
*H04N 21/431* (2011.01)
*G06F 3/01* (2006.01)
*G06F 3/0482* (2013.01)
*G06F 3/0485* (2013.01)
*G06F 3/0486* (2013.01)
*G06F 3/0488* (2013.01)
*G06F 3/0484* (2013.01)
*G06F 3/0487* (2013.01)
*H04N 21/442* (2011.01)

(52) U.S. Cl.
CPC . *G06F 2200/1614* (2013.01); *G06F 2200/1637* (2013.01); *G06F 2203/04803* (2013.01); *G06T 2200/24* (2013.01); *G06T 2210/32* (2013.01); *G09G 2340/0407* (2013.01); *G09G 2340/0464* (2013.01); *G09G 2340/0492* (2013.01); *G09G 2340/14* (2013.01); *G09G 2354/00* (2013.01); *H04N 21/44218* (2013.01)

(56) References Cited

U.S. PATENT DOCUMENTS

| 2006/0197843 | A1 | 9/2006 | Yoshimatsu |
| 2006/0204055 | A1 | 9/2006 | Steinberg et al. |
| 2006/0265643 | A1* | 11/2006 | Saft et al. ............ 715/517 |
| 2010/0066763 | A1 | 3/2010 | MacDougall et al. |
| 2012/0176508 | A1* | 7/2012 | Jeong ............ 348/231.2 |

FOREIGN PATENT DOCUMENTS

| JP | 2010128140 A | 6/2010 |
| JP | 2010-170573 A | 8/2010 |

OTHER PUBLICATIONS http://www.autodeskresearch.com/publications/medusa (Dec. 15, 2011).

Extended European Search Report for EP Application No. 12865035.5, dated Aug. 14, 2015.

* cited by examiner

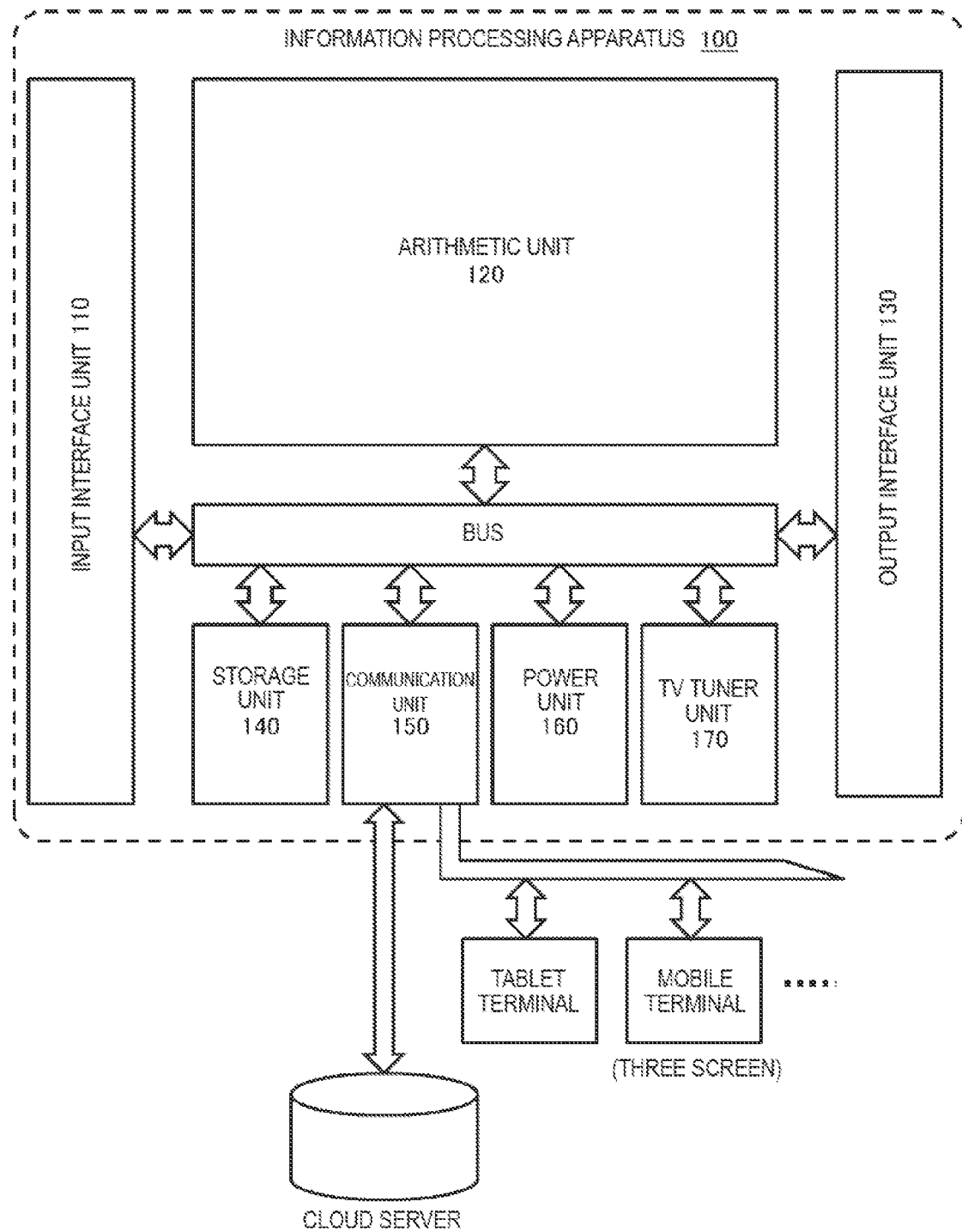

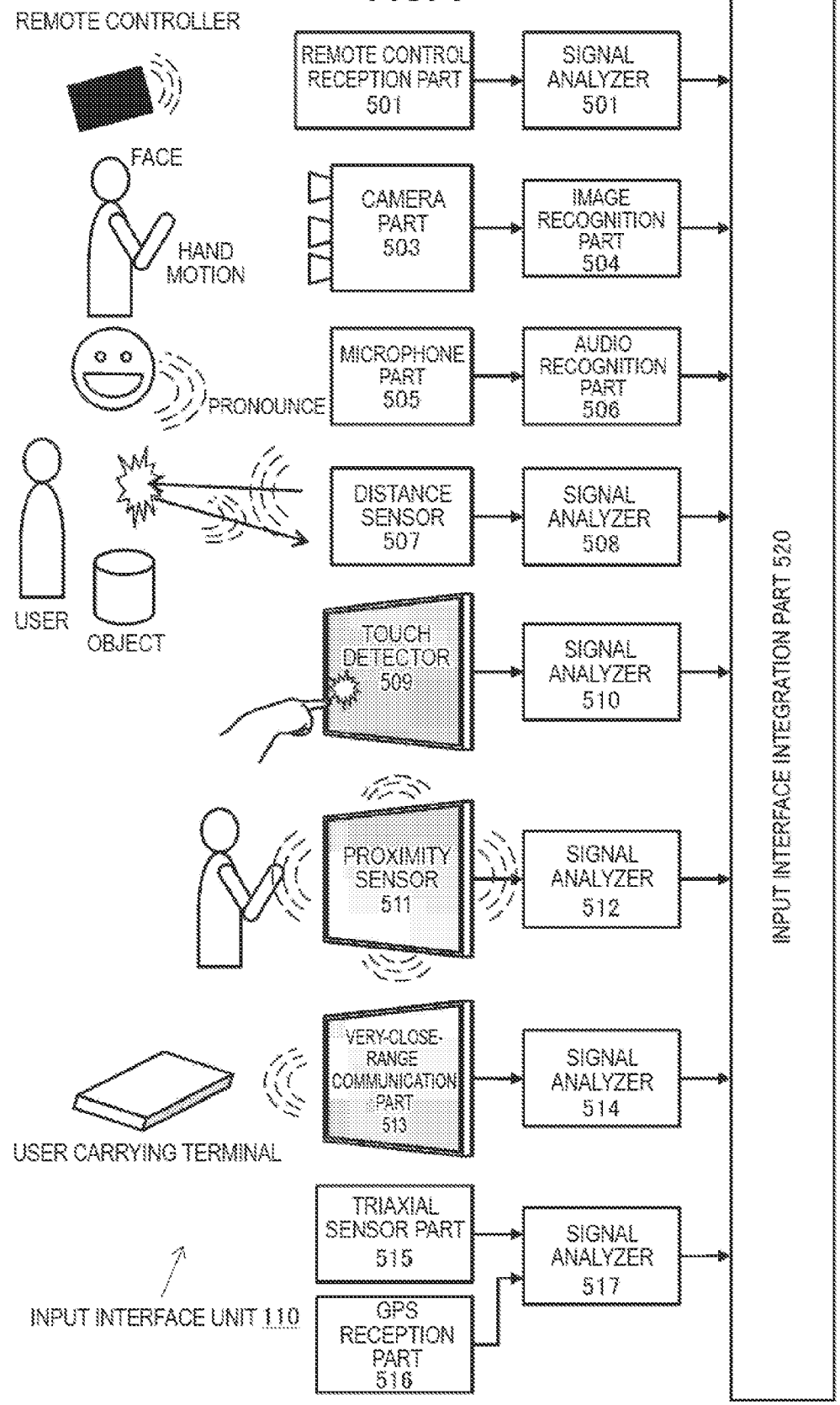

FIG. 9A
INFORMATION PROCESSING APPARATUS 100
(DISPLAY SCREEN / TOUCH SCREEN)
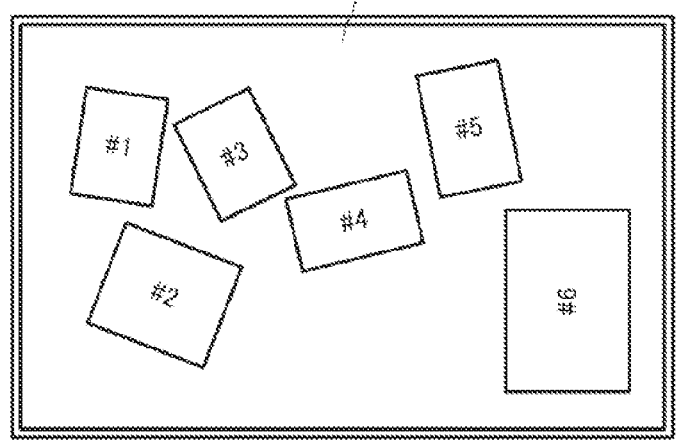
FIG. 9B
INFORMATION PROCESSING APPARATUS 100
(DISPLAY SCREEN / TOUCH SCREEN)
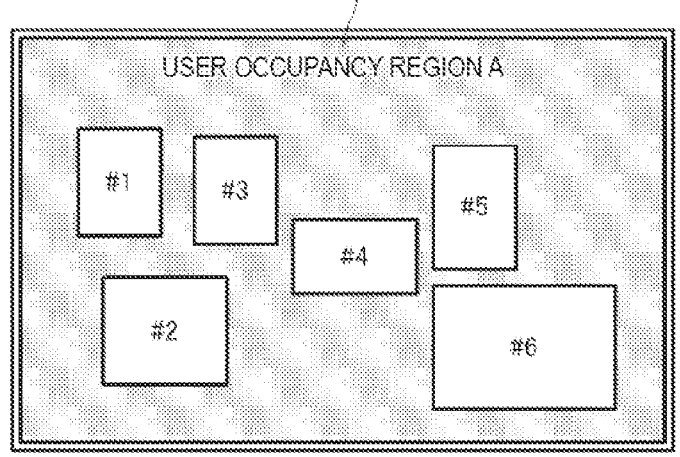
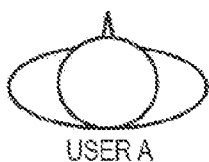
USER A

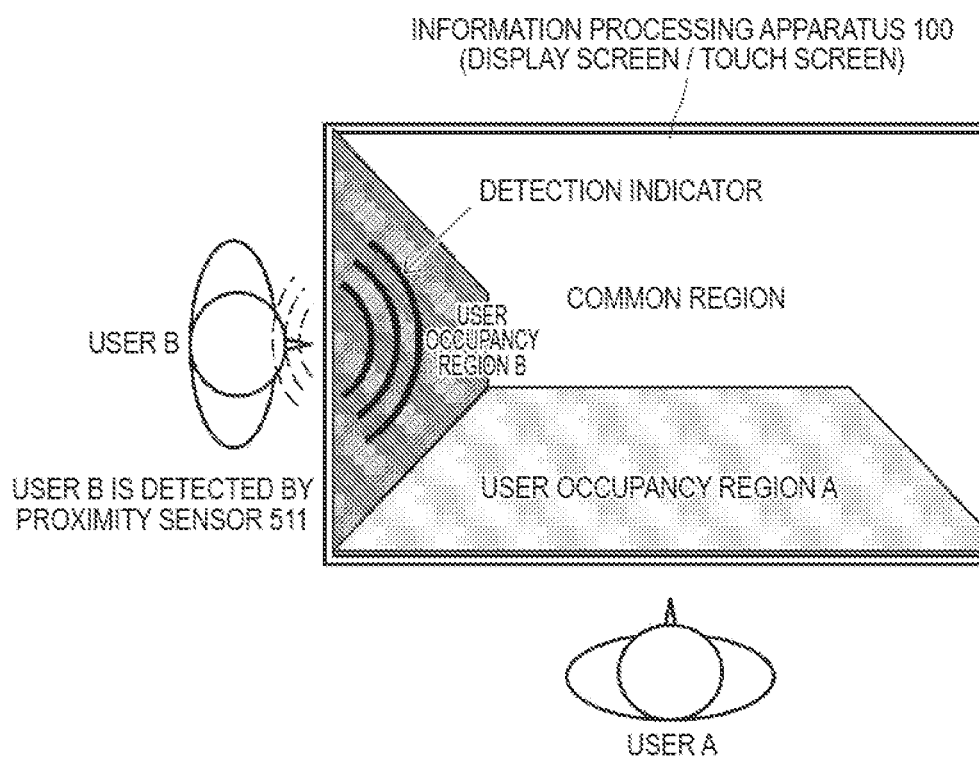

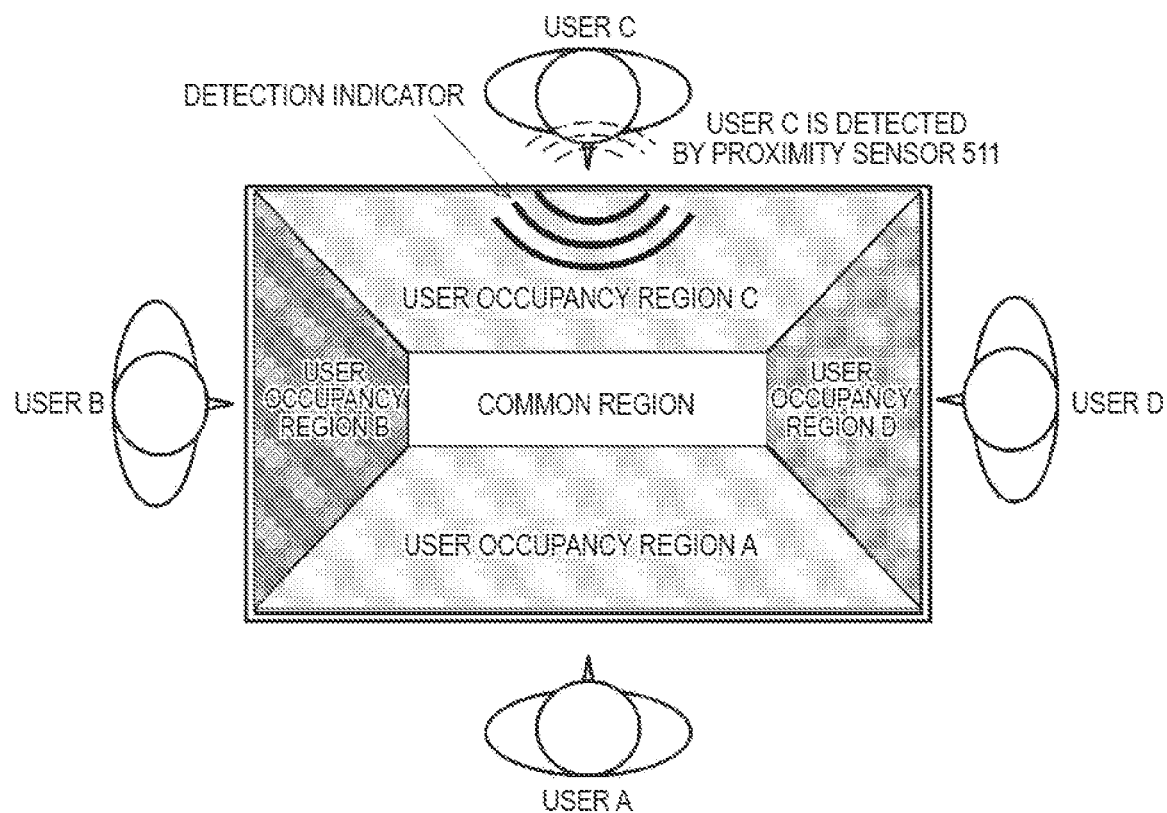

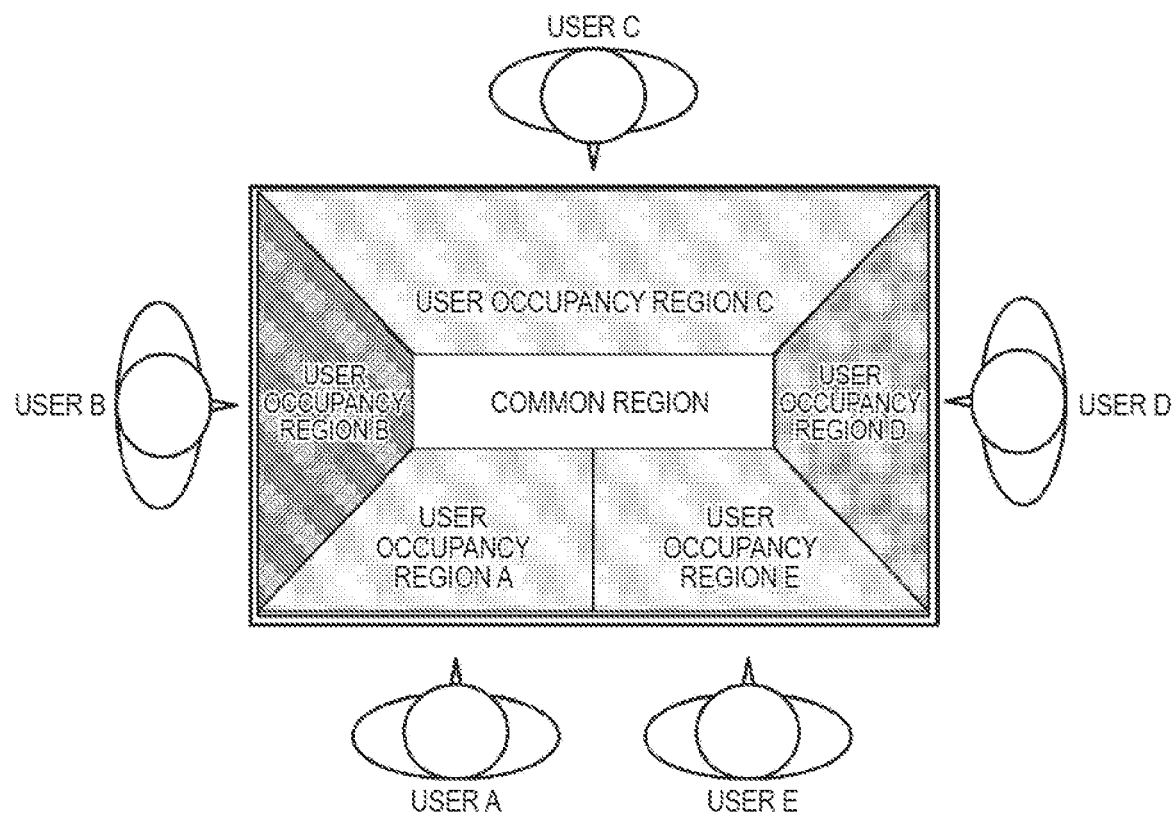

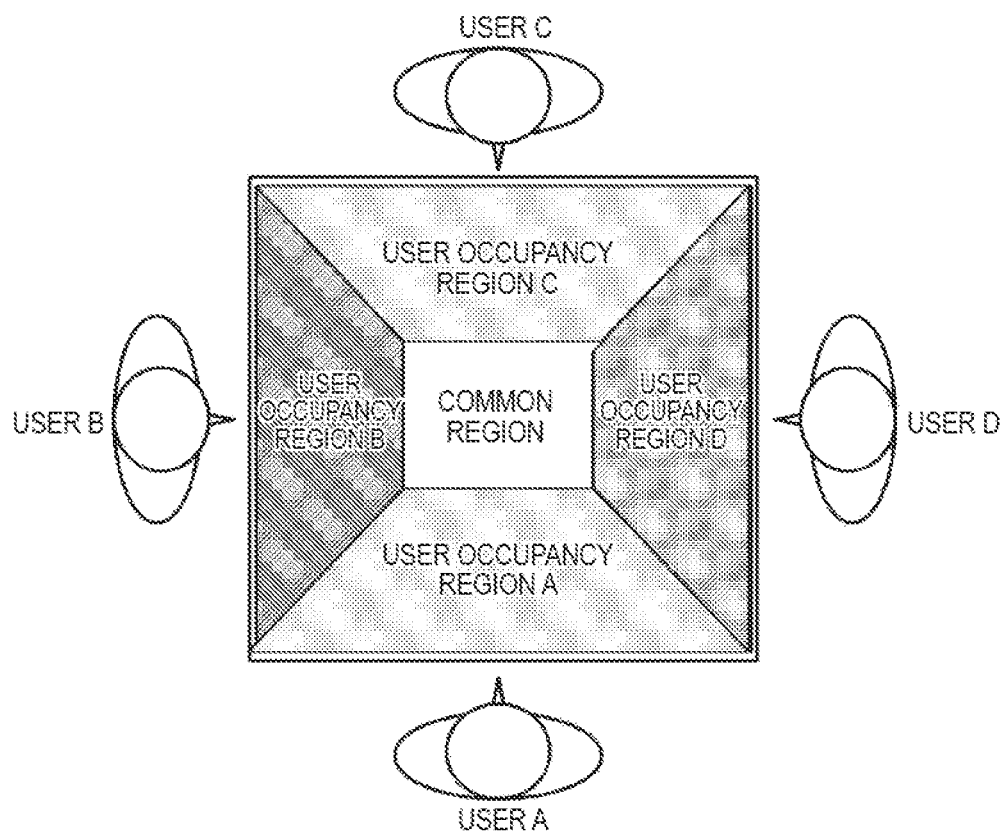

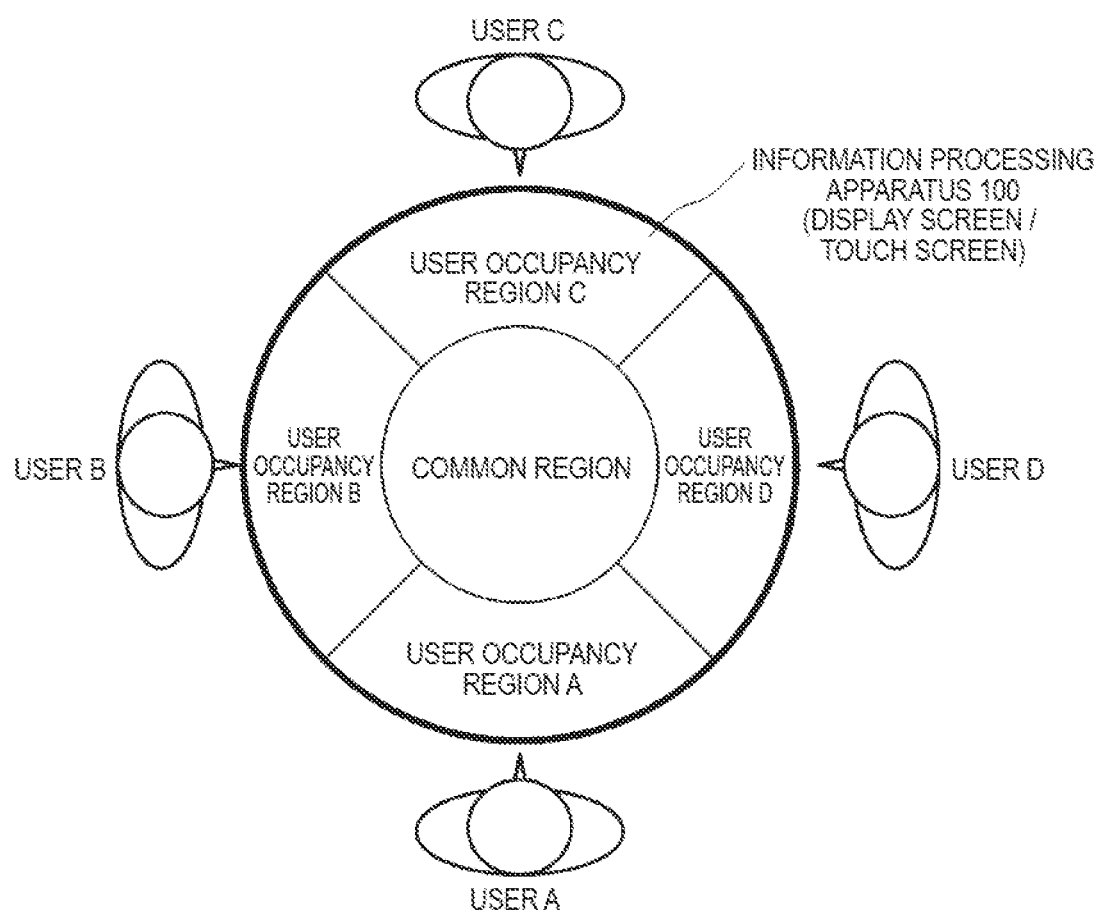

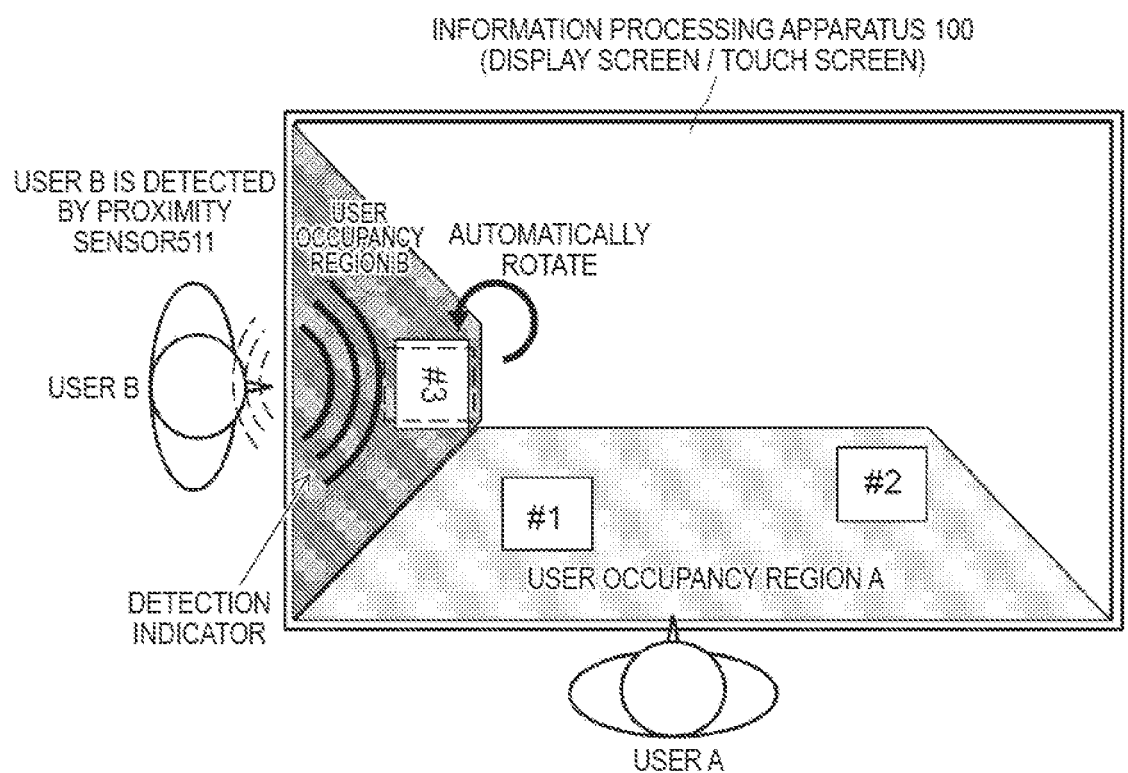

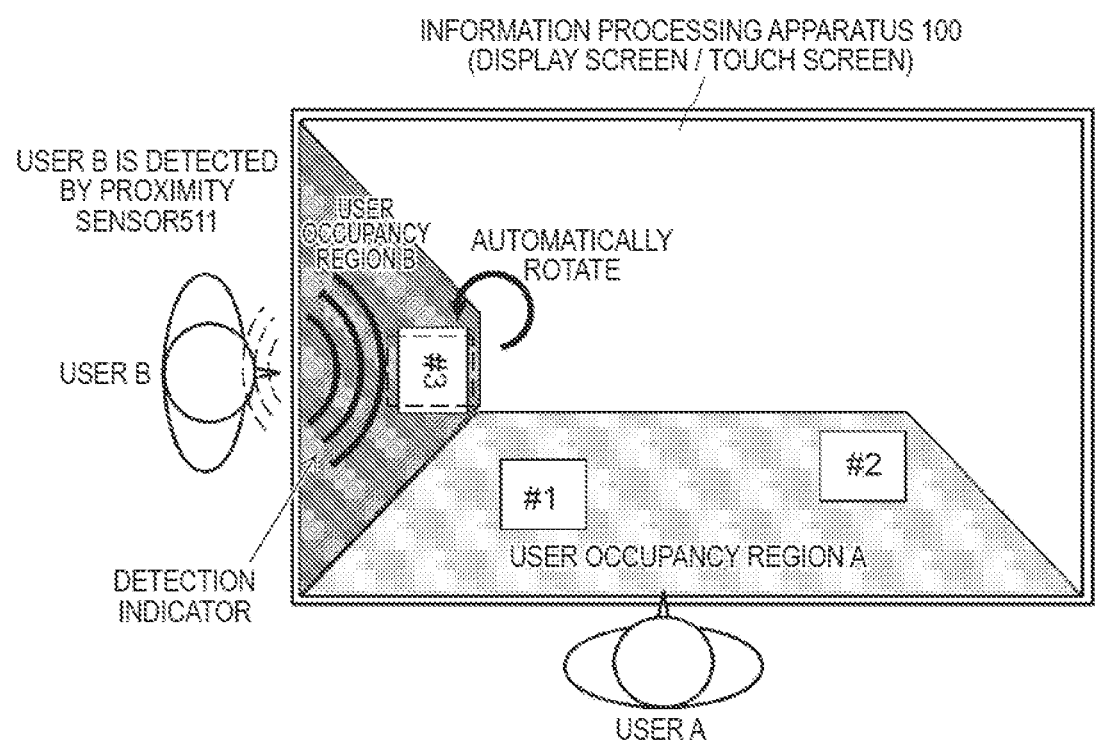

FIG. 24A

| USER STATE | | USER POSITION | 0cm　　50cm　　1m　　3m　　5m　　10m | |
|---|---|---|---|---|
| ABSENCE | | | STAND BY (STOP SCREEN DISPLAY) | |
| PRESENCE | NOT VIEWING | | AUTO-ZAPPING (OPTIMIZATION BASED ON PERSONAL AUTHENTICATION) | AUTO-ZAPPING (NO OPTIMIZATION) |
| | DURING VIEWING | NO OPERATION | COLUMN SETTING AUTO-ZAPPING (OPTIMIZATION BASED ON PERSONAL AUTHENTICATION) | COLUMN SETTING AUTO-ZAPPING (NO OPTIMIZATION) |
| | | DURING OPERATION | COLUMN SETTING DISPLAY OF OPERATED OBJECT (SCROLL, SELECTION OF OBJECT DEPENDING ON USER OPERATION) | |

FIG. 24B

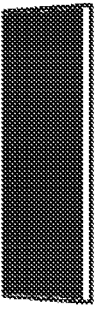

STAND-BY STATE (SCREEN OFF)

FIG. 24C
USER APPEARS
(NOT VIEWING)
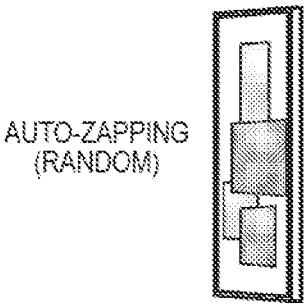
AUTO-ZAPPING
(RANDOM)
FIG. 24D
USER IS VIEWING
(NO OPERATION)
AUTO-ZAPPING
(COLUMN SETTING)
FIG. 24E
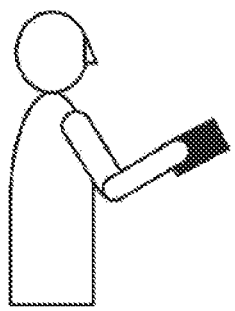
USER IS VIEWING
(REMOTE CONTROL OPERATION)
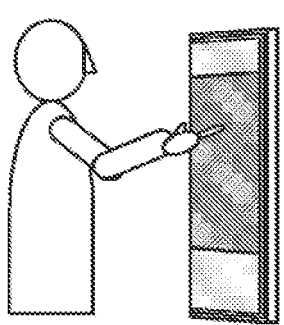
USER IS VIEWING
(TOUCH OPERATION)

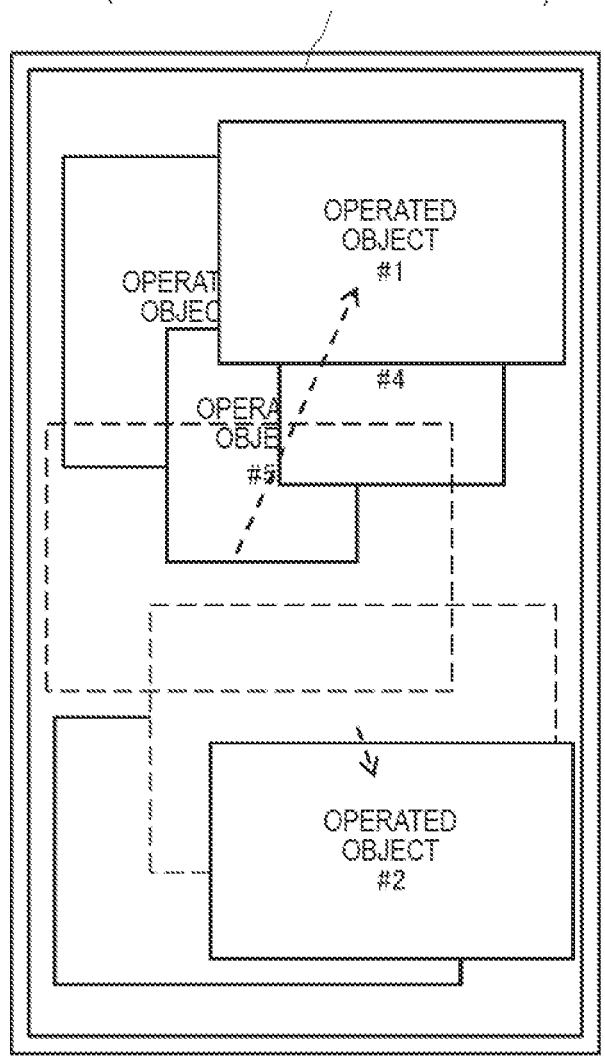

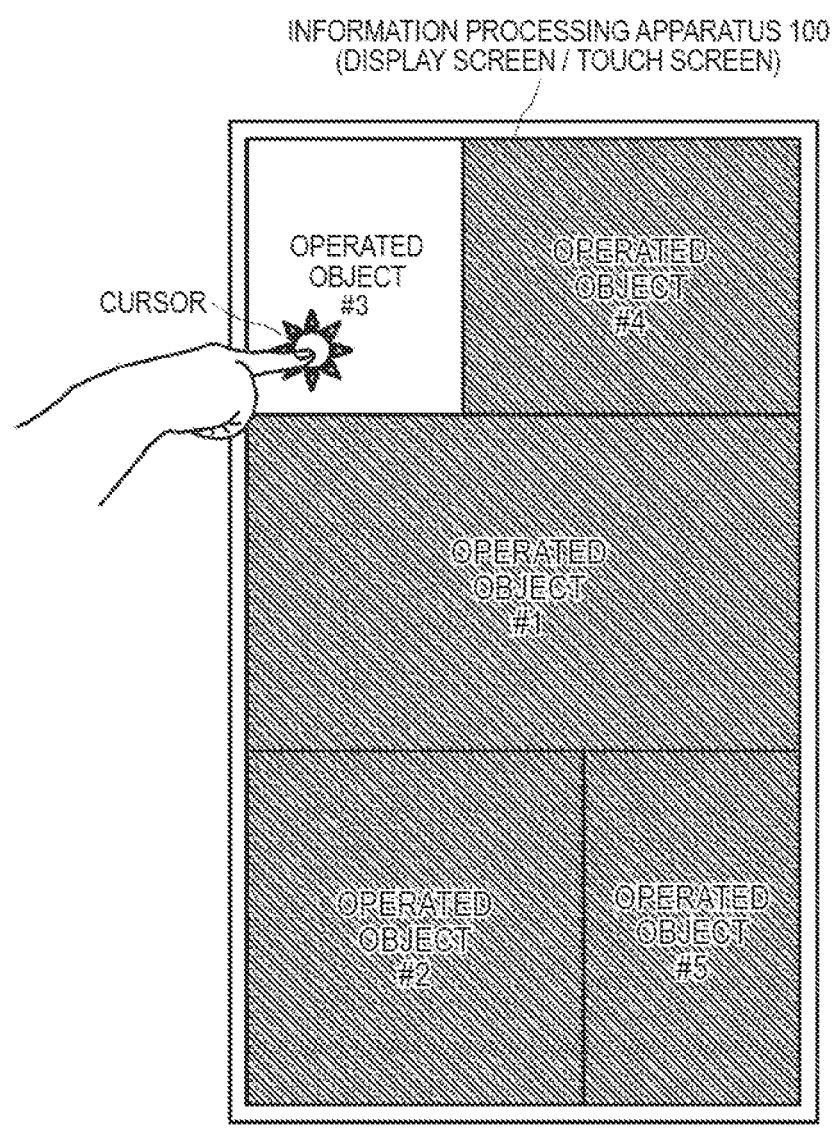

FIG. 31
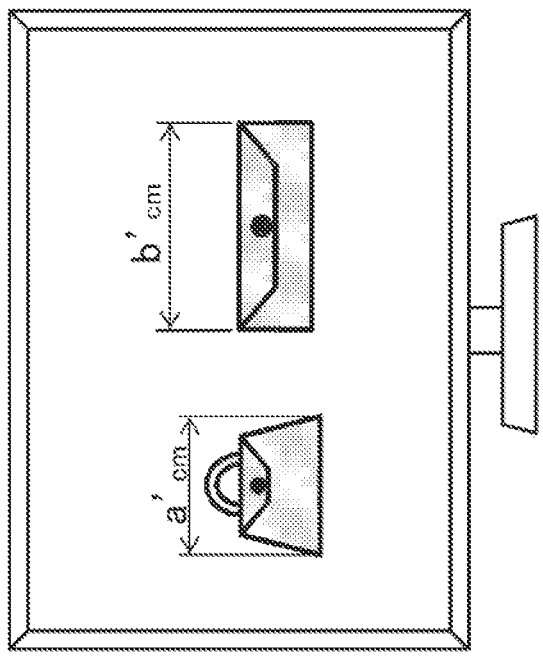
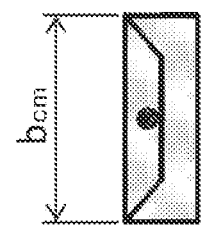
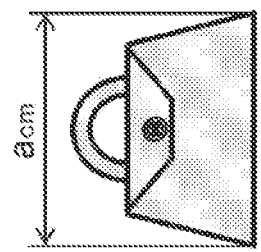

FIG. 33
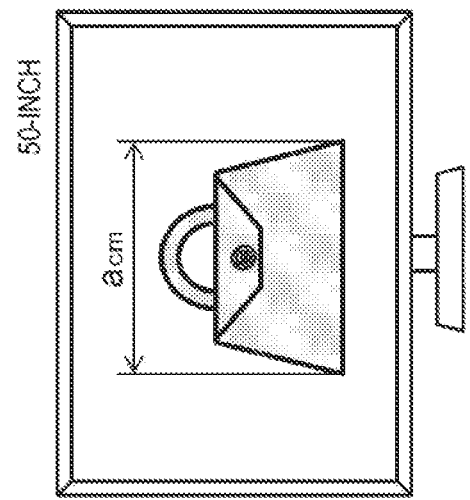
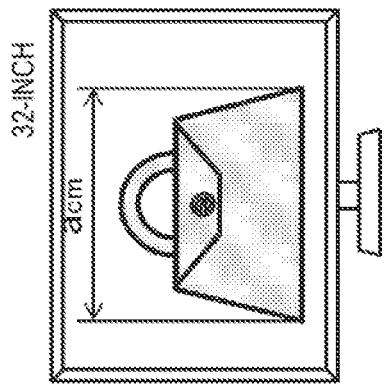
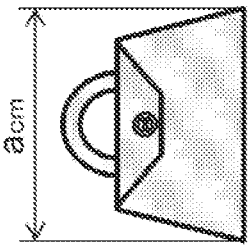

FIG. 34
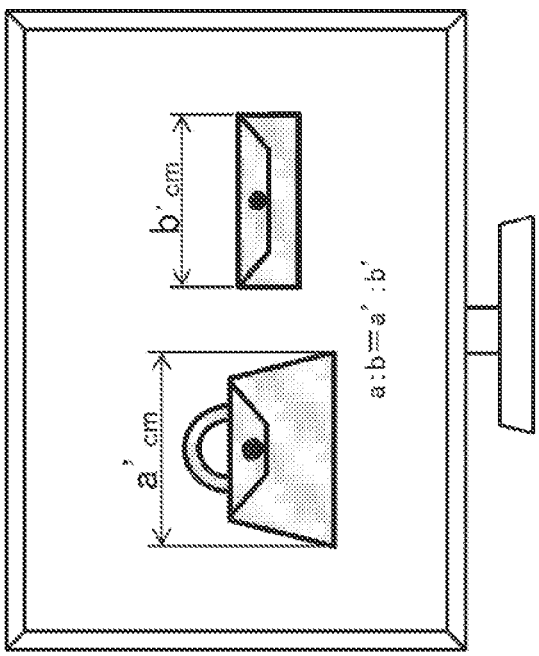
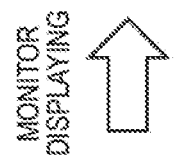
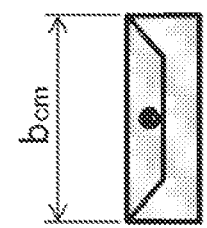
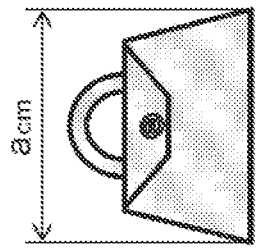

FIG. 35
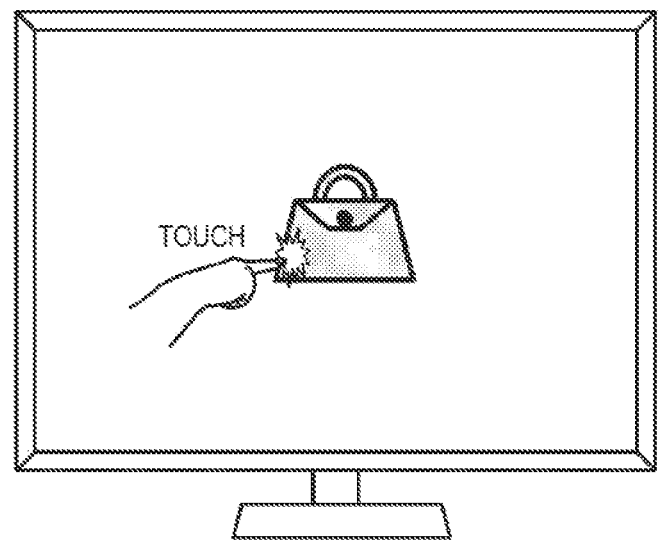
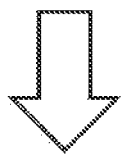
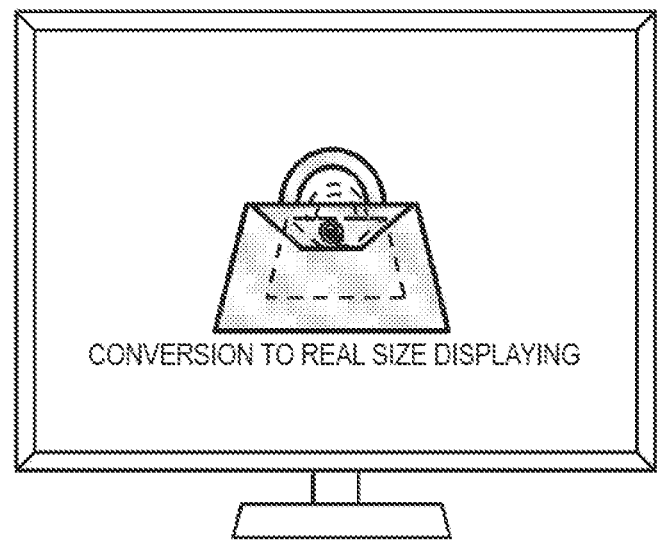

FIG. 36
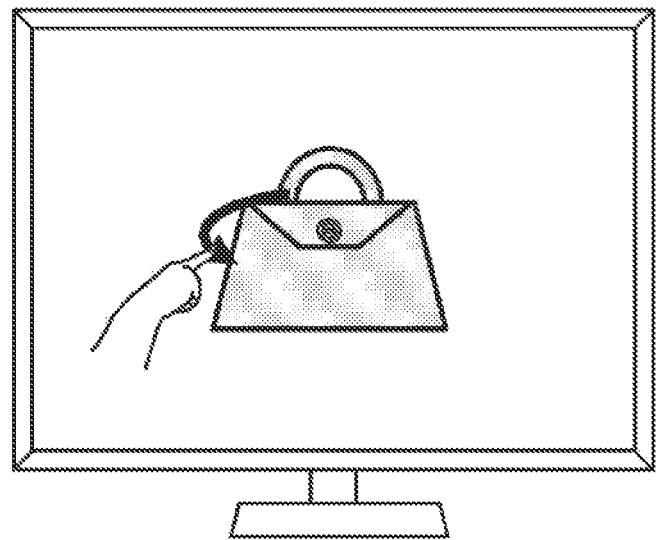
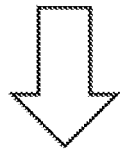
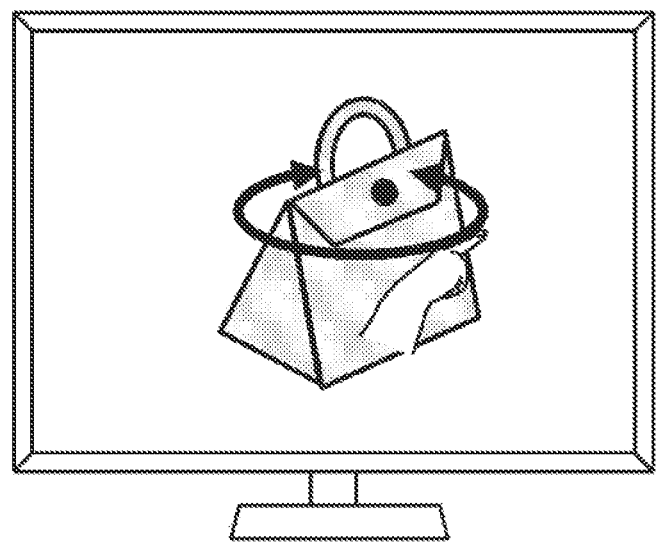

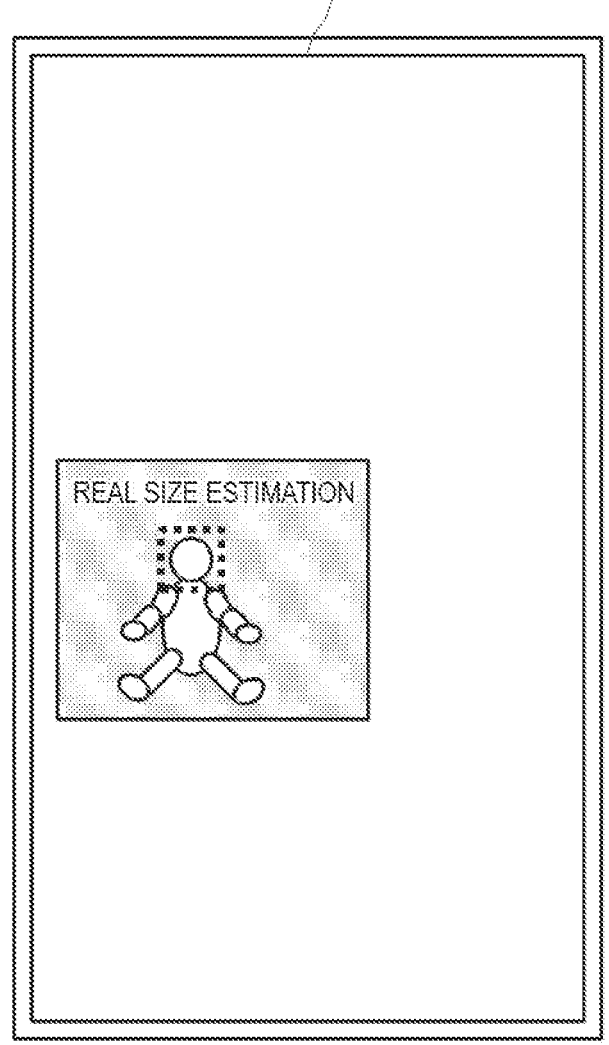

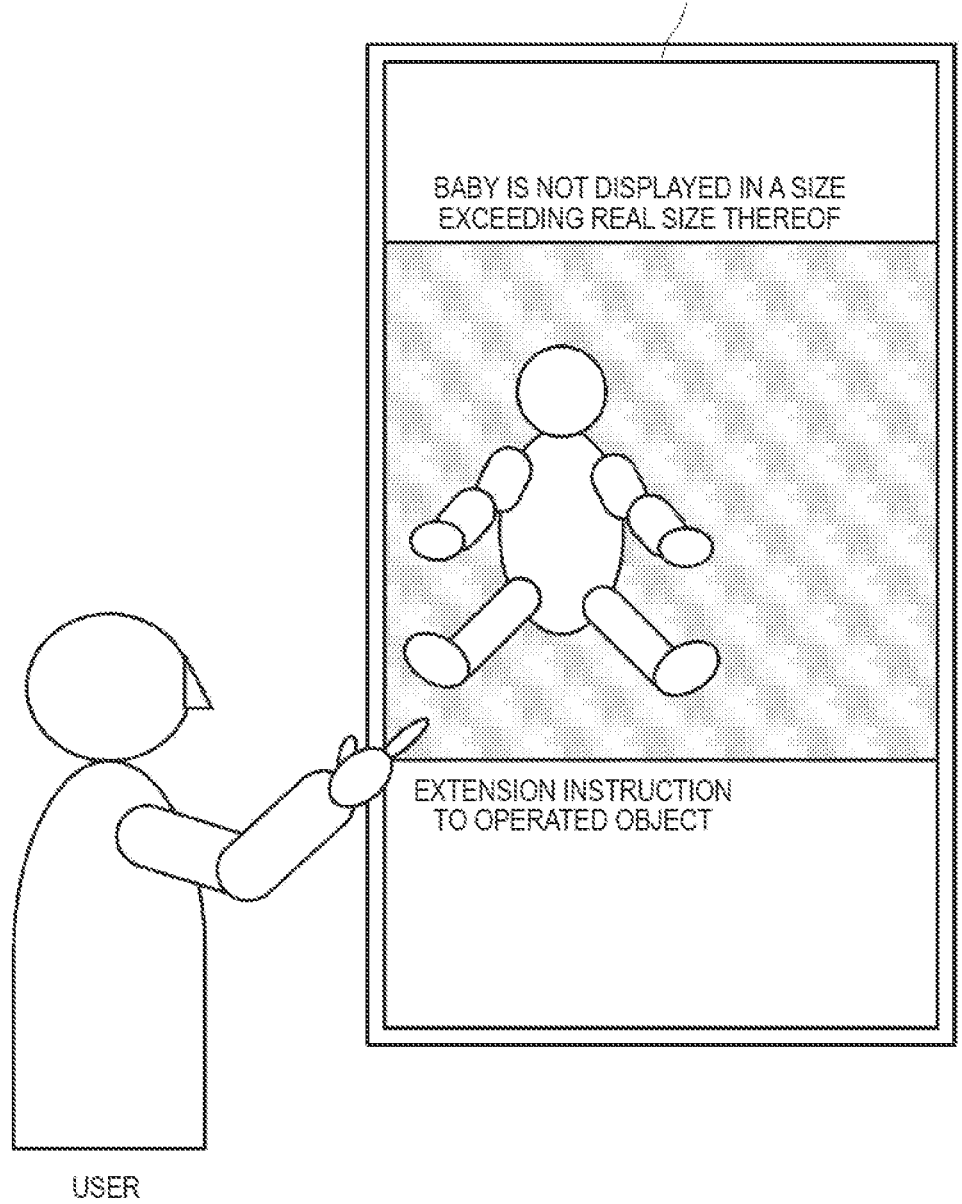

INFORMATION PROCESSING APPARATUS AND INFORMATION PROCESSING METHOD, AND COMPUTER PROGRAM

CROSS-REFERENCE TO RELATED APPLICATION

The present application is a national phase entry under 35 U.S.C. §371 of International Application No. PCT/JP2012/083751 filed Dec. 26, 2012, published on Jul. 18, 2013 as WO 2013/105443 A1, which claims priority from Japanese Patent Application No. JP 2012-005438, filed in the Japanese Patent Office on Jan. 13, 2012.

TECHNICAL FIELD

A technology disclosed in this description relates to an information processing apparatus having a display screen functioning as an input part such as a touch screen type and an information processing method, and a computer program, and in particular, an information processing apparatus which has a large screen to be shared by a plurality of users and is subjected to a collaborative work between users through touch screen operations and an information processing method, and a computer program.

BACKGROUND ART

In recent years, a tablet terminal has been rapidly spread which has a display screen functioning as an input part such as a touch screen type. The tablet terminal has a widget or desktop as an interface for which operation procedure is easy to visually understand so that a user can readily use the terminal rather than a personal computer which receives an input operation via a keyboard or mouse.

For example, a touch sensitive device has been proposed in which data is read from a multipoint touch sensitive device such as a multipoint touch screen, the data belonging to a touch input associated with the multipoint touch sensitive device, and a multipoint gesture is identified on the basis of the data from the multipoint touch sensitive device (e.g., see Patent Literature 1).

Typically, a plurality of operated objects to be operated by the user are arranged on a display of the tablet terminal in various orientations. The operated object includes reproduction content such as a moving picture or still image, an e-mail or messaged received from another user, and the like. The user has to individually operate the tablet terminal body to be rotated in order to display a desired operated object so as to frontally face him/her. For example, the tablet terminal of A4 or A5 size is easy to operate to be rotated. However, in case of those having a larger screen of several inches, the tablet terminal is troublesome to operate to be rotated every time a single user operates the operated object.

Moreover, a use situation may be conceivable in which the large screen tablet terminal is used by a plurality of users individually operating different operated objects at the same time.

For example, a tablet terminal has been proposed in which if a location where the user exists is detected on the terminal side edge by a proximity sensor, an area between a light arm and left arm is identified to be matched to a touch point region of the user (e.g., see Non-Patent Literature 1). The tablet terminal may set an operating right of each user for each operated object when a plurality of users are detected, and inhibit a user in advance from additionally participating such that the operated object operated by one user cannot be operated by another user who tries to rotate the object to frontally face him/her, for example.

However, a case is also conceivable in which users exchange the operated objects with each other to perform a collaborative work as a use situation where a large screen tablet terminal is shared by a plurality of users, other than the case where each user operates individually the operated object as described above. The collaborative work is difficult to achieve in the case where each user has the touch point region set to be occupied by himself/herself to operate in his/her region the operated object for which the operating right is given.

Further, if a GUI displayed on the screen of the terminal is constant regardless of a distance from the user to the screen or a user's state, disadvantageously the user in the distance may not well see information presented on the screen because of too much detail, or the screen may have little information presented thereon even the user is in the neighborhood. Similarly, if input means for the user to operate the terminal is constant regardless of a distance from the user to the screen or a user's state, inconveniently the user may not be able to operate the terminal because he/she does not have a remote controller even if being in the neighborhood, or the user necessarily has to reach the terminal in order to operate the touch screen.

Moreover, an object display system in related art displays an image of a real object on the screen without consideration of real size information thereof. For this reason, a size of the object displayed is disadvantageously varied depending a size or resolution (dpi) of the display.

Additionally, in a case where a display system displays contents of a plurality of sources are displayed on the screen in parallel or to be superimposed, a magnitude relation between the images simultaneously displayed is not correctly displayed so that sizes or positions of corresponding regions of the images are varied from each other, which also makes the images hard to see for the user.

Since the screen becomes hard to see by the user if a screen orientation is changed of a terminal equipped with a rotation mechanism, the display screen has to be rotated.

CITATION LIST

Patent Literature

Patent Literature 1: JP 2010-170573A

Non-Patent Literature

Non-Patent Literature 1: http://www.autodeskresearch.com/publications/medusa (as of Dec. 15, 2011)

SUMMARY OF INVENTION

Technical Problem

A technology disclosed in the description is intended to provide an excellent information processing apparatus which has a large screen to be shared by a plurality of users and is able to be preferably subjected to a collaborative work between users through touch screen operations and an information processing method, and a computer program.

The technology disclosed in the description is intended to provide an excellent information processing apparatus which always has high convenience for a user operating regardless of a position or state of the user and an information processing method, and a computer program.

The technology disclosed in the description is intended to provide an excellent information processing apparatus which can always display an image of an object in an appropriate size independently of a size of a real object, or a size or resolution of the screen and an information processing method, and a computer program.

The technology disclosed in the description is intended to an excellent information processing apparatus which preferably can simultaneously display contents of a plurality of sources on a screen in parallel or to be superimposed and an information processing method, and a computer program.

The technology disclosed in the description is intended to provide an excellent information processing apparatus which can optimally adjust a display formation of video contents at any rotation angle or during transition of the rotation and an information processing method, and a computer program.

Solution to Problem

The present application has been made in the light of the above mentioned issues. According to the first embodiment of the present technology, there is provided an information processing apparatus including a display part to display video content on a screen, a rotation angle detection part to detect a rotation angle of the screen, a display formation determination part to determine a display formation of video content at any rotation angle of the screen or during transition of the rotation, and an image processing part to perform an image processing in accordance with the display formation determined by the display formation determination part such that the video content is conformed to the screen which is tilted by the rotation angle detected by the rotation angle detection part.

According to the second embodiment of the present technology, the display formation determination part of the information processing apparatus above determines from a plurality of display formations including three formations of a display formation in which the video content is not out of the screen at all at any rotation angle, a display formation in which a content of interest in the video content becomes maximum at each rotation angle, and a display formation in which the video content is rotated so as not to bring about an invalid region.

According to the third embodiment of the present technology, the display formation determination part of the information processing apparatus above determines the display formation at any rotation angle of the screen and during transition of the rotation on the basis of attribute information the video content has.

According to the fourth embodiment of the present technology, the display formation determination part of the information processing apparatus above determines, with respect to the protected video content, a display formation in which the video content is not out of the screen at all at any rotation angle.

According to the fifth embodiment of the present technology, there is provided an information processing method including a rotation angle detection step of detecting a rotation angle of a screen on which video content is displayed, a display formation determination step of determining a display formation of video content at any rotation angle of the screen or during transition of the rotation, and an image processing step of performing an image processing in accordance with the display formation determined by the display formation determination step such that the video content is conformed to the screen which is tilted by the rotation angle detected by the rotation angle detection step.

According to the sixth embodiment of the present technology, there is provided a computer program written in a computer-readable format for causing a computer to function as a display part to display video content on a screen, a rotation angle detection part to detect a rotation angle of the screen, a display formation determination part to determine a display formation of video content at any rotation angle of the screen or during transition of the rotation, and an image processing part to perform an image processing in accordance with the display formation determined by the display formation determination part such that the video content is conformed to the screen which is tilted by the rotation angle detected by the rotation angle detection part.

A computer program according to claim 6 of the present application is defined as a computer program written in a computer-readable format so as to implement a predetermined process on a computer. In other words, installing the computer program according to claim 6 of the present application allows a cooperative operation to be exerted on the computer and an operation effect similar to an information processing apparatus according to claim 1 can be obtained.

Advantageous Effects of Invention

According to a technology disclosed in the description, it is possible to provide an excellent information processing apparatus which has a large screen to be shared by a plurality of users and is able to be subjected to a collaborative work between users through touch screen operations and an information processing method, and a computer program.

According to the technology disclosed in the description, it is possible to provide an excellent information processing apparatus which optimizes a display GUI or input means depending on a position or state of a user and has high user convenience and an information processing method, and a computer program.

According to the technology disclosed in the description, it is possible to provide an excellent information processing apparatus which can always display an image of an object in an appropriate size independently of a size of a real object, or a size or resolution of the screen and an information processing method, and a computer program.

According to the technology disclosed in the description, it is possible to provide an excellent information processing apparatus which can present an image easy to see for a user with uniformed sizes or positions of corresponding regions of the images by performing a normalization process on an image when simultaneously displaying contents of a plurality of sources on a screen in parallel or to be superimposed and an information processing method, and a computer program.

According to the technology disclosed in the description, it is possible to provide an excellent information processing apparatus which can optimally adjust a display formation of video contents at any rotation angle or during transition of the rotation and an information processing method, and a computer program.

Further other intentions, features and advantages of the technology disclosed in the description may be apparent from more detailed description on the basis of embodiments described later and accompanied drawings.

BRIEF DESCRIPTION OF DRAWINGS

FIG. 4 is a schematic illustration of a functional configuration of the information processing apparatus 100.

FIG. 5 is a diagram showing an internal configuration of an input interface unit 110.

FIG. 9A is a diagram showing a situation where operated objects #1 to #6 are randomly oriented before a user occupancy region A is set.

FIG. 9B is a diagram showing a situation where the operated objects #1 to #6 are changed in the orientations to frontally face a user A in response to setting of the user occupancy region A for the user A.

FIG. 10 is a diagram showing a situation where a user occupancy region B for a user B and a common region are additionally set in the screen in response to detecting presence of the user B besides the user A.

FIG. 12 is a diagram showing a situation where a user occupancy region C for a user C and the common region are additionally set in the screen in response to detecting presence of the user C besides the users A, B and D.

FIG. 13A is an illustration of a region division pattern for dividing a screen into user occupancy regions for respective users depending on a shape or size of the screen and the number of users.

FIG. 13B is an illustration of a region division pattern for dividing a screen into user occupancy regions for respective users depending on a shape or size of the screen and the number of users.

FIG. 13D is an illustration of a region division pattern for dividing a screen into user occupancy regions for respective users depending on a shape or size of the screen and the number of users.

FIG. 16A is a diagram showing a situation where an operated object in a user occupancy region which newly appears is automatically rotated so as to frontally face a user.

FIG. 16B is a diagram showing a situation where an operated object in a user occupancy region which newly appears is automatically rotated so as to frontally face a user.

FIG. 24A is a diagram in a form of table summarizing an optimization process on GUI display by a display GUI optimization part 2310 depending on a user position and user state.

FIG. 24B is a diagram showing screen transition of the information processing apparatus 100 depending on a user position and user state.

FIG. 24C is a diagram showing screen transition of the information processing apparatus 100 depending on a user position and user state.

FIG. 24D is a diagram showing screen transition of the information processing apparatus 100 depending on a user position and user state.

FIG. 24E is a diagram showing screen transition of the information processing apparatus 100 depending on a user position and user state.

FIG. 25B is a diagram showing an exemplary display screen in which display positions or sizes of a plurality of operated objects to be auto-zapped are momentarily changed.

FIG. 27A is a diagram showing an exemplary display screen in which the user is operating the TV.

FIG. 31 is a diagram for explaining problems in the object display system of related art.

FIG. 33 is an illustration of an example of displaying an image of the same object at a real size on the screens different in monitor specification from each other.

FIG. 34 is an illustration of an example of displaying images of two objects different in a real size on the same screen with keeping a magnitude relation therebetween correct.

FIG. 35 is an illustration of an example of displaying an object image at a real size.

FIG. 36 is an illustration of an example of rotating or changing an attitude of the object image displayed at a real size.

FIG. 37A is a diagram showing a situation where real size information on a subject is estimated.

FIG. 37B is a diagram showing a situation where the real size display process is performed on the operated object on the basis of the estimated real size information on the subject.

FIG. 40A is a diagram showing a situation where a commercial product sample image is not superimposed on a user's own video at an adequate location with a correct magnitude relation to.

DESCRIPTION OF EMBODIMENTS

Hereinafter, an explanation is given of embodiments of the technology disclosed in the description with reference to the drawings.

A. System Configuration

Figure 1:
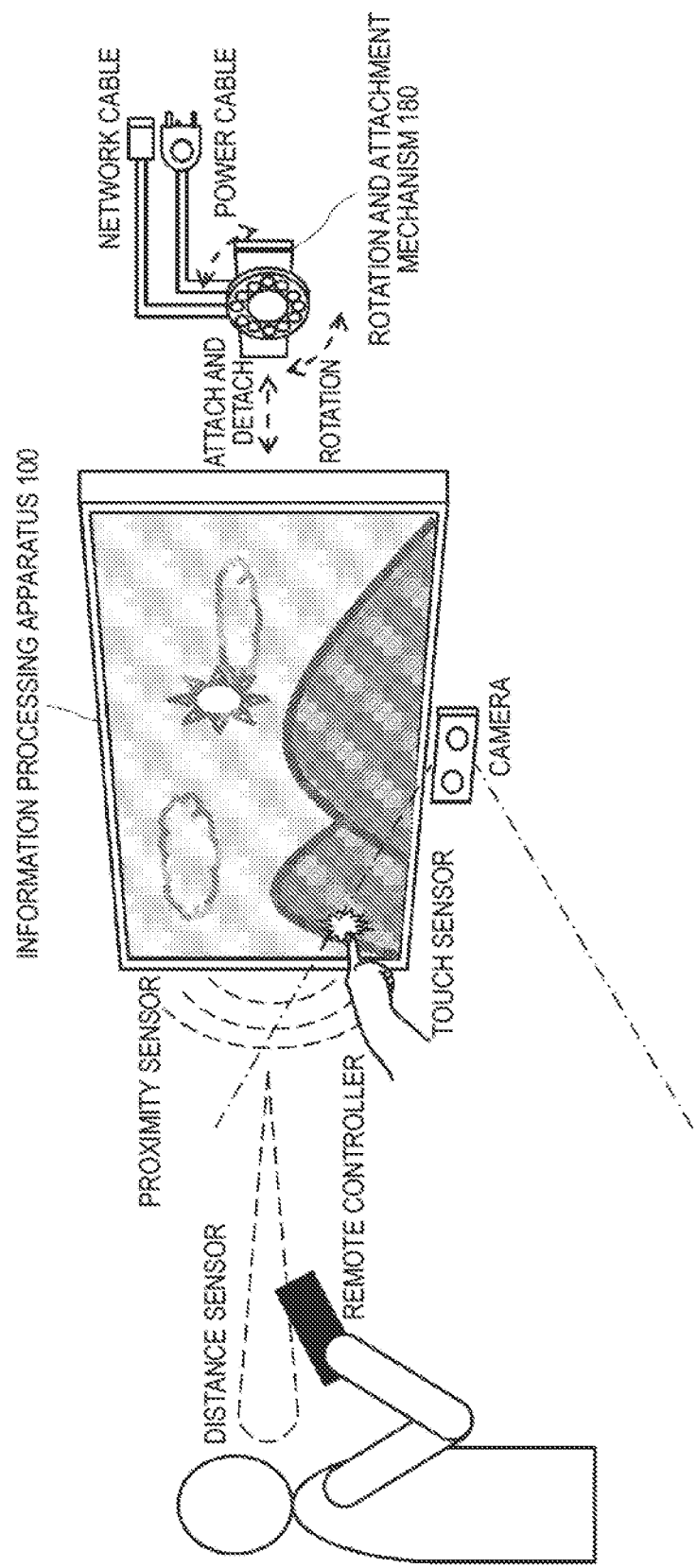
FIG. 1 is a diagram showing an example of a usage pattern (Wall) of an information processing apparatus 100 having a large screen.
Figure 2:
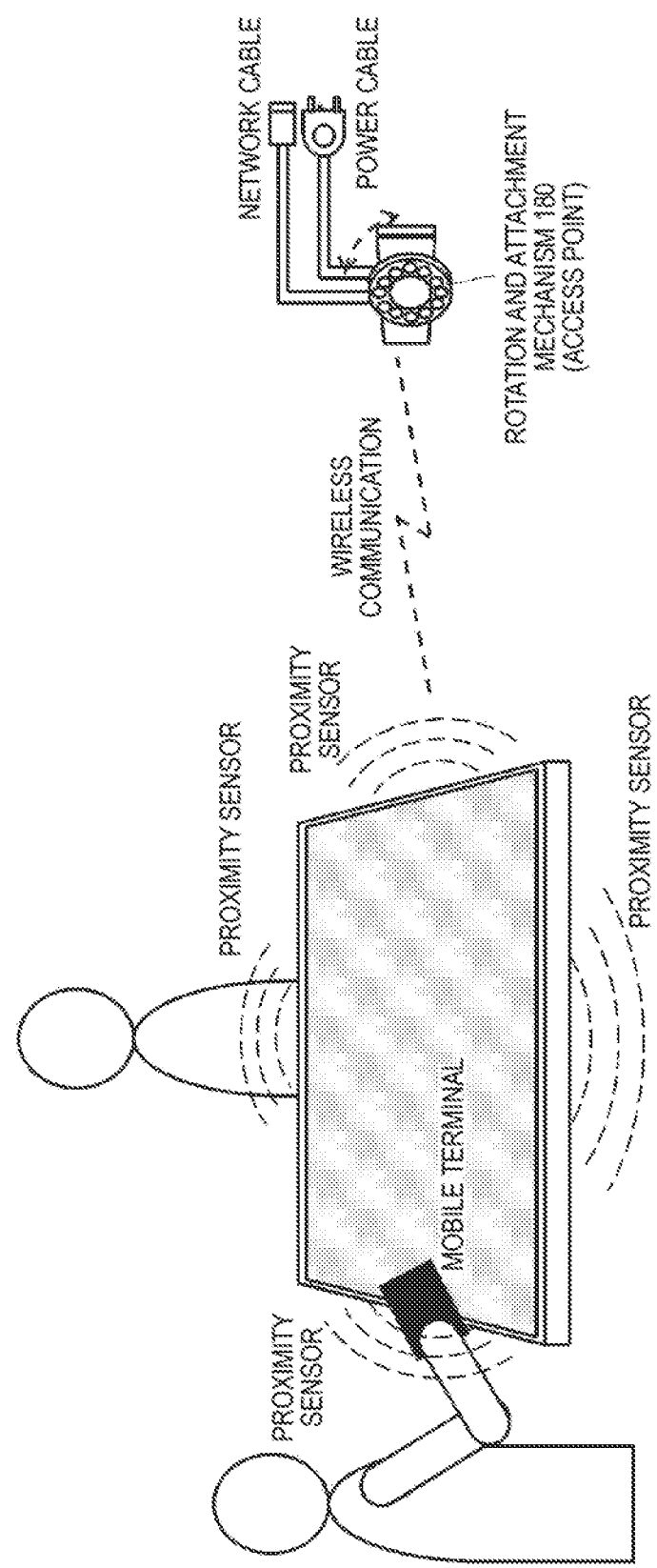
FIG. 2 is a diagram showing another example of a usage pattern (Tabletop) of the information processing apparatus 100 having a large screen.

An information processing apparatus 100 according to the embodiment has a large screen, and estimated as a main usage pattern thereof are a "Wall" type hung on a wall as shown in FIG. 1 and a "Tabletop" type put on a desk as shown in FIG. 2.

In a "Wall" state shown in FIG. 1, the information processing apparatus 100 is attached in a state of being rotatable and detachable on the wall by a rotation and attachment mechanism 180, for example. The rotation and attachment mechanism 180 functions as an electrical contact with the information processing apparatus 100, and the information processing apparatus 100 is connected via the rotation and attachment mechanism 180 with a power cable or network cable (either is not shown in the figure). The information processing apparatus 100 can receive drive power from commercial AC power supply and access various servers over the Internet.

The information processing apparatus 100 includes a distance sensor, proximity sensor and touch sensor, and can grasp a user position (distance, orientation) frontally facing the screen as described later. When the user is detected or in a state where the user is detected, a moire detection indicator (described later) or illumination expression presenting a detected state is carried out on the screen to give the user a visual feedback.

The information processing apparatus 100 is configured to automatically select optimum interaction depending on the user position. For example, the information processing apparatus 100 automatically selects or adjusts GUI (Graphical User Interface) display such as a frame or information density of the operated object depending on the user position. The information processing apparatus 100 can automatically perform selection from among a plurality of input means with respect to the screen including touch, proximity, gesture using hand or the like, remote controller, indirect operation owing to a user state depending on the user position or distance to the user.

The information processing apparatus 100 also includes one or more cameras and recognizes not only the user position but also a person, object and device from an image taken by the camera. The information processing apparatus 100 also includes a very-close-range communication part which allows data transmission and reception in a direct and natural manner with a user carrying device proximate to a very close range.

The operated object as a target to be operated by the user is defined on the large screen in the Wall state. The operated object has a specified display region for a moving picture, still image and text content as well as any Internet site and function module such as an application or widget. The operated object includes content received from a TV broadcast program, reproduced content from a storage medium, streaming moving picture acquired via the network, and moving picture or still image content loaded from another device such as a mobile terminal carried by the user.

As shown in FIG. 1, if the information processing apparatus 100 hung on the wall is set to a rotational position such that the large screen is in landscape orientation, a video having a world view depicted by the movie as it is may be displayed as the operated object of an entire screen size.

Figure 3A:
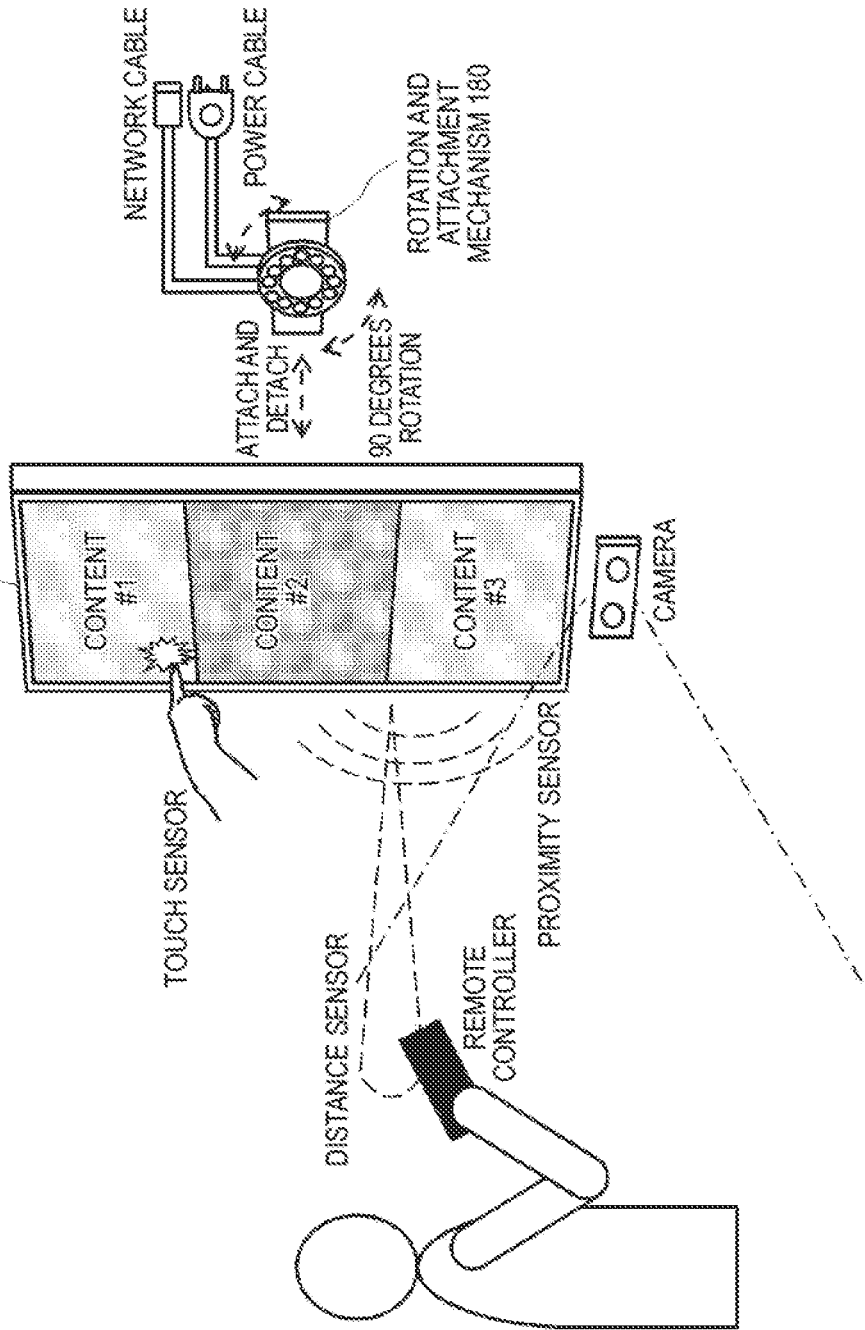
FIG. 3A is a diagram showing another example of a usage pattern of the information processing apparatus 100 having a large screen.
Figure 3B:
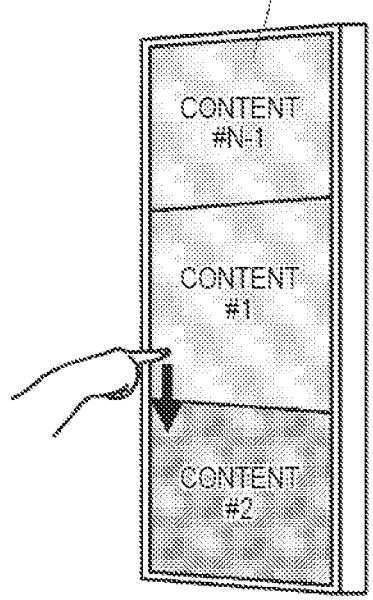
FIG. 3B is a diagram showing another example of a usage pattern of the information processing apparatus 100 having a large screen.
Figure 3C:
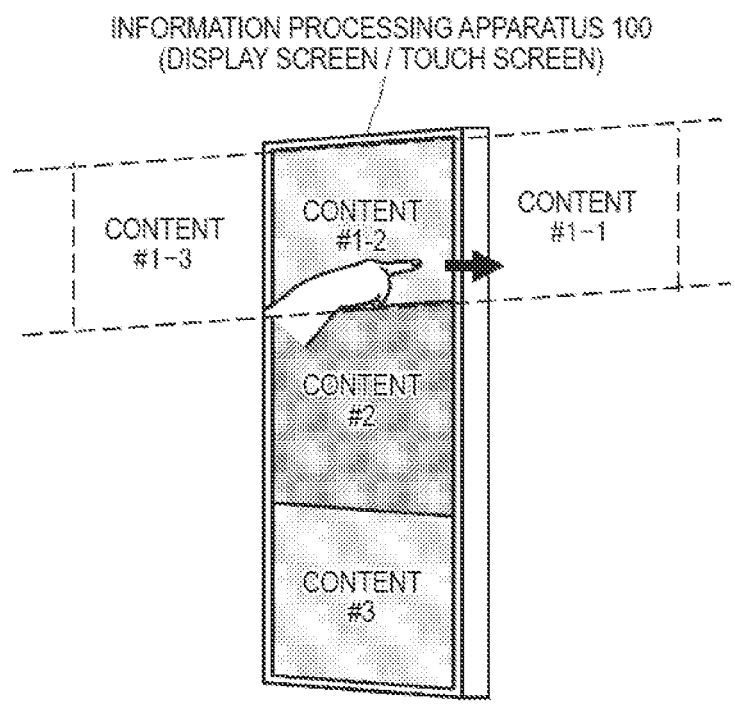
FIG. 3C is a diagram showing another example of a usage pattern of the information processing apparatus 100 having a large screen.

Here, if the information processing apparatus 100 hung on the wall is set to a rotational position such that the large screen is in portrait orientation, three screens having an aspect ratio of 16:9 may be vertically arranged as shown in FIG. 3A. For example, three kinds of contents #1 to #3, broadcast content simultaneously received from different broadcast stations, reproduced content from a storage medium, and streaming moving picture over the network, may be simultaneously displayed to be vertically arranged. Further, if the user operates the screen vertically with a fingertip, for example, as shown in FIG. 3B the content is vertically scrolled. If the user operates any of three screen stages horizontally with a fingertip, the screen at that stage is horizontally scrolled as shown in FIG. 3C.

On the other hand, the information processing apparatus 100 is put directly on a desk in the "Tabletop" state shown in FIG. 2. The rotation and attachment mechanism 180 function as the electrical contact in the usage pattern shown in FIG. 1 (described above), whereas an electrical contact with the information processing apparatus 100 is not found in a state of being put on the desk as shown in FIG. 2. Therefore, in the Tabletop state shown in the figure, the information processing apparatus 100 may be configured to operable by a built-in battery with no power supply. If the information processing apparatus 100 is configured to include a wireless communication part corresponding to a mobile station function of wireless LAN (Local Area Network) and the rotation and attachment mechanism 180 is configured to include a wireless communication part corresponding to an access point function of the wireless LAN, the information processing apparatus 100 can access various servers over the Internet also in the Tabletop state via wireless communication with the rotation and attachment mechanism 180 as the access point.

A plurality of operated objects as operated targets are defined on the large screen of Tabletop. The operated object has a specified display region for a moving picture, still image and text content as well as any Internet site and function module such as an application or widget.

The information processing apparatus 100 includes a proximity sensor for detecting presence or state of the user at each of four side edge portions of the large screen. The user proximate to the large screen may be shot with a camera to be subjected to a person recognize similar to the above explanation. The very-close-range communication part detects whether or not the user whose presence is detected carries a mobile terminal or the like, and detects a data transmission and reception request from another terminal carried by the user. When the user or user carrying terminal is detected or in a state where the user is detected, a moire detection indicator or illumination expression (described later) presenting a detected state is carried out on the screen to give the user a visual feedback.

The information processing apparatus 100, when detecting presence of the user by way of the proximity sensor or the like, uses that detection result for UI control. Not only the user presence or absence but also positions of a body, feet and hands, and head, if detected, may be used for more detailed UI control. The information processing apparatus 100 also includes a very-close-range communication part which allows data transmission and reception in a direct and natural manner with a user carrying device proximate to a very close range (same as above).

Here, as an example of the UI control, the information processing apparatus 100 sets a user occupancy region for each user and a common region shared between the users in the large screen depending on locations of the detected users. Then, input by each user via the touch sensor is detected in the user occupancy region and the common region. The screen shape and region division pattern are not limited to a rectangle and may be adapted to shapes including a square, circle, a solid such a cone.

If the screen of the information processing apparatus 100 is enlarged, a space is gotten enough for a plurality of users simultaneously to carry out touch input in the Tabletop state. As described above, the user occupancy region for each user and the common region are set in the screen, achieving more comfort and efficient simultaneous operations for a plurality of users.

The operating right for the operated object arranged in the user occupancy region given to the corresponding user. If the user moves the operated object from the common region or another user occupancy region to his/her own user occupancy region, the operating right for the relevant operated object is also moved to him/her. When the operated object enters the user occupancy region of the user, the operated object display is automatically changed in the orientation to so as to frontally face him/her.

In the case where the operated object is moved between the user occupancy regions, the operated object is moved in a physically natural movement depending on a touch position undergoing a move operation. Pulling one operated object by the users each other allows a division or copy operation on the operated object.

FIG. 4 schematically shows a functional configuration of the information processing apparatus 100. The information processing apparatus 100 includes an input interface unit 110 that inputs externally an information signal, an arithmetic unit 120 that performs arithmetic process for controlling the display screen or the like on the basis of the input information signal, an output interface unit 130 that externally outputs information on the basis of a arithmetic result, a large amount storage unit 140 constituted by a hard disk drive (HDD) or the like, a communication unit 150 that is connected with an external network, a power unit 160 that handles drive power, and a TV tuner unit 170. The storage unit 140 is stored with various processing algorithms performed by the arithmetic unit 120 and various databases used for the arithmetic process in the arithmetic unit 120.

Main functions of the input interface unit 110 are detection of presence of the user, detection of the touch operation by the detected user on the screen or touch screen, detection of the device such as the user carrying mobile terminal, and reception process of transmitted data from the device. FIG. 5 shows an internal configuration of the input interface unit 110.

A remote control reception part 501 receives a remote control signal from the remote control or mobile terminal. A signal analyzer 502 performs demodulation and decode process on the received remote control signal to obtained a remote control command.

A camera part 503 employs a single-lens type, or one or both of two-lens or active type. The camera part 503 includes an imaging device such as a CMOS (Complementary Metal Oxide Semiconductor) or CCD (Charge Coupled Device). The camera part 503 includes a camera controller for pan, tilt and zoom. The camera part 503 notifies the arithmetic unit 120 of camera information such as pan, tilt and zoom and can controls pan, tilt and zoom of the camera part 503 in accordance with camera control information from the arithmetic unit 120.

An image recognition part 504 performs recognition process on an image taken by the camera part 503. Specifically, a background difference is used to detect user's face or hand motion to recognize a gesture, recognize a user's face included in the taken image, recognize a human body, and recognize a distance to the user.

A microphone part 505 inputs audio input such as sound or speech by the user. An audio recognition part 506 handles audio recognition of an input audio signal.

A distance sensor 507 includes a PSD (Position Sensitive Detector), for example, and detects a signal returned from the user or other objects. A signal analyzer 508 analyzes the detected signal to measure a distance to the user or the object. Other than the PDS sensor, a pyroelectric sensor or simplified camera may be used for the distance sensor 507. The distance sensor 507 always monitors whether or not the user is present within a radius of five to ten meters from the information processing apparatus 100, for example. For this reason, the distance sensor 507 preferably uses a sensor element little in power consumption.

A touch detector 509 includes a touch sensor superimposed on the screen and the like and outputs a detection signal from a location on the screen the user contacts with a fingertip. A signal analyzer 510 analyzes the detection signal to obtain positional information.

A proximity sensor 511 provided to each of four side edge portions of the large screen, and detects by electrostatic capacitance the user's body is proximate to the screen, for example. A signal analyzer 512 analyzes the detected signal.

A very-close-range communication part 513 receives a non-contact communication signal from the user carrying device and the like by way of NFC (Near Field Communication), for example. A signal analyzer 514 performs demodulation and decode process on the received signal to obtain reception data.

A triaxial sensor part 515 is constituted by a gyroscope and the like and detects attitudes of the information processing apparatus 100 along x, y and z axes. A GPS (Global Positioning System) reception part 516 receives a signal from a GPS satellite. A signal analyzer 517 analyzes the signals from the triaxial sensor part 515 and the GPS reception part 516 to obtain the positional information or attitude information on the information processing apparatus 100.

An input interface integration part 520 integrates the above information signal inputs to give the arithmetic unit 120. The input interface integration part 520 integrates analysis results of the respective signal analyzers 508, 510, 512, and 514 to obtain and give to arithmetic unit 120 the positional information on the users around the information processing apparatus 100.

Main functions of the arithmetic unit 120 are the arithmetic process such as a UI screen generation process on the basis of a user detection result, screen touch detection result and reception data from the user carrying device by the input interface unit 110, and outputting the arithmetic result to the output interface unit 130. The arithmetic unit 120, for example, may load and execute an application program installed in the storage unit 140 to achieve arithmetic process for each application. A functional configuration of the arithmetic unit 120 corresponding to each application is described later.

Figure 6:
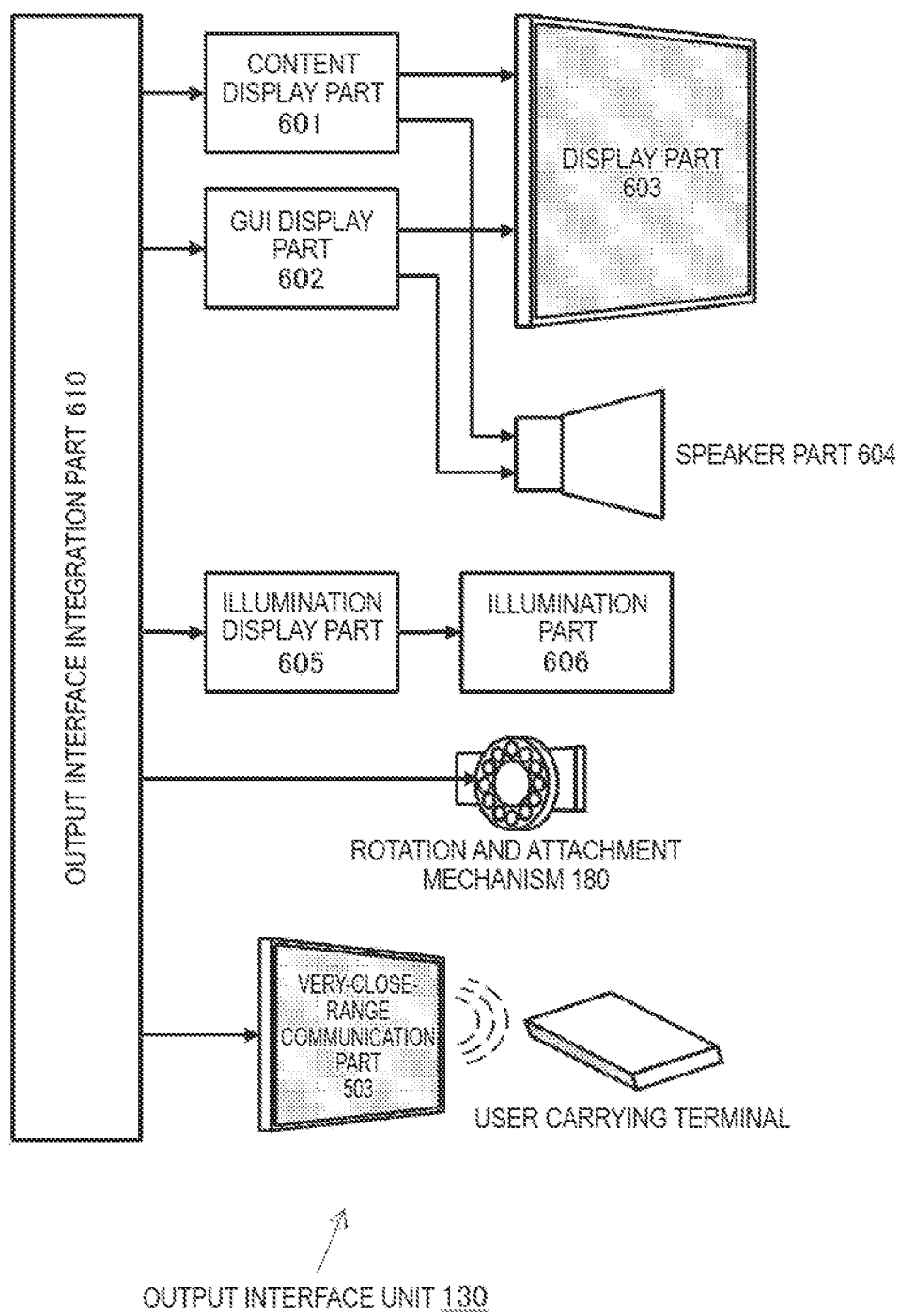
FIG. 6 is a diagram showing an internal configuration of an output interface unit 130.

Main functions of the output interface unit 130 are UI displaying on the screen on the basis of the arithmetic result by the arithmetic unit 120 and data transmission to the user carrying device. FIG. 6 shows an internal configuration of the output interface unit 130.

An output interface integration part 610 integrally handles information output on the basis of the arithmetic result from monitor division process, object optimum process, and device cooperative data transmission and reception process by the arithmetic unit 120.

The output interface integration part 610 instructs a content display part 601 to output an image and audio of moving picture or still image content such as the received TV broadcast content, reproduced content form a storage medium such as a blu-ray disc to a display part 603 and speaker part 604.

The output interface integration part 610 instructs a GUI display part 602 to display the GUI including the operated object on the display part 603.

The output interface integration part 610 instructs an illumination display part 605 to display and output, an illumination indicating a detection state from an illumination part 606.

The output interface integration part 610 instructs the very-close-range communication part 513 to transmit the data via non-contact communication to the user carrying device and the like.

The information processing apparatus 100 can detects the user on the basis of the recognition of the image taken by the camera part 503, or the detection signal by the distance sensor 507, touch detector 509, proximity sensor 511, very-close-range communication part 513 and the like. The face recognition of the image taken by the camera part 503 or recognition of the user carrying device by the very-close-range communication part 513 can identify who the detected user is. The identified user may log in to the information processing apparatus 100. Of course, an account to be logged in may be also limited to the specified user. The information processing apparatus 100 may use either of the distance sensor 507, touch detector 509, and proximity sensor 511 depending on the user position or user state to accept the operation from the user.

The information processing apparatus 100 connects vie the communication unit 150 with the external network. A connection form with the external network may be wired or wireless. The information processing apparatus 100 can communicate via the communication unit 150 with another device including a mobile terminal carried by the user such as a smartphone and a tablet terminal. A combination of three kinds of devices, the information processing apparatus 100, mobile terminal, and tablet terminal may constitute a so-called "three screens". The information processing apparatus 100 rather than other two screens can provide a UI for making three screens cooperate with each other on the large screen.

For example, the user carries out actions such as performs a touch operation on the screen or makes the user carrying terminal proximate to the information processing apparatus 100, while, on the background thereof, transmitted and received is the data such as a moving picture, still image and text content as an entity of the operated object between the information processing apparatus 100 and the corresponding user carrying terminal. Moreover, a cloud server or the like is installed over the external network, which allows three screens to utilize computing power of the cloud server and so on to benefit from cloud computing via the information processing apparatus 100.

An explanation is given of some applications of the information processing apparatus 100 in order below.

B. Simultaneous Operations on Large Screen by Plurality of Users

The information processing apparatus 100 allows simultaneous operations on the large screen by a plurality of users. Specifically, the proximity sensor 511 is provided at each of four side edge portions of the large screen for detecting user presence or user state, and the user occupancy region for each user and the common region are set in the screen depending on the locations of the users, allowing comfort and efficient simultaneous operations by a plurality of users If the screen of the information processing apparatus 100 is enlarged, a space is gotten enough for a plurality of users simultaneously to carry out touch input in the Tabletop state. As described above, the user occupancy region for each user and the common region are set in the screen, achieving more comfort and efficient simultaneous operations for a plurality of users.

The operating right for the operated object arranged in the user occupancy region given to the corresponding user. If the user moves the operated object from the common region or another user occupancy region to his/her own user occupancy region, the operating right for the relevant operated object is also moved to him/her. When the operated object enters the user occupancy region of the user, the operated object display is automatically changed to so as to frontally face him/her.

In the case where the operated object is moved between the user occupancy regions, the operated object is moved in a physically natural movement depending on a touch position undergoing a move operation. Pulling one operated object by the users each other allows a division or copy operation on the operated object.

Figure 7:
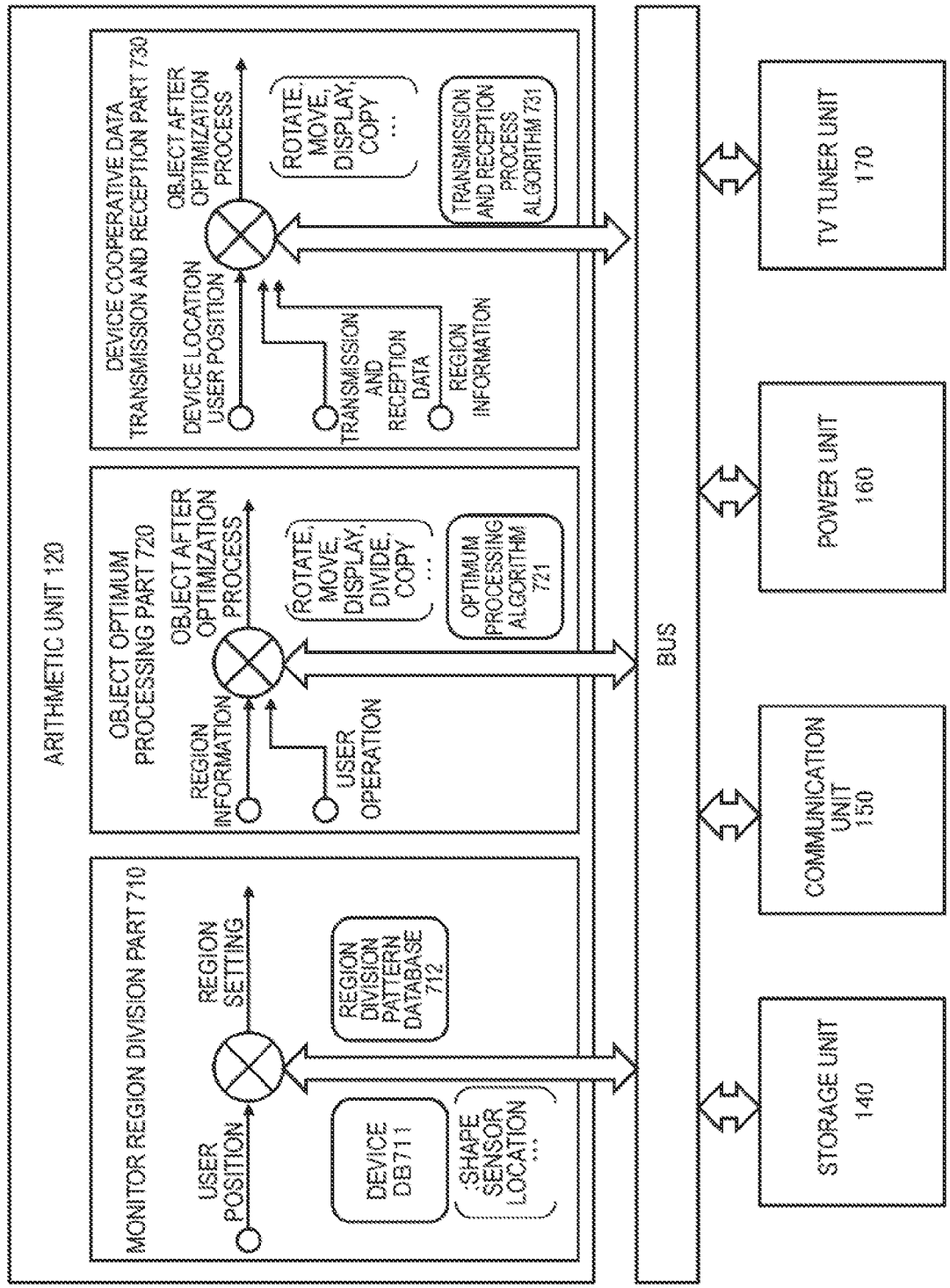
FIG. 7 is a diagram showing an internal configuration for an arithmetic unit 120 to process an operated object.

Main functions of the arithmetic unit 120 in achieving the application are optimization and UI generation of the operated object on the basis of a user detection result, screen touch detection result and reception data from the user carrying device by the input interface unit 110. FIG. 7 shows an internal configuration for the arithmetic unit 120 to process the operated object. The arithmetic unit 120 includes a monitor region division part 710, object optimum processing part 720, and device cooperative data transmission and reception processing part 630.

The monitor region division part 710, when accepting the positional information on the user from the input interface integration part 520, refers to a device database 711 concerning a shape or sensor arrangement and region pattern database 711 stored in the storage unit 140 to set the above described user occupancy region and common region on the screen. Then, the monitor region setting part 710 gives the set region information to the object optimum processing part 720 and device cooperative data transmission and reception part 730. Then, a monitor region division procedure is described in detail later.

The object optimum processing part 720 inputs information concerning the operation performed by the user on the operated object on the screen from the input interface integration part 520. Then, the object optimum processing part 720 subjects the operated object operated by the user to the optimum process for the operated object corresponding to the user operation such as rotating, moving, displaying, dividing or copying in accordance with an optimum processing algorithm 721 loaded from the storage unit 140 to output the operated object subjected to the optimum process to the screen of the display part 603. The optimum process for the operated object is described in detail later.

The device cooperative data transmission and reception part 730 inputs the positional information on the user or user carrying device, the transmitted and received data to and from the device from the input interface integration part 520. Then, the device cooperative data transmission and reception part 730 performs a data transmission and reception process in cooperation with the user carrying device in accordance with a transmission and reception process algorithm 731 loaded from the storage unit 140. The object optimum processing part 720 performs the optimum process for the operated object corresponding to the data transmission and reception process. For example, the object optimum processing part 720 subjects the operated object concerning the transmitted and received data to the optimum process for the operated object associated with the data transmission and reception in cooperation with the user carrying device such as rotating, moving, displaying or copying to output the operated object subjected to the optimum process to the screen of the display part 603. The optimum process for the operated object associated with device cooperation is described in detail later.

Subsequently, an explanation is given of a monitor region division process in detail. The process of monitor region division is mainly estimated to be carried out in the use situation where the information processing apparatus 100 is in the Tabletop state and shared by a plurality of users, but of course, may be in the use situation in the Wall state and shared by a plurality of users.

Figure 8:
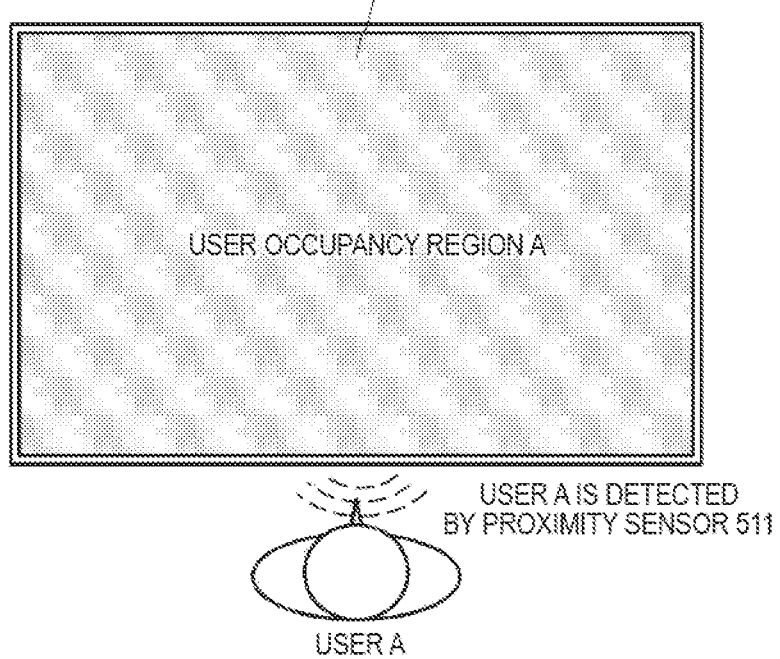
FIG. 8 is a diagram showing a situation where a user occupancy region is set in a screen.

The monitor region division part 710, when detecting presence of the user through the input interface integration part 520, allocates the user occupancy region to the user in the screen. FIG. 8 shows a situation where the monitor region division part 710 sets a user occupancy region A for the user A in the screen in response to detecting presence of the user A by way of the detection signal from the proximity sensor 511 (or distance sensor 507) provided to the screen side edge portion. In a case where the user whose presence is detected is one, the entire screen may be set to the user occupancy region for the user as shown in the figure.

Here, if the user occupancy region A is set, the object optimum processing part 720 changes in the orientation the respective operated objects in the user occupancy region A so as to frontally face the user on the basis of the positional information on the user A obtained via the input interface integration part 520. FIG. 9A shows a situation where orientations of the operated objects #1 to #6 are random before setting the user occupancy region A. In the figure, it is to be appreciated that slants of the respective characters "#1", "#2", . . . within the objects express the orientations of the objects. FIG. 9B shows a situation where, in response to setting the user occupancy region A for the user A, the orientations of all the operated objects #1 to #6 in this region have been changed so as to frontally face the user A.

In a case where the user whose presence is detected only the user A, the entire screen may be set the user occupancy region A for the user A. On the other hand, in a case where presence of two or more users is detected, the common region capable of being shared between the users is preferably set such that the user performs the collaborative work (Collaborative action).

FIG. 10 shows a situation where the monitor region division part 710 additionally sets a user occupancy region B for a user B and the common region in the screen in response to detecting presence of the user B at an adjacent screen side edge besides the user A by way of the detection signal from the proximity sensor 511 or distance sensor 507. On the basis of the positional information on the users A and B, the user occupancy region A for the user A is receded and lessened toward the place where the user is present and the user occupancy region B for the user B appears near the place where the user present. In response to newly detecting the presence of the user B, the moire detection indicator is also displayed in the user occupancy region B. Then, an area in the screen other than the user occupancy region A and user occupancy region B is entirely the common region. It may be such that the user occupancy region B is enabled at a time when any operated object in the user occupancy region B is firstly touched after the user B becomes proximate to the information processing apparatus 100 accompanied by that the user occupancy region B is newly set in the screen. Note that although omitted in FIG. 10, each operated object in the region newly set as the user occupancy region B is changed in the orientation so as to frontally face the user B when the user occupancy region B is set or the user occupancy region B is enabled.

Figure 11:
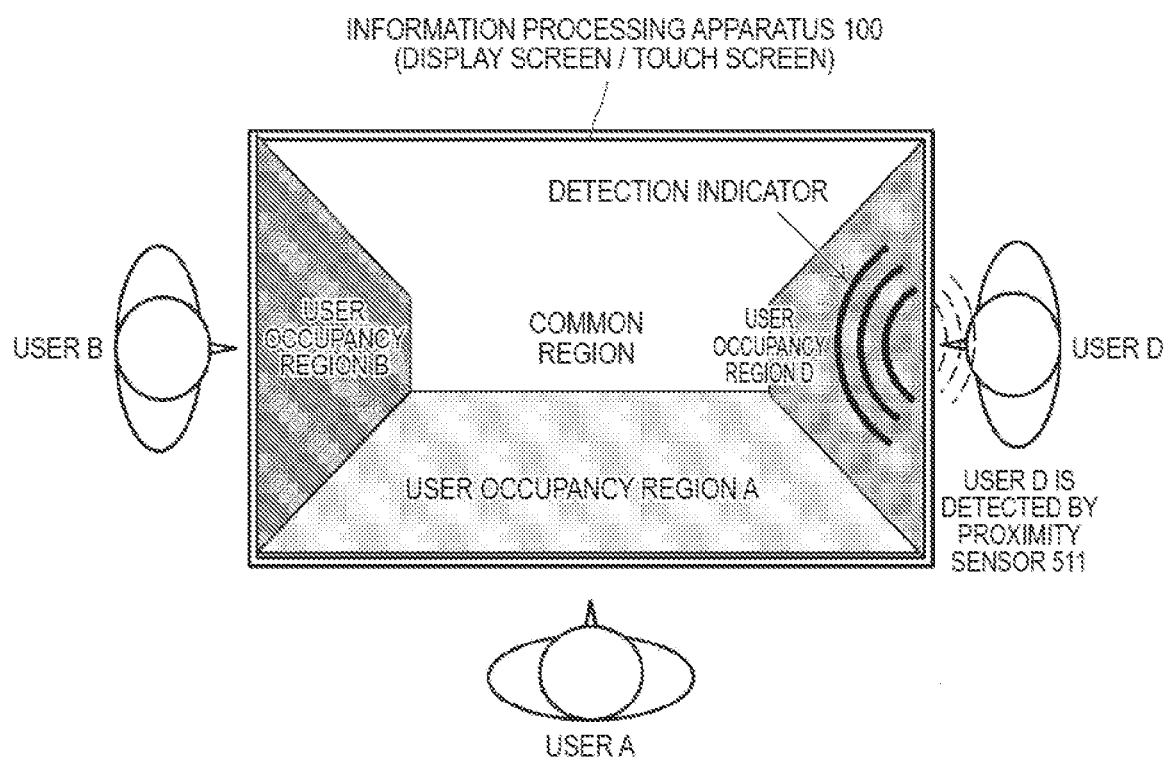
FIG. 11 is a diagram showing a situation where a user occupancy region D for a user B and the common region are additionally set in the screen in response to detecting presence of the user D besides the users A and B.
Figure 13C:
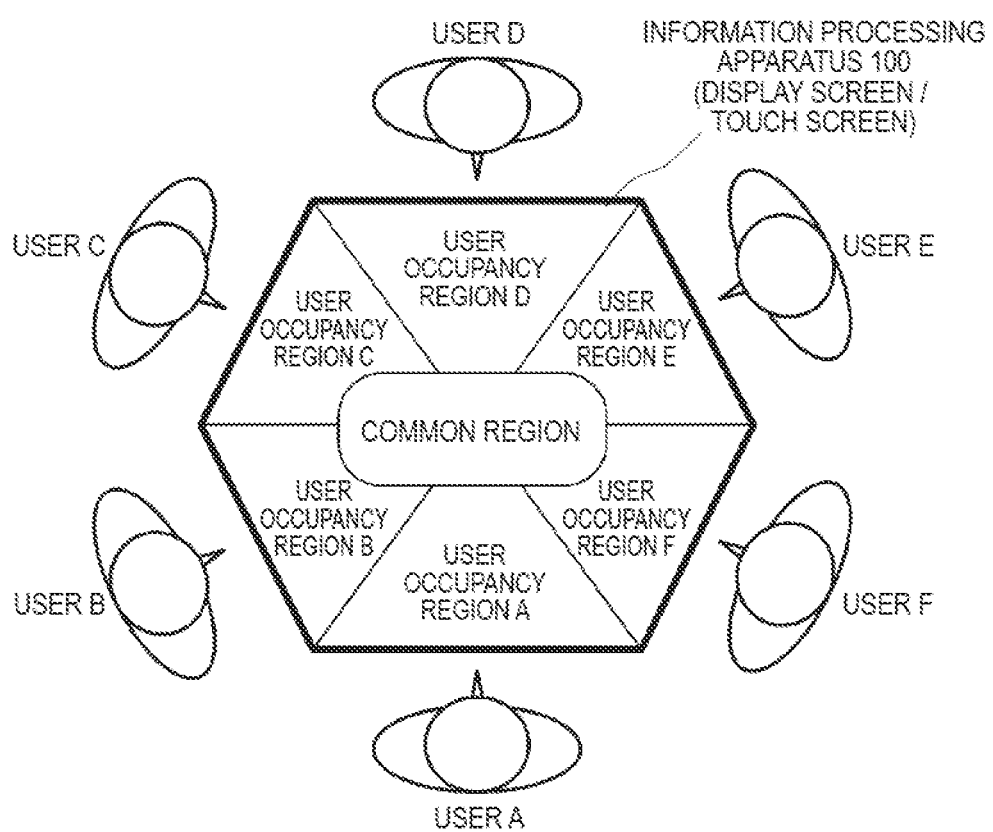
FIG. 13C is an illustration of a region division pattern for dividing a screen into user occupancy regions for respective users depending on a shape or size of the screen and the number of users.
Figure 13E:
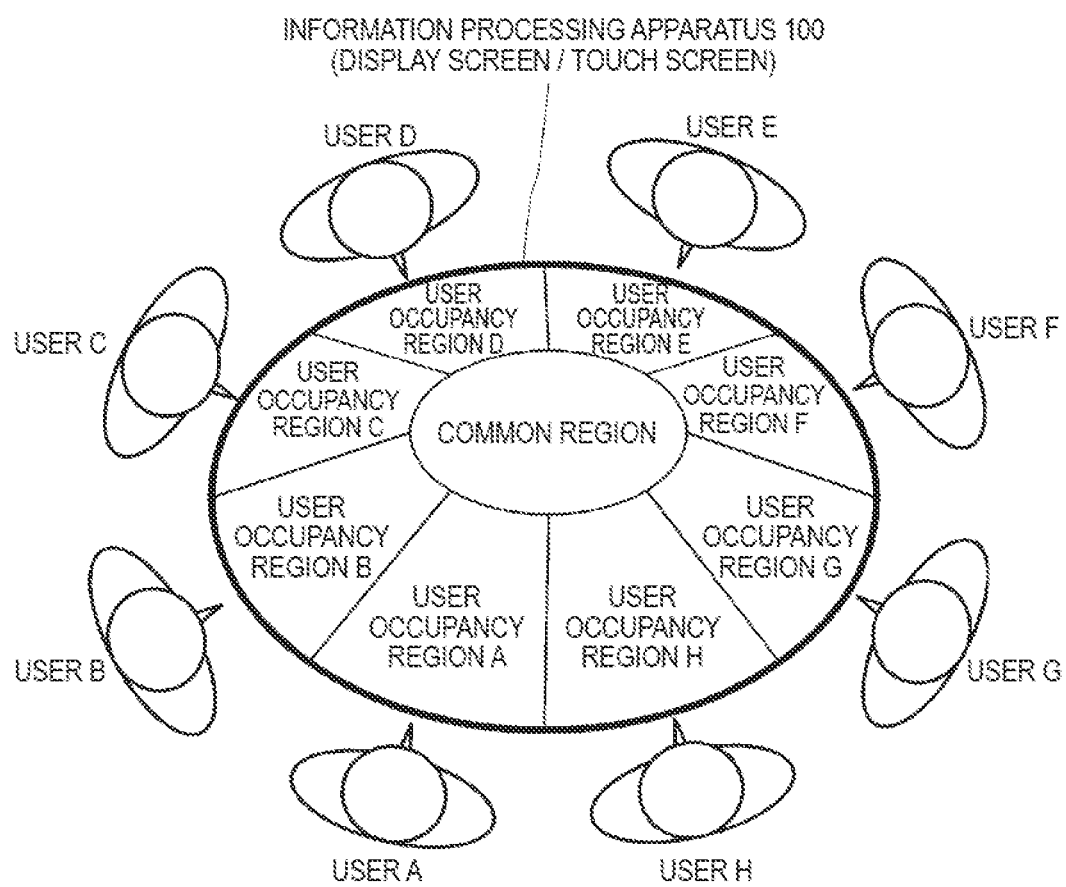
FIG. 13E is an illustration of a region division pattern for dividing a screen into user occupancy regions for respective users depending on a shape or size of the screen and the number of users.

FIG. 11 shows a situation where additionally the monitor region division part 710 sets a user occupancy region D of a user D in the screen near a place where the user D is present in response to detecting presence of the user D at another screen side edge besides the users A and B. In the user occupancy region D, the moire detection indicator is displayed to express that the presence of the user D is newly detected. FIG. 12 shows a situation where the monitor region division part 710 additionally sets a user occupancy region C for a user in the screen near a place where the user C is present in response to detecting presence of the user D at further another screen side edge besides the users A, B, and D. In the user occupancy region C, the moire detection indicator is displayed to express that the user C is newly detected.

Note that the region division patterns of the user occupancy regions and common region shown in FIG. 8 to FIG. 12 are merely examples. The region division pattern also depends on the screen shape or the number and location of the users whose presence are detected. A region division pattern database 611 has information accumulated therein concerning the region division pattern depending on the shape or size of the screen and the number of the users. The device database 711 has information accumulated therein the information on the shape or size of the screen used by the relevant information processing apparatus 100. The monitor region division part 710, when receiving the positional information detected on the user via the input interface integration part 520, reads out the shape or size of the screen from the device database 711 to refer to the region division pattern corresponding to the region division pattern database 712. FIG. 13A to FIG. 13E illustrates the region division pattern for dividing the screen into user occupancy regions for respective users depending on the shape or size of the screen and the number of users.

Figure 14:
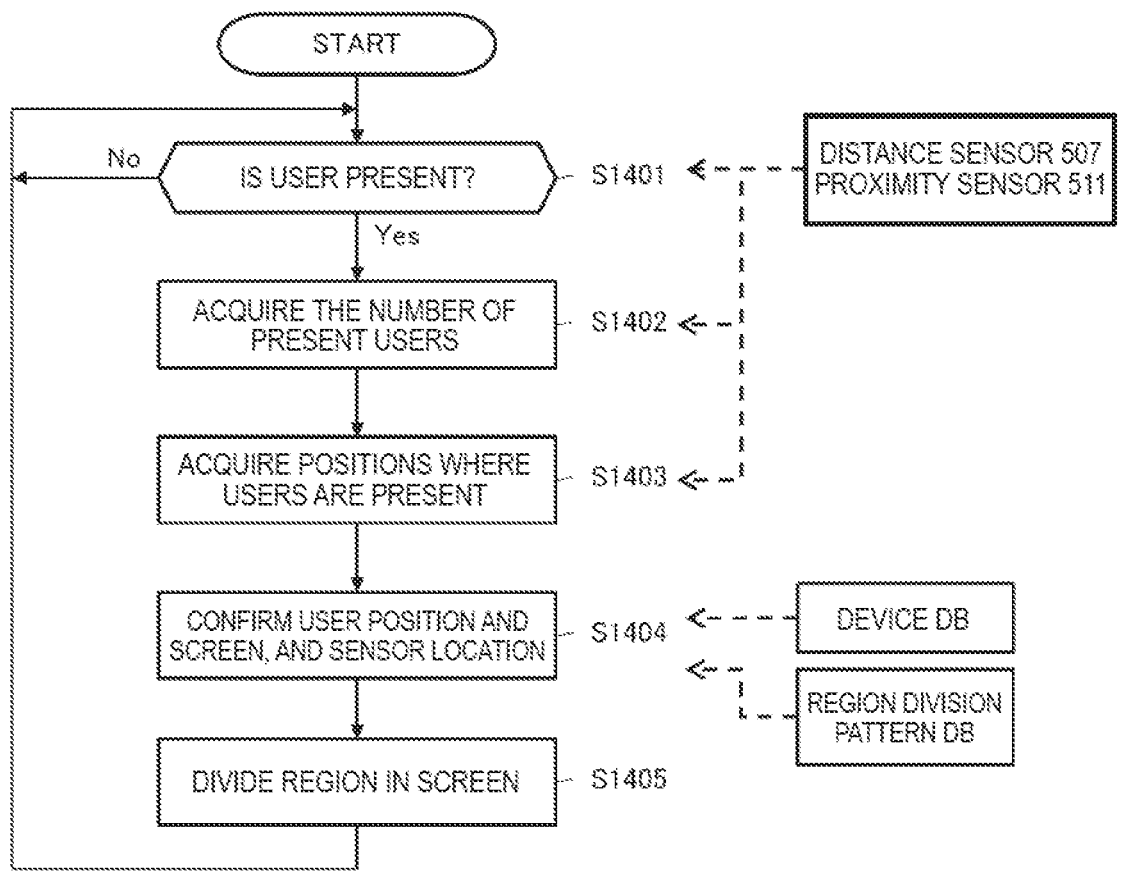
FIG. 14 is a flowchart showing a monitor region division procedure performed by a monitor region division part 710.

FIG. 14 shows a monitor region division procedure performed by the monitor region division part 710 in a form of a flowchart.

The monitor region division part 710 checks whether or not the user is present in the vicinity of the screen on the basis of a signal analysis result of the detection signal from the proximity sensor 511 or distance sensor 507 (step S1401).

If detected that the user is present (Yes at step S1401), the monitor region division part 710 subsequently acquires the number of the present users (step S1402) and further acquires the positions where the respective users are present (step S1403). The processes at step S1401 to S1403 are achieved on the basis or the positional information on the user given from the input interface integration part 520.

Subsequently, the monitor region division part 710 refers to the device database 511 to acquire device information including the screen shape of the display part 603 or arrangement of the proximity sensor 511 used by the information processing apparatus 100, and refers to the region division pattern database 712 for corresponding region division pattern by use of the device information and the user positional information (step S1404).

Then, the monitor region division part 710 sets the user occupancy regions for the respective users and common region on the screen in accordance with the obtained region division pattern (step S1405), and this process routine ends.

Subsequently, an explanation is given of the object optimum process by the object optimum processing part 720 in detail.

The object optimum processing part 720, when inputting the information concerning the operation performed by the user on the operated object on the screen through the input interface integration part 520, performs a display process on the operated object on the screen such as rotating, moving, displaying, dividing or copying depending on the user operation. The process on the operated object such as rotating, moving, displaying, dividing or copying depending on the operation by the user such as dragging or throw moving is similar to the GUI operation on a desktop screen of a computer.

In the embodiment, the user occupancy regions and common region are set on the screen, and the object optimum processing part 720 performs the optimum process on displaying the operated object depending on the region which object exists in. A representative of the optimum process is a process of changing in the orientations the respective operated objects in the user occupancy region so as to frontally face the user thereof.

Figure 15:
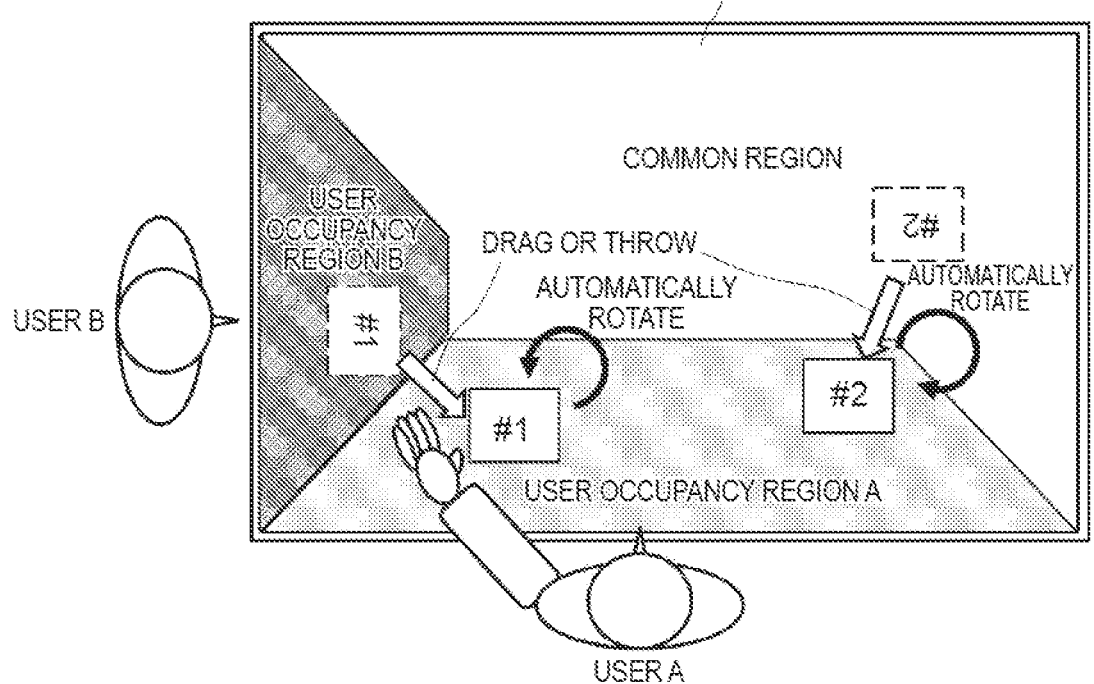
FIG. 15 is a diagram showing a situation where then operated object is automatically rotated so as to frontally face a user by dragging or throw moving the operated object into a user occupancy region.

FIG. 15 shows a situation where an operated object #1 in the common region is dragged or moved by throwing toward the user occupancy region A for the user A and when a part or central coordinate of the object enters the user occupancy region A, the object optimum processing part 720 automatically performs a rotation process on the object so as to frontally face the user A. FIG. 15 also shows together a situation where an operated object #2 in the user occupancy region B for the user B is dragged or moved by throwing toward the user occupancy region A for the user A and when a part or central coordinate of the object enter the user occupancy region A, the rotation process is automatically performed on the object so as to frontally face the user A.

As shown in FIG. 10, when the user B becomes proximate to the information processing apparatus 100, the user occupancy region B is newly set on the screen near the user B. In a case where an operated object #3 originally having frontally faced the user A exists in a region to be the user occupancy region B (refer to FIG. 16A), if the user occupancy region B newly appears, the object optimum processing part 720 immediately automatically performs the rotation process on the operated object #3 so as to frontally face the user B (refer to FIG. 16B).

Alternatively, not immediately performing the rotation process on the operated object, it may be such that the user occupancy region B is enabled at a time when any operated object in the user occupancy region B is firstly touched after the user B becomes proximate to the information processing apparatus 100 accompanied by that the user occupancy region B is newly set in the screen. In this case, all the operated object in the user occupancy region B may be simultaneously subjected to the rotation process so as to frontally face the user B when the user occupancy region B is enabled.

Figure 17:
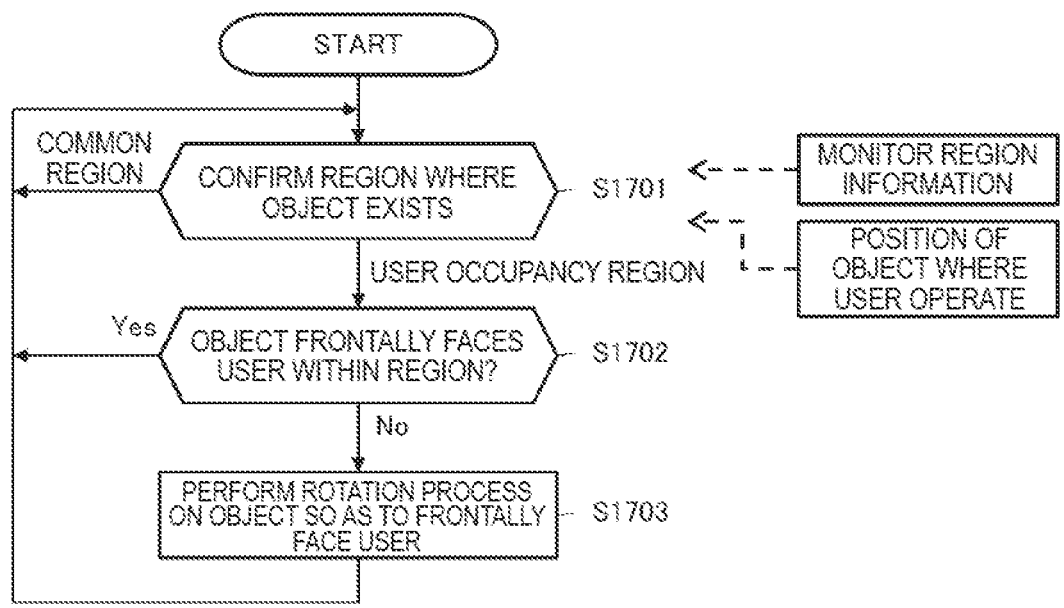
FIG. 17 is a flowchart showing a procedure of optimum process for an operated object performed by an object optimum processing part 720.

The object optimum processing part 720 can perform the optimum process on the operated object on the basis of operation information of the user obtained through the input interface integration part 520 and the region information given by the monitor region division part 710. FIG. 17 shows an optimum process procedure on the operated object performed by the object optimum processing part 720 in a form of a flowchart.

The object optimum processing part 720, when being given the positional information of the operated object operated by the user from the input interface integration part 520 and obtaining information of divided monitor region from the monitor region division part 710, confirms which region the operated object operated by the user exists in (step S1701).

Here, if the operated object operated by the user exists in the user occupancy region, the object optimum processing part 720 confirms whether or not that operated object frontally faces the user in the orientation thereof within the relevant user occupancy region (step S1702).

Then, if the operated object does not frontally face the user in the orientation (No, at step S1702), the object optimum processing part 720 performs the rotation process on the operated object so as to frontally face the user in the orientation within the relevant user occupancy region (step S1703).

Figure 18:
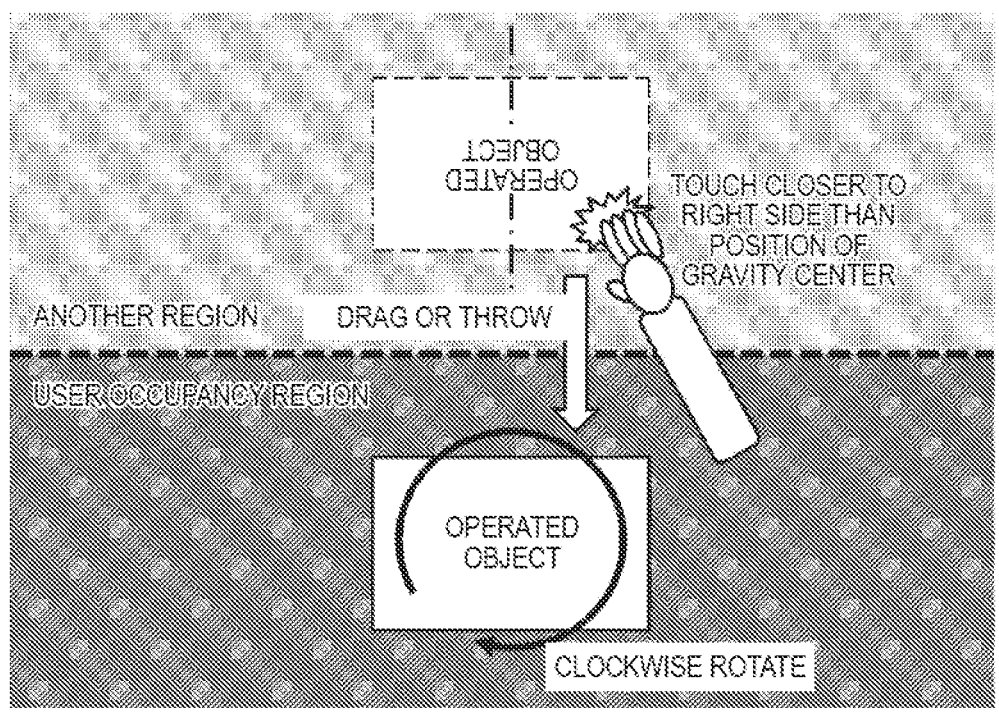
FIG. 18 is a diagram showing a situation where a rotation direction is controlled depending on a position of touch operation on an operated object by a user.
Figure 19:
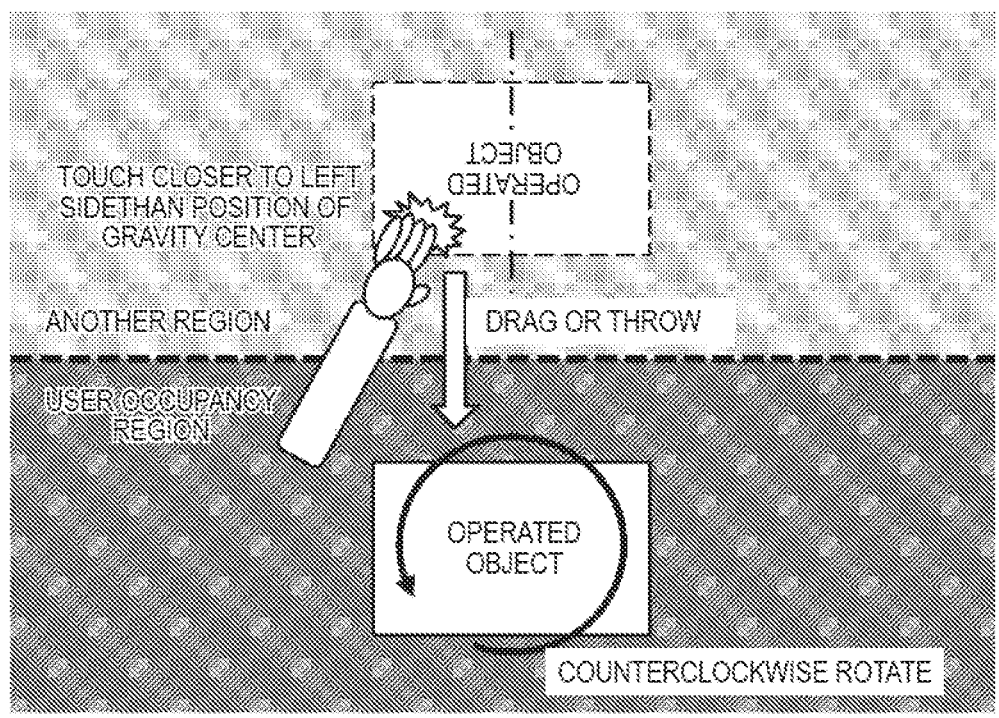
FIG. 19 is a diagram showing a situation where a rotation direction is controlled depending on a position of touch operation on an operated object by a user.

It may be such that when the user drags or throws the operated object from the common region or user occupancy region of another user toward his/her user occupancy region, the rotation direction is controlled depending on a position of touch operation on this operated object by the user. FIG. 18 shows a situation where the user touches the operated object closer to the right side than the position of gravity center thereof to drag or move by throwing, due to which the operated object is rotated clockwise around the position of gravity center when entering the user occupancy region and frontally faces the user in the orientation. FIG. 19 shows a situation where the user touches the operated object closer to the left side than the position of gravity center to drag or move by throwing, due to which the operated object is rotated counterclockwise around the position of gravity center and frontally faces the user in the orientation.

A shown in FIG. 18 and FIG. 19, the rotation direction of the operated object is changed using the position of gravity center as a reference, allowing to provide a natural operational feeling to the user.

Subsequently, an explanation is given of a device cooperative data transmission and reception process by the device cooperative data transmission and reception part 730.

As shown in FIG. 4, the information processing apparatus 100 can communicate via the communication unit 150 with another device such as a user carrying mobile terminal. For example, the user carries out actions such as performs a touch operation on the screen or makes the user carrying terminal proximate to the information processing apparatus 100, while, on the background thereof, transmitted and received is the data such as a moving picture, still image and text content as an entity of the operated object between the information processing apparatus 100 and the corresponding user carrying terminal.

Figure 20:
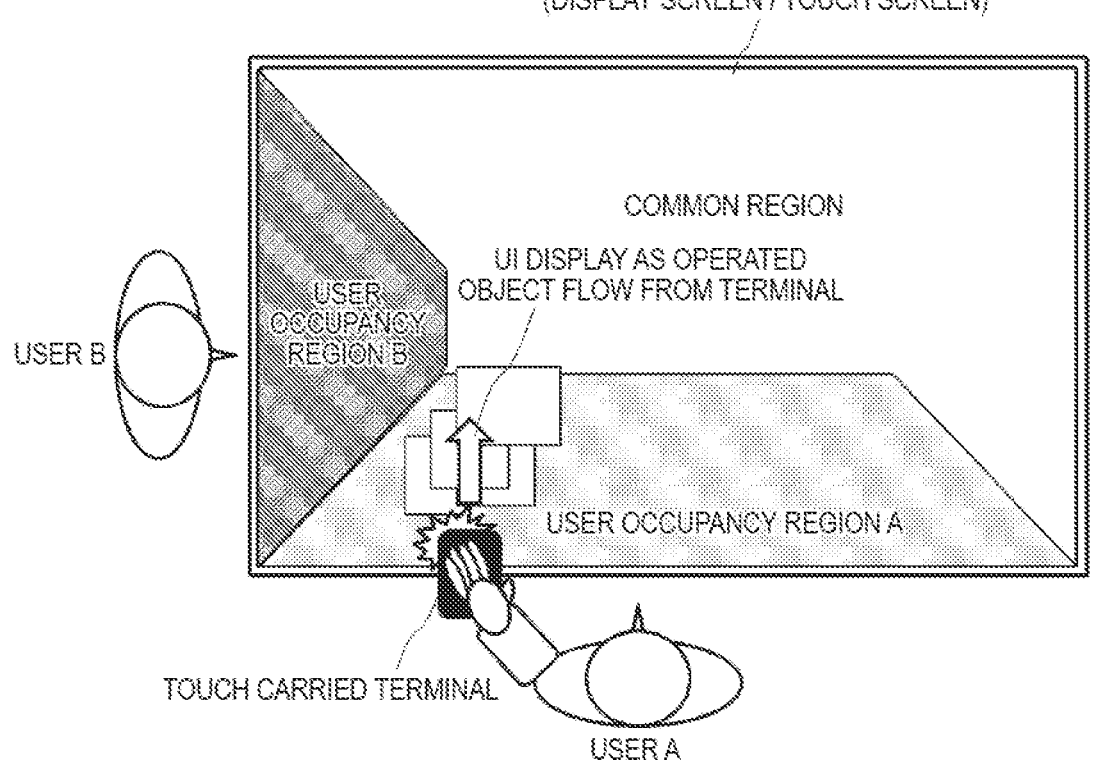
FIG. 20 is a diagram showing an exemplary interaction for transferring an operated object between the information processing apparatus 100 and a user carrying terminal.

FIG. 20 illustrates an exemplary interaction for transferring the operated object between the information processing apparatus 100 and a user carrying terminal. The example shown in the figure illustrates a UI display in which in response to that the user A makes his/her carry terminal proximate to the surround of the user occupancy region A allocated to him/her, the operated object appears from the vicinity of the terminal and flows into the user occupancy region A.

The information processing apparatus 100 can detect that the user carrying terminal is proximate to the vicinity of the user occupancy region A on the basis of a signal analysis result of the detection signal from the very-close-range communication part 513 or a recognition result of an image of the user taken by the camera part 503. The device cooperative data transmission and reception part 730 may identify whether or not there is the data to be transmitted to the information processing apparatus 100 by the user or what the transmission data is, through a past context of the user A and information processing apparatus 100 (or communication between the user A and another user via the information processing apparatus 100). Then, if there is the transmission data, actions are carried out such as the user carrying terminal is made proximate to the vicinity of the user occupancy region A, while, on the background thereof, the device cooperative data transmission and reception part 730 transmits and receives the data such as a moving picture, still image and text content as an entity of the operated object between the information processing apparatus 100 and the corresponding user carrying terminal.

The device cooperative data transmission and reception part 730 performs data transmission and reception to and from the user carrying terminal on the background, and the object optimum processing part 720 performs the object optimum process to carry out the UI display such that the operated object appears from user carrying terminal on the screen of the display part 603. FIG. 20 illustrates the UI display as the operated object flows from the user A carrying terminal into the corresponding user occupancy region A.

Figure 21:
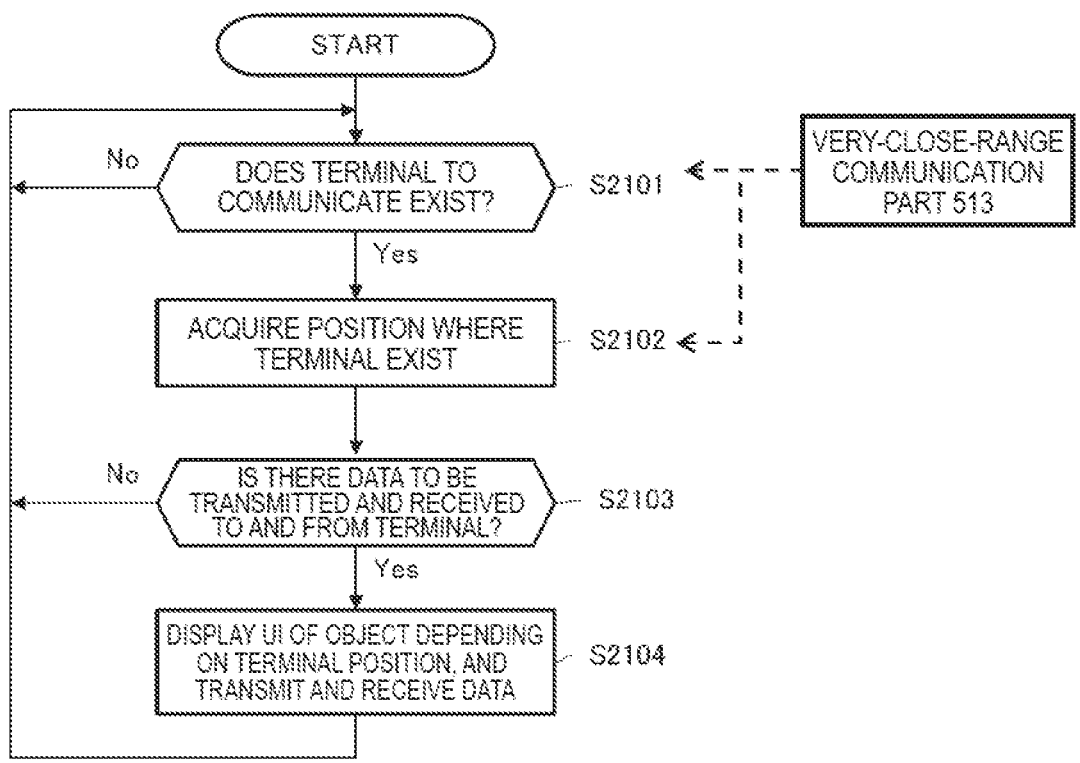
FIG. 21 is a flowchart showing a procedure of device cooperative data transmission and reception performed by a device cooperative data transmission and reception part 730.

FIG. 21 shows a procedure of device cooperative data transmission and reception performed by the device cooperative data transmission and reception part 730 in a form of a flowchart. The process of the device cooperative data transmission and reception part 730 is activated on the basis of a signal analysis result of the detection signal and the like by the very-close-range communication part 513 in response to that a terminal carried by a certain user is made proximate to the vicinity of his/her user occupancy region.

The device cooperative data transmission and reception part 730 checks whether or not the user carrying terminal to communicate exists on the basis of a signal analysis result of the detection signal by the very-close-range communication part 513 and the like (step S2101).

If the user carrying terminal to communicate exists (Yes at step S2101), the device cooperative data transmission and reception part 730 obtains the position where the terminal exists on the basis of a signal analysis result of the detection signal by the very-close-range communication part 513 and the like (step S2102).

Then, the device cooperative data transmission and reception part 730 checks whether or not there is the data to be transmitted and received to and from the user carrying terminal (step S2103).

If there is the data to be transmitted and received to and from the user carrying terminal (Yes at step S2103), the device cooperative data transmission and reception part 730 carries out the UI display of the operated object depending on the position of the terminal in accordance with the transmission and reception process algorithm 731 (refer to FIG. 20). The device cooperative data transmission and reception part 730 transmits and receives the data as an entity of the operated object to and from the terminal on the background of the UI display (step S2104).

Figure 22:
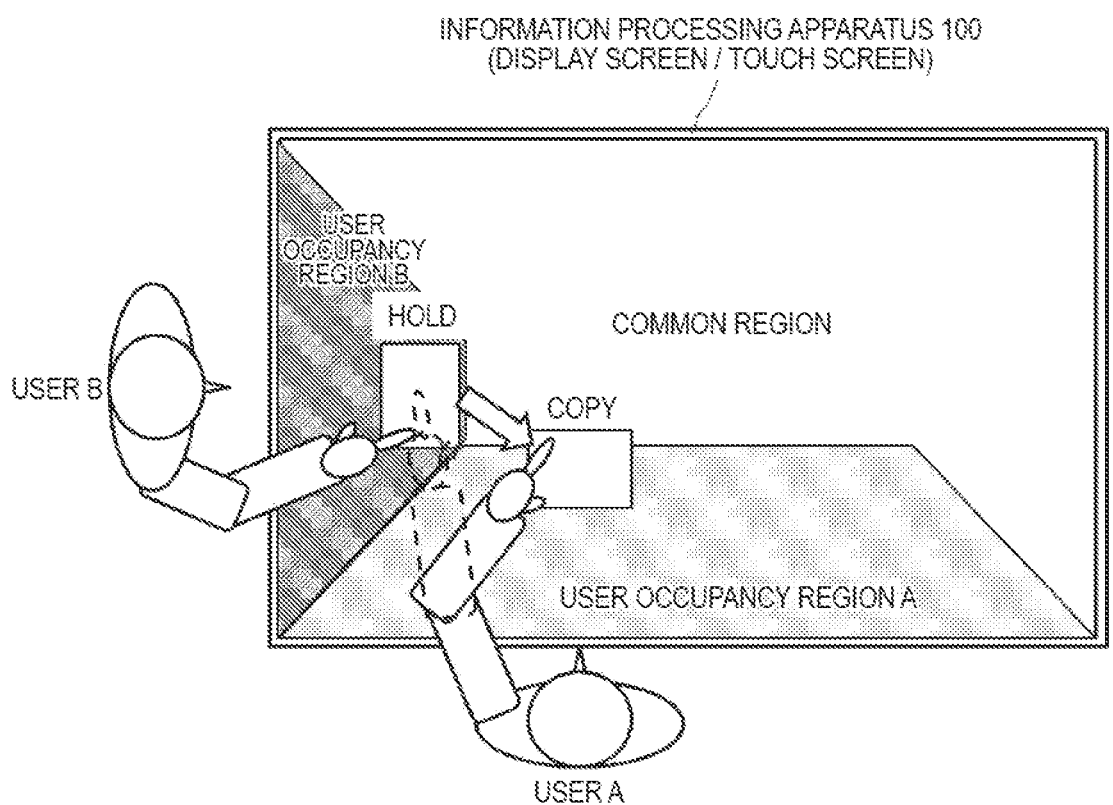
FIG. 22 is a diagram showing a situation where an operated object is moved between the user occupancy regions to copy an operated object.

As shown in FIG. 20 and FIG. 21, the operated objects obtained by the information processing apparatus 100 from the user carrying terminal are arranged in the user occupancy region of the corresponding user. Moreover, when the data is communicated between the users, the operated objects may be operated to be moved between the user occupancy regions with each other. FIG. 22 shows a situation where the user A copies the operated object held by the user B in the user occupancy region B into the user occupancy region A. Alternatively, the operated object may be not copied but divided.

In a case where the operated object copied on the screen is content such as a moving picture or still image, an independent another data is simply created. In a case where the copied operated object is a window for an application, another window for the application is created which is capable of being operated in association between the user originally holds the operated object and the user of the copied object destination.

C. Optimum Selection of Input Means and Display GUI Depending on User Position The information processing apparatus 100 includes the distance sensor 507 and the proximity sensor 511, and can detect a distance from the information processing apparatus 100 body, that is, the screen to the user when used in the wall-hung manner as shown in FIG. 1 and FIG. 3, for example.

The information processing apparatus 100 includes the touch detector 509, proximity sensor 511, camera part 503, and remote control reception part 501, and can provide to the user a plurality of input means with respect to the screen including touch, proximity, gesture using hand or the like, remote controller, indirect operation owing to a user state. The respective input means are individually adequate or inadequate to the operation depending on the distance from the information processing apparatus 100 body, that is, the screen to the user. For example, a user in a range within 50 cm from the information processing apparatus 100 body can directly contact on the screen to be ensured to operate the operated object. The user in a range within 2 m from the information processing apparatus 100 body is far to directly contact the screen, but an image taken by the camera part 503 can be subjected to the recognition process to accurately capture a face or hand motion, enabling the gesture input. The user 2m or more away from the information processing apparatus 100 body is reliably reached by the remote control signal although with decrease in an accuracy of image recognition, allowing the remote control operation. Further, the optimum GUI display such as the frame or information density of the operated object displayed on the screen is varied depending on the distance to the user.

In the embodiment, the information processing apparatus 100 automatically performs selection from among a plurality of input means depending on the user position or distance to the user position and automatically selects or adjusts the GUI display depending on the user position, improving the user convenience.

Figure 23:
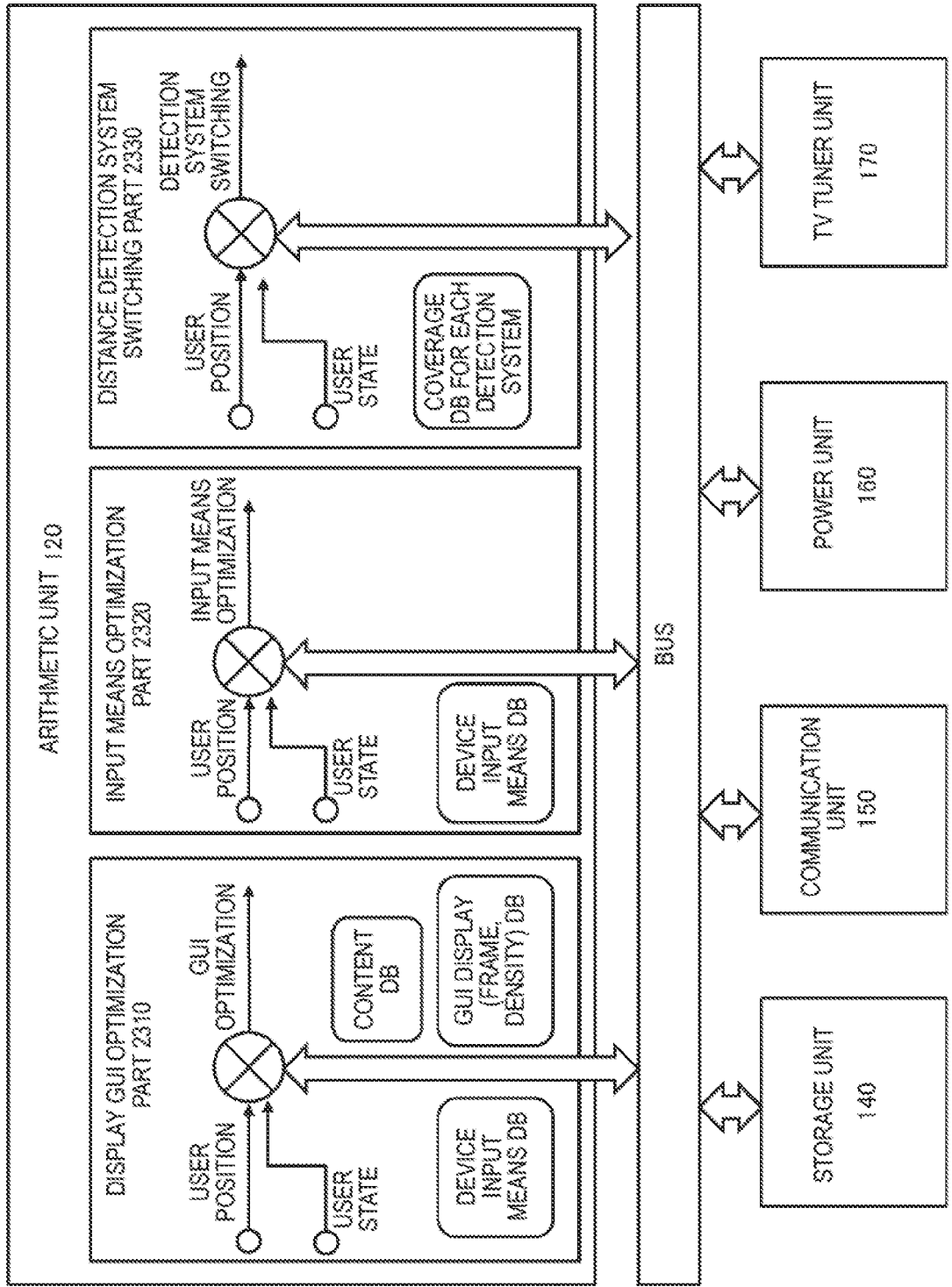
FIG. 23 is a diagram showing an internal configuration for the arithmetic unit 120 to perform an optimization process depending on a distance to the user.

FIG. 23 shows an internal configuration for the arithmetic unit 120 to perform an optimization process depending on the distance to the user. The arithmetic unit 120 includes a display GUI optimization part 2310, input means optimization part 2320, and distance detection system switching part 2330.

The display GUI optimization part 2310 performs the optimization process on the optimum GUI display such as the frame or information density of the operated object displayed on the screen of the display part 603 depending on the user position and user state.

Here, the user position is obtained by way of a distance detection system switched by the distance detection system switching part 2330. If the user position comes closer, personal authentication is enabled through the face recognition of the image taken by the camera part 503 or proximity communication with the user carrying terminal and the like. The user state is identified on the basis of the image recognition of the image taken by the camera part 503 and the signal analysis by the distance sensor 507. The user state is classified roughly into two states of "there is a user (present)" and "there is no user (absent)". The state of "there is a user" is classified into two states of "user watches TV (the screen of the display part 603) (during viewing)", and "user does not watch TV (not viewing)". Further, the state of "user watches TV" is finely classified into two states of "user operates TV (during operation)" and "user does not operate TV (no operation)".

The display GUI optimization part 2310 refers to a device input means database in the storage unit 140 in determination of the user state. The display GUI optimization part refers to a GUI display (frame, density) database and content database in the storage unit 140 in optimizing the display GUI depending on the demined user position and user state.

FIG. 24A summarizes in a form of table the optimization process on the display GUI by the display GUI optimization part 2310 depending on the user position and user state. FIG. 24B to FIG. 24E show screen transition of the information processing apparatus 100 depending on the user position and user state.

In the state of "there is no user", the display GUI optimization part 2310 stops displaying the screen of the display part 603 to stand by until the user presence is detected (refer to FIG. 24B).

In the state of "there is a user" but "user does not watch TV", the display GUI optimization part 2310 selects "auto-zapping" as the optimum display GUI (refer to FIG. 24C). In the auto-zapping, various operated objects are randomly displayed to attract the interest of the user so as to make him/her feel tempted to watch the TV. The operated object used for zapping includes a plurality of operated objects selected by the display GUI optimization part 2310 on the basis of the content database such as the TV broadcast program content received by the TV tuner unit 170, network content obtained from the communication unit 150 via the Internet, and an e-mail or messaged received from another user.

Figure 25A:
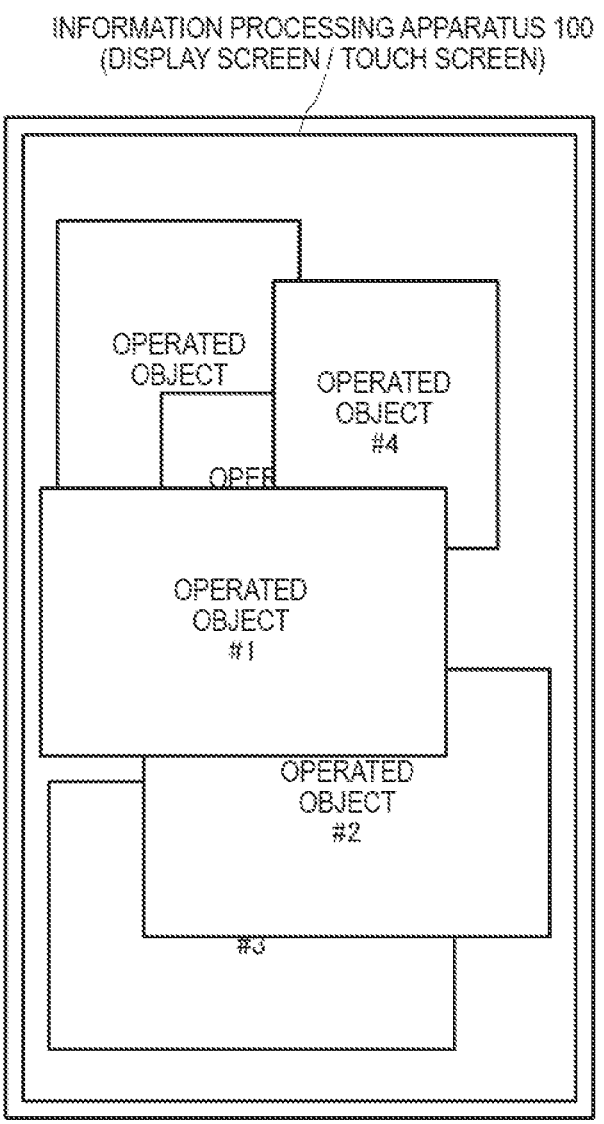
FIG. 25A is a diagram showing an exemplary display screen in which various operated objects are randomly displayed to be auto-zapped.

FIG. 25A shows an example of the display GUI auto-zapped. The display GUI optimization part 2310 may momentarily change the positions or sizes of the respective operated objects displayed on the screen (that is, degree of exposure) as shown in FIG. 25B to work upon subconscious of the user. If the user position comes closer and the personal authentication is enabled, the display GUI optimization part 2310 uses the authenticated user information to sift through the operated objects to be auto-zapped.

Figure 26:
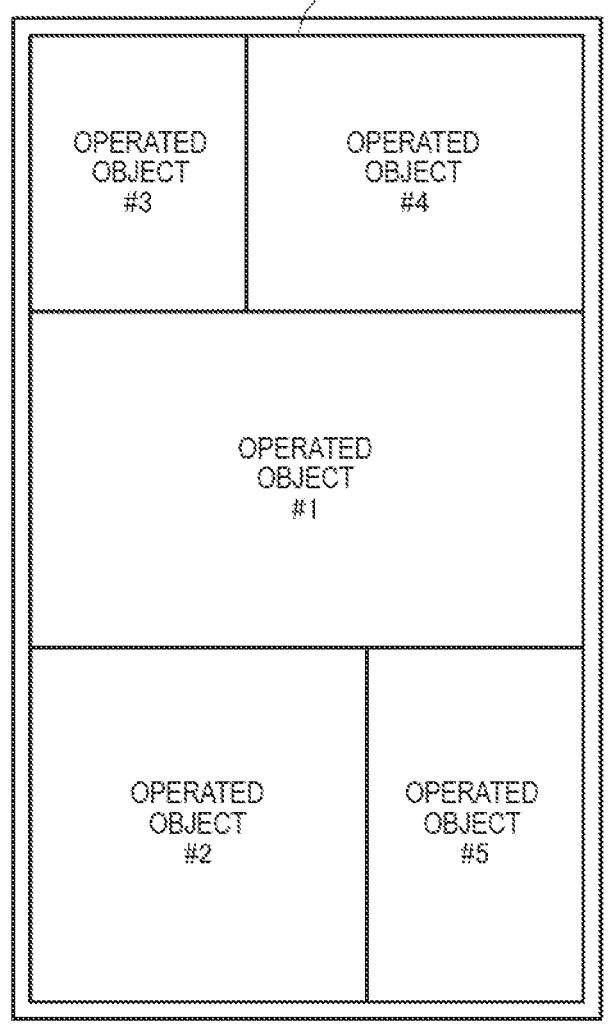
FIG. 26 is a diagram showing an exemplary display screen in a state in which a user is watching a TV but not operating.

In the state of "user watches TV" but "user does not operate TV" also, the display GUI optimization part 2310 selects "auto-zapping" as the optimum display GUI (refer to FIG. 24D). However, differently from the above a plurality of operated objects selected on the basis of the content database are regularly arranged in a column setting as shown in FIG. 26 or the like to facilitate confirmation of displayed content of the individual operated objects. If the user position comes closer and the personal authentication is enabled, the display GUI optimization part 2310 uses the authenticated user information to sift through the operated objects to be auto-zapped. The display GUI optimization part 2310 may control the information density for the display GUI depending on the user position such that the information density for GUI is suppressed if the user is in the distance, and the information density for GUI is heightened if the user comes closer, for example.

Figure 27B:
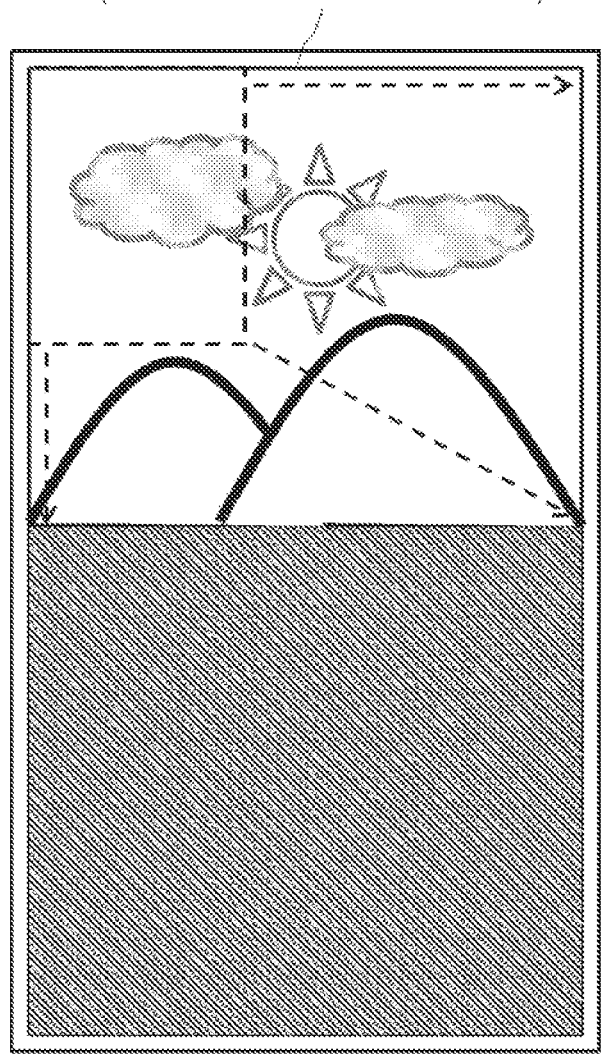
FIG. 27B is a diagram showing an exemplary display screen in which the user is operating the TV.

On the other hand, in the state of "user watches TV" and "user operates TV", the user uses the input means optimized by the input means optimization part 2320 to operate the information processing apparatus 100 (refer to FIG. 24E). The optimum input means in this state includes transmission of the remote control signal to the remote control reception part 501, gesture to the camera part 503, contact to the touch screen detected by the touch detector 509, audio input to the microphone 505, proximity input to the proximity sensor 511 and the like, for example. The display GUI optimization part 2310 displays the operated objects in the column setting as the optimum display GUI depending on the user input operation and can scroll or selectively operate the operated object depending on the user operation. A cursor is displayed on at the position on the screen specified via the input means as shown in FIG. 27A. Since the operated object on which the cursor is not put is considered to be not paid attention by the user, it may be such that brightness level is lowered as shown as a shaded area in the figure to express the contrast with the operated object paid with attention (in the figure, the cursor is put on the operated object #3 the user touches with a fingertip) . As shown in FIG. 27B, when the user selects the operated object on which the cursor is put, the operated object may be displayed in full-screen (or enlarged to the possible maximum size and displayed) (in the figure, the selected operated object #3 is enlarged and displayed).

The input means optimization part 2320 optimizes the input means operated by the user with respect to the information processing apparatus 100 depending on the user position and user state.

As described above, the user position is obtained by way of the distance detection system switched by the distance detection system switching part 2330. If the user position comes closer, the personal authentication is enabled through the face recognition of the image taken by the camera part 503, the proximity communication with the user carrying terminal or the like. The user state is identified on the basis of the image recognition of the image taken by the camera part 503 or the signal analysis by the distance sensor 507.

The input means optimization part 2320 refers to the device input means database in the storage unit 140 in determination of the user state.

Figure 28:
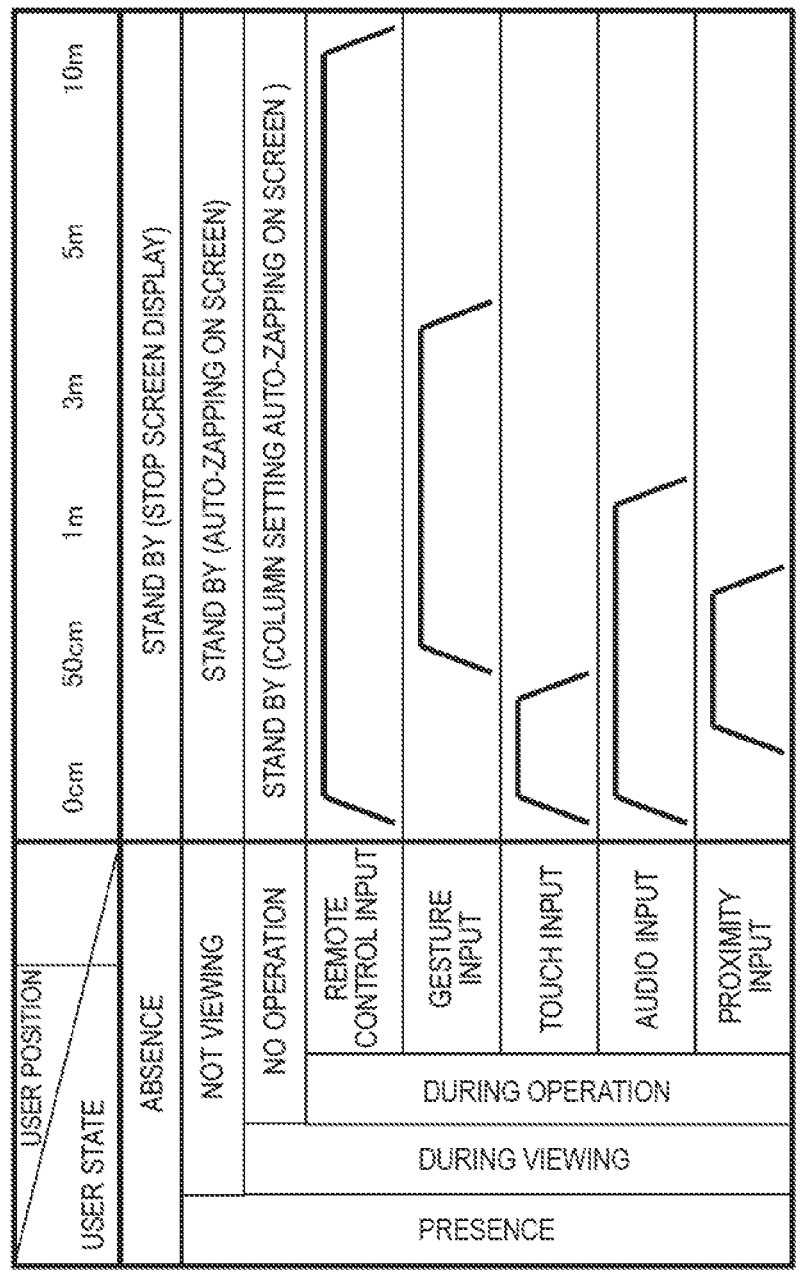
FIG. 28 is a diagram in a form of table summarizing an optimization process on input means by an input means optimization part 2320 depending on a user position and user state.

FIG. 28 summarizes in a form of table the optimization process on the input means by the input means optimization part 2320 depending on a user position and user state.

In the state of "there is no user", "there is a user" but "user does not watch TV", and "user watches TV" but "user does not operate TV", the input means optimization part 2320 stands by until the user starts the operation.

Then, in the state of "user watches TV" and "user operates TV", the input means optimization part 2320 optimizes the respective input means mainly depending on the user position. The input means includes remote control input to the remote control reception part 501, gesture input to the camera part 503, touch input detected by the touch detector 509, audio input to the microphone 505, and proximity input to the proximity sensor 511, for example.

The remote control reception part 501 is activated across all the user positions (that is, almost always) to stand by the remote control signal received.

The recognition accuracy with respect to the image taken by the camera part 503 decreases as the user gets away. If the user comes too closer, the user's figure is prone to be out of sight of the camera part 503. Therefore, the input means optimization part 2320 turns on the gesture to the camera part 503 at the user position in a range of several ten centimeters to several tens meters.

A touch on the touch screen overlapped on the screen of the display part 603 is limited in a range the user's hand can reach. Therefore, the distance detection system switching part 2330 turns on a distance detection function by the touch detector 509 at the user position in a range of several ten centimeters to several tens meters. The proximity sensor 511 can detect the user in a range of up to several tens centimeters even if the user does not touch. Accordingly, the distance detection system switching part 2330 turns on the distance detection function by the proximity sensor 511 even at the user position farther than the touch input.

The recognition accuracy with respect to the audio input to the microphone part 505 decreases as the user gets away.

Therefore, the input means optimization part 2320 turns on the gesture input to camera part 503 at the user position in a range of several tens meters.

The distance detection system switching part 2330 performs a process for switching a system for the information processing apparatus 100 to detect the distance to the user or user position depending on the user position.

The distance detection system switching part 2330 refers to a coverage database for each detection system in the storage unit 140 in determination of the user state.

Figure 29:
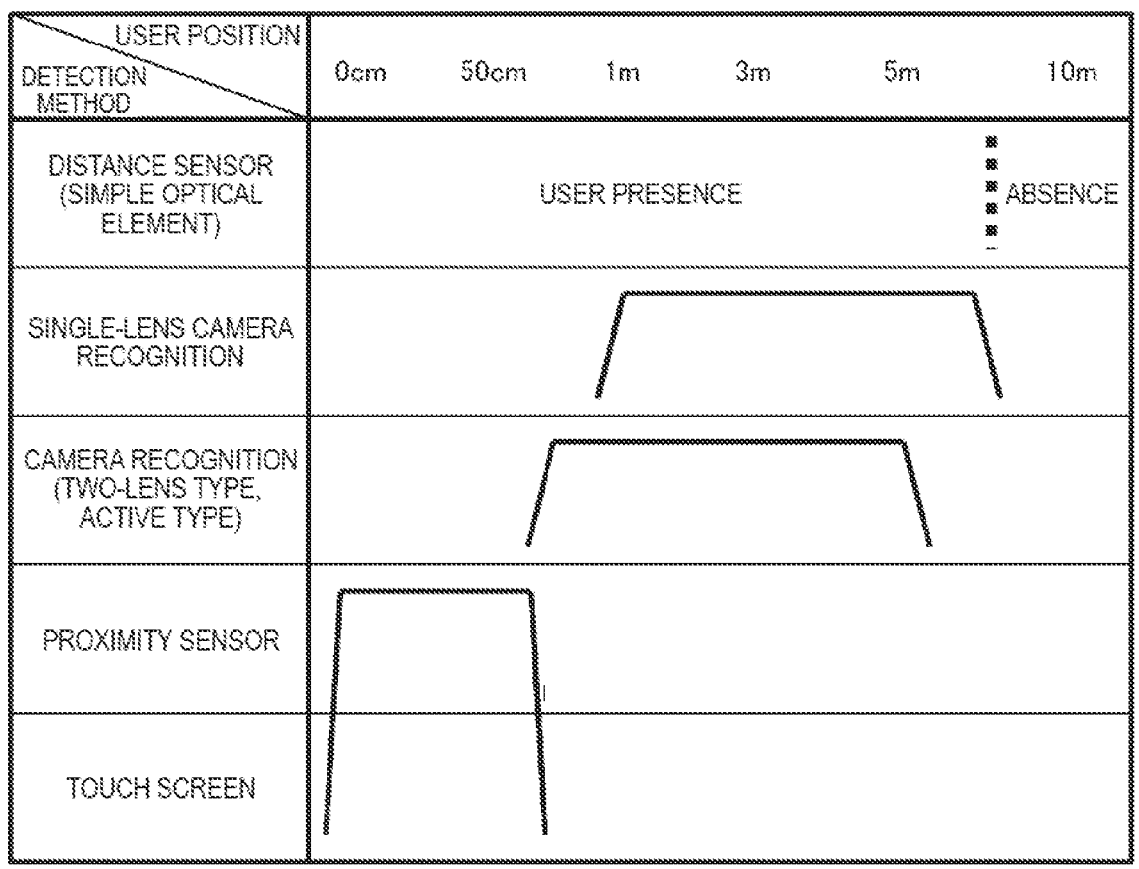
FIG. 29 is a diagram in a form of table summarizing a switching process on a distance detection system by a distance detection system switching part 2330 depending on the user position.

FIG. 29 summarizes in a form of table a switching process on the distance detection system depending on the user position by the distance detection system switching part 2330.

The distance sensor 507 includes a sensor element which is simple and little in power consumption such as a PSD sensor, pyroelectric sensor, simplified camera and the like, for example. The distance detection system switching part 2330 always turns on the distance sensor 507 in order to monitor whether or not the user is present within a radius of five to ten meters from the information processing apparatus 100, for example.

In a case where the camera part 503 uses the single-lens type, the image recognition part 504 performs motion recognition of the user by use of the background difference, face recognition, and human body recognition. The distance detection system switching part 2330 turns on the recognition (distance detection) function by the image recognition part 504 at the user position in a range of 70 centimeters to six meters in which sufficient recognition accuracy is obtained on the basis of the image taken.

In a case where the camera part 503 uses the two-lens or active type, the image recognition part 504 can obtain the sufficient recognition accuracy in a range of 60 centimeters to five meters, slightly short, and thus the distance detection system switching part 2330 turns on the recognition (distance detection) function by the image recognition part 504 at the user position in that range.

If the user comes too closer, the user's figure is prone to be out of sight of the camera part 503. Therefore, the distance detection system switching part 2330 may turn off the camera part 503 and image recognition part 504 if the user comes too closer.

A touch on the touch screen overlapped on the screen of the display part 603 is limited in a range the user's hand can reach. Therefore, the distance detection system switching part 2330 turns on a distance detection function by the touch detector 509 at the user position in a range of several ten centimeters to several tens meters. The proximity sensor 511 can detect the user in a range of up to several tens centimeters even if the user does not touch. Accordingly, the distance detection system switching part 2330 turns on the distance detection function even at the user position farther than the touch input.

As the design logic for the information processing apparatus 100 including a plurality of distance detection systems, the distance detection system detecting a distance of several meters, or ten or more meters has a purpose of confirming the presence of the user and thus, has to be always turned on, thereby preferably using the device low in power consumption. Contrary to the above, the distance detection system detecting a short distance in a range of one or less meter can acquire information with high density and has also a recognition function of the face recognition, human body recognition or the like, but consumes a large amount of power in the recognition process and the like, thereby preferably turning off the function at a distance where sufficient recognition accuracy is not obtained.

D. Real Size Displaying of Object Depending on Monitor Performance

Figure 30:
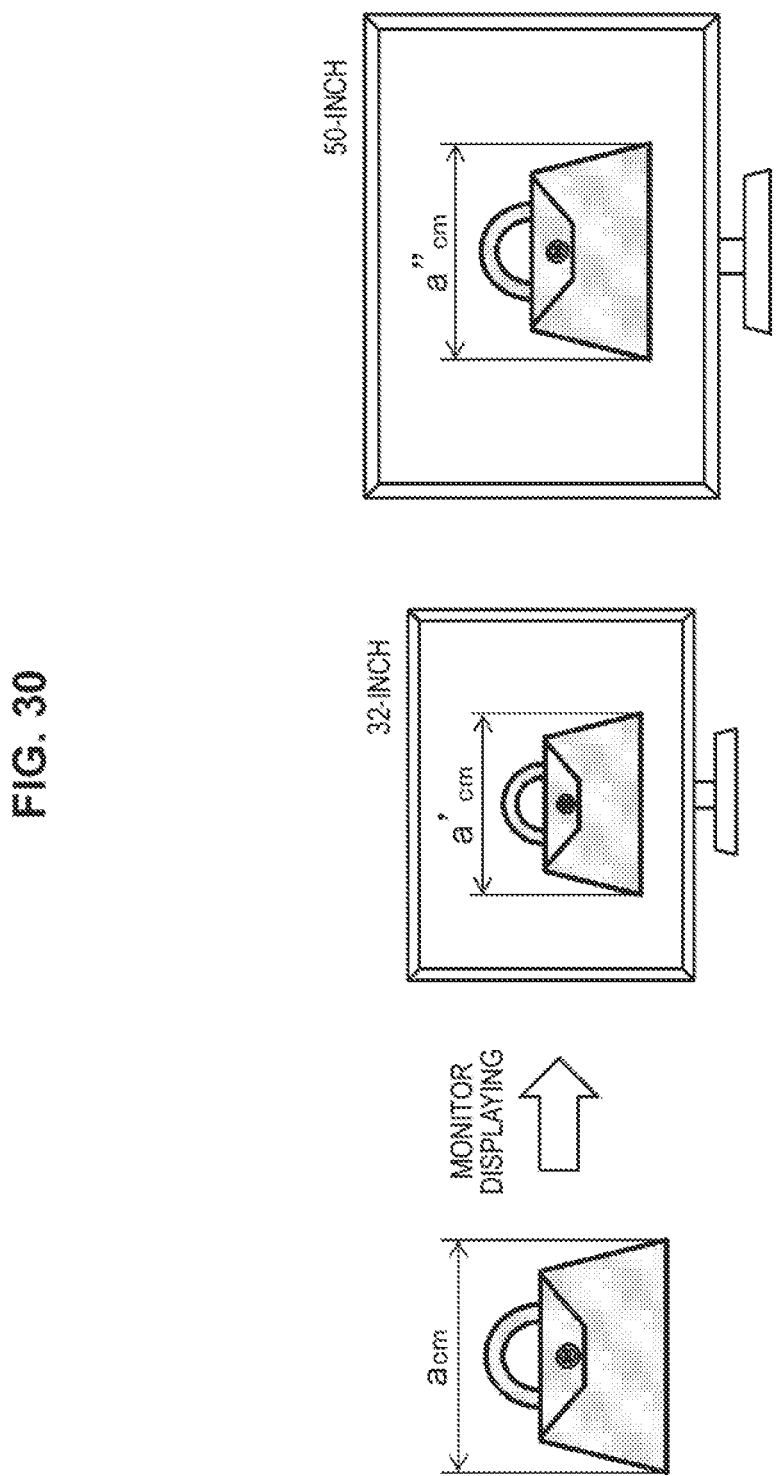
FIG. 30 is a diagram for explaining problems in the object display system of related art.

The object display system in related art displays an image of a real object on the screen without consideration of real size information thereof. For this reason, a size of the object displayed is varied depending a size or resolution (dpi) of the display. For example, a bag having a width of a centimeters is displayed on a 32-inch monitor with a width a' and on a 50-inch monitor with a width of a", where these widths are different from each other (a≠a'≠a") (refer to FIG. 30).

When images of a plurality of objects are simultaneously displayed on the same monitor, if the real size information on each object is not taken into consideration, the magnitude relation of mutual object is not correctly displayed. For example, in a case where the bag having the width of a centimeters and a pouch having a width of b centimeters are simultaneously displayed on the same monitor, the bag is displayed with a' centimeters while the pouch is displayed with b' centimeters, not correctly displaying the magnitude relation of mutual object (a:b≠a':b') (refer to FIG. 31).

For example, in online shopping for the commercial product, if a sample image thereof is not reconstructed in a real size, the user cannot precisely carry out fitting on his/her figure, possibly purchasing an incorrect commercial product. When going to simultaneously purchase a plurality of commercial products in online shopping, if the correct magnitude relation of mutual sample image is not displayed when the respective commercial product sample images are simultaneously displayed, the user cannot precisely carry out fitting in combination with the commercial products, possibly purchasing the commercial products in an improper combination.

Contrary to this, the information processing apparatus 100 according to the embodiment manages the real size information on the object intended to be display and size and resolution (pixel pitch) information on the screen of the display part 603 and always displays the object image in a real size on the screen as if the size of the object or image changes.

Figure 32:
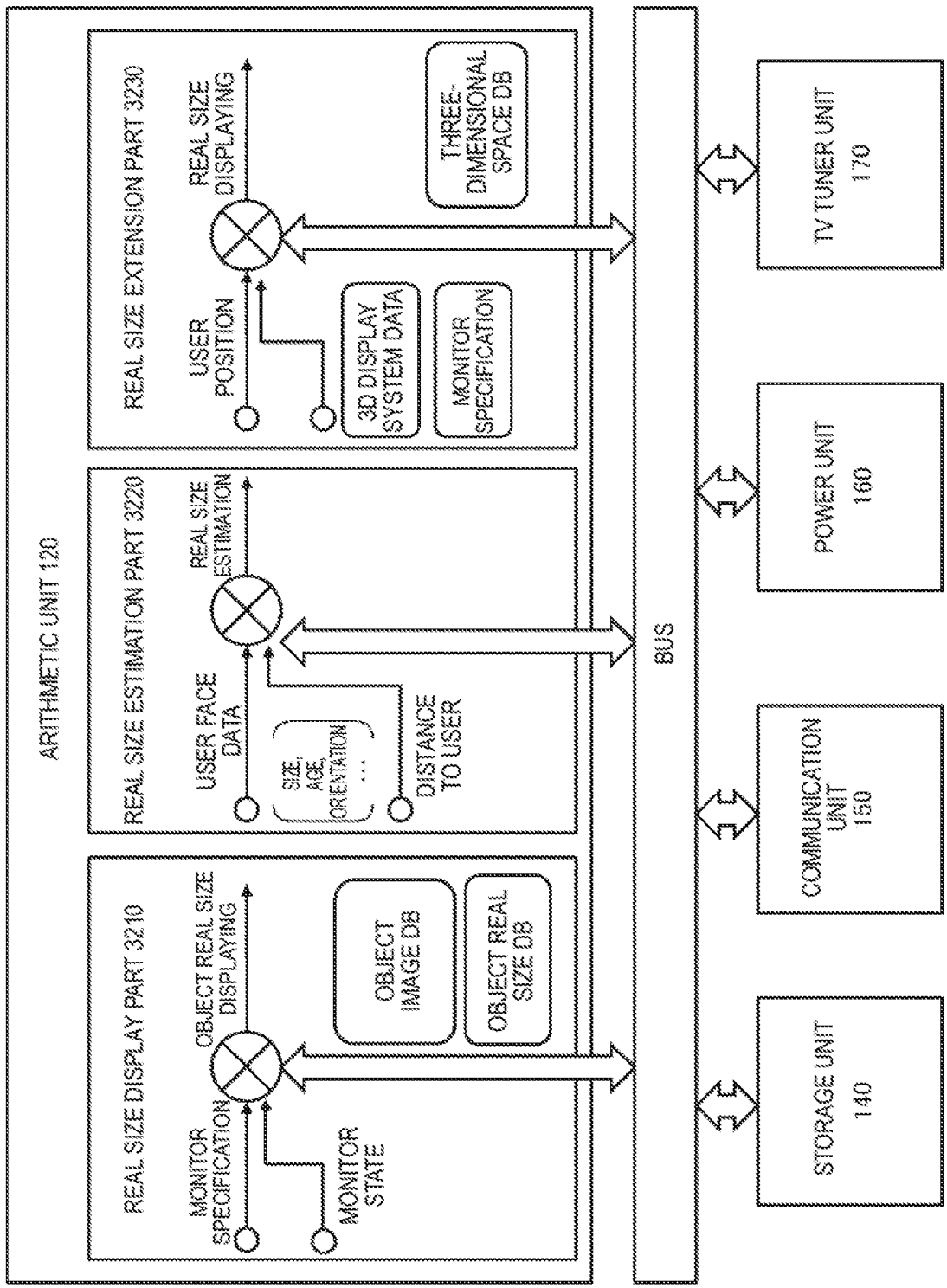
FIG. 32 is a diagram showing an internal configuration for the arithmetic unit 120 to perform a real size display process on an object depending on monitor performance.

FIG. 32 shows an internal configuration for the arithmetic unit 120 to perform a real size display process on the object depending on monitor performance. The arithmetic unit 120 includes a real size display part 3210, real size estimation part 3220, and real size extension part 3230. However, at least one function block of the real size display part 3210, real size estimation part 3220, and real size extension part 3230 is also conceived to be implemented over the cloud server which is connected via the communication unit 150.

The real size display part 3210 considers the real size information on the respective objects in simultaneously displaying a plurality of object images on the same monitor to always display in a real size depending on the size and resolution (pixel pitch) of the screen of the display part 603. The real size display part 3210 correctly displays the magnitude relation of mutual object in simultaneously displaying a plurality of object images on the screen of the display part 603.

The real size display part 3210 reads out the monitor specification of the screen of the display part 603 such as the size and resolution (pixel pitch) from the storage unit 140. The real size display part 3210 acquires a monitor state of the screen of the display part 603 such as orientation and tilt from the rotation and attachment mechanism 180.

The real size display part 3210 read out an image of an object intended to be displayed from an object image database in the storage unit 140 and reads out the real size information on the object from an object real size database. However, the object image database and object real size database is conceived to be on the cloud sever connected via the communication unit 150.

Then, the real size display part 3210 performs a conversion process on the object image on the basis of the monitor performance and monitor state such that the object intended to be displayed is displayed in a real size on the screen of the display part 603 (or with the correct magnitude relation between a plurality of objects being attained). In other words, even when the image of the identical object is displayed on a screen having a different monitor specification, a=a'=a" holds as shown in FIG. 33.

When the real size display part 3210 simultaneously displays images of two objects different in a real size from each other on the same screen, a:b=a':b' holds, that is, the correct the magnitude relation of mutual object is displayed as shown in FIG. 34.

For example, in online shopping of the commercial product by the user through the display of the sample image, the information processing apparatus 100 can achieve the real size displaying of the object and display a plurality of sample images with the correct magnitude relation as described above, and thereby the user can precisely carry out fitting of the commercial product, less possibly selecting an incorrect commercial product.

An explanation is added with an example in which the real size displaying of the object image in the real size display part 3210 is applied to an application for online shopping. In response to that the user touches an image of a commercial product he/she wants on a display screen for a catalogue, displaying of the image of the commercial product is switched to the real size displaying (refer to FIG. 35). The image subjected to the real size displaying can be rotated or changed in attitude to display the object in a real size with the orientation thereof changed in accordance with the user touch operation (refer to FIG. 36).

The real size estimation part 3220 performs a process for estimating a real size of an object, such as a people taken by camera part 503, of which the real size information cannot be acquired even if referring to the object real size database object. For example, in a case where an object of which real size is estimated is a user's face, a user real size is estimated on the basis of user face data including a user's face size, age, and orientation obtained from the image recognition of an image taken by the camera part 503 by the image recognition part 504 and the user position acquired by the distance detection system switched by the distance detection system switching part 2330.

The estimate real size information on the user is fed back to the real size display part 3210 and, for example, stored in the object image database. Then, the real size information estimated from the user face data is used for the real size displaying thereafter in the real size display part 3210 depending on the monitor performance.

For example, as shown in FIG. 37A, when an operated object including an taken image of a subject (baby) is displayed, the real size estimation part 3220 estimates a real size on the basis of the face data thereof. Even if the user tries to extend and display the operated object by the touch operation and the like after that, the subject is not displayed in a size exceeding the real size thereof as shown in FIG. 37B. In other words, the baby image is not extended to an unnatural size and reality of the image is kept.

When the network content and content taken by the camera part 503 are displayed on the screen of the display part 603 in parallel or to be superimposed, the normalization process is performed on the content video on the basis of the estimated real size, achieving the harmonized parallel or superimposed displaying.

Further, the real size extension part 3230 achieves 3D displaying with respect to the real size displaying of the object achieved on the screen of the display part 603 in the real size display part 3210, that is, with a depth direction being taken into account. Note that in a case of 3D display by use of a binocular system or light beam reconstruction system only in the horizontal direction, a desired effect can be obtained only at a viewing position estimated upon generating a 3D video. An omnidirectional light beam reconstruction system can display in real size from any position.

The real size extension part 3230 detects a viewpoint position of the user also in the binocular system and light beam reconstruction system only in the horizontal direction to correct the 3D video onto that position, and thereby similar real size displaying can be obtained from any position.

For example, JP 2002-300602A, JP 2005-149127A, and JP 2005-142957A already assigned to the present applicant are to be referred to.

E. Simultaneously Display of Image Group

In some cases, a display system simultaneously displays the video contents of a plurality of sources on the same screen in a form of parallel or superimposing. For example, there can be included (1) a case where a plurality of users video-chat with each other, (2) a case where an instructor video reproduced from a storage medium such as a DVD (or streaming-reproduced via the network) and the user's own video by taken the camera part 503 are simultaneously displayed in a lesson of yoga or the like, (3) in online shopping, the commercial product sample image and the user's own video taken by the camera part 503 are displayed to be superimposed on each other to carry out fitting.

Figure 38A:
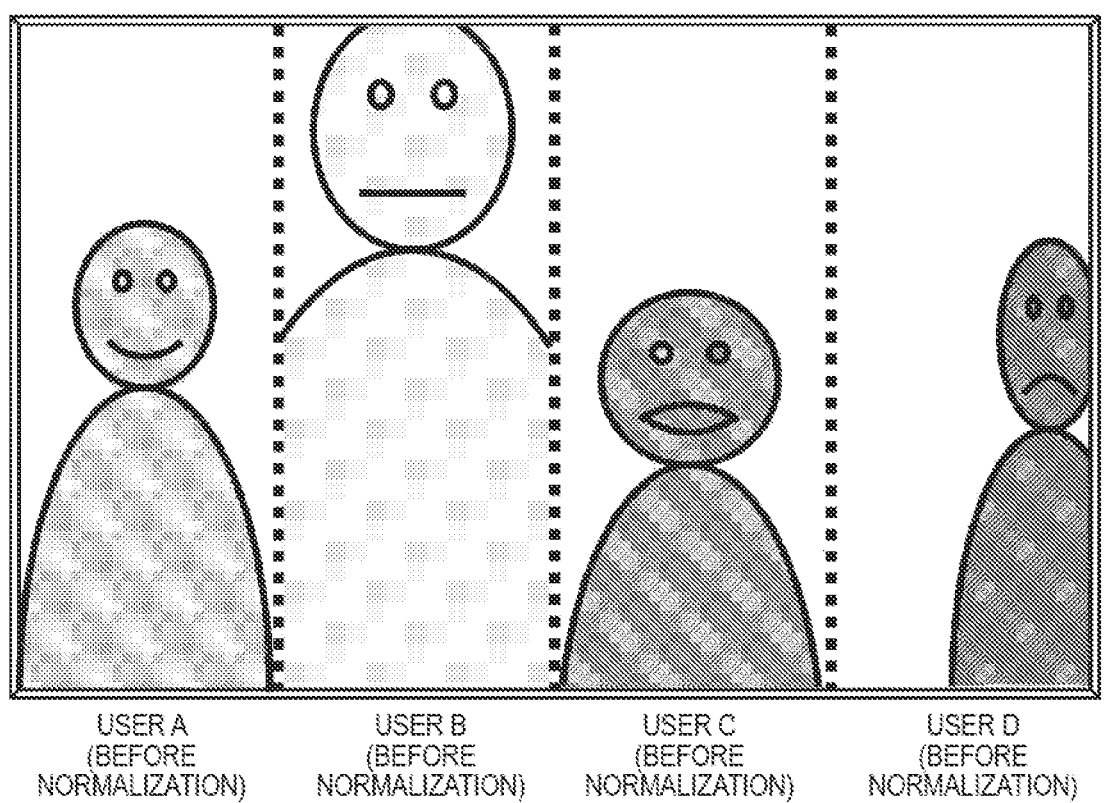
FIG. 38A is a diagram showing a situation where the users video-chatting are displayed with sizes or positions of their faces being varied from each other.
Figure 39A:
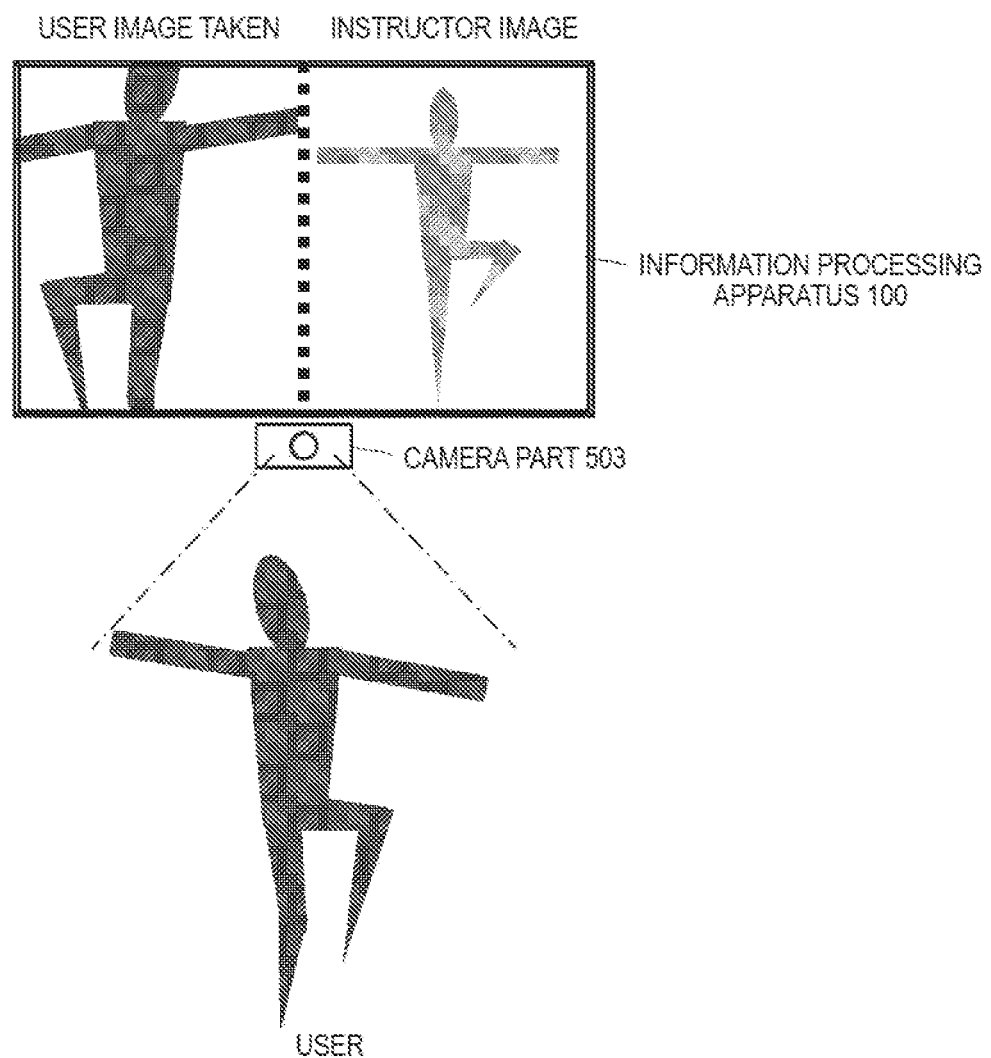
FIG. 39A is a diagram showing a situation where a user's figure and an instructor's figure are displayed on the screen in parallel with sizes or positions thereof being not uniformed.
Figure 40A:
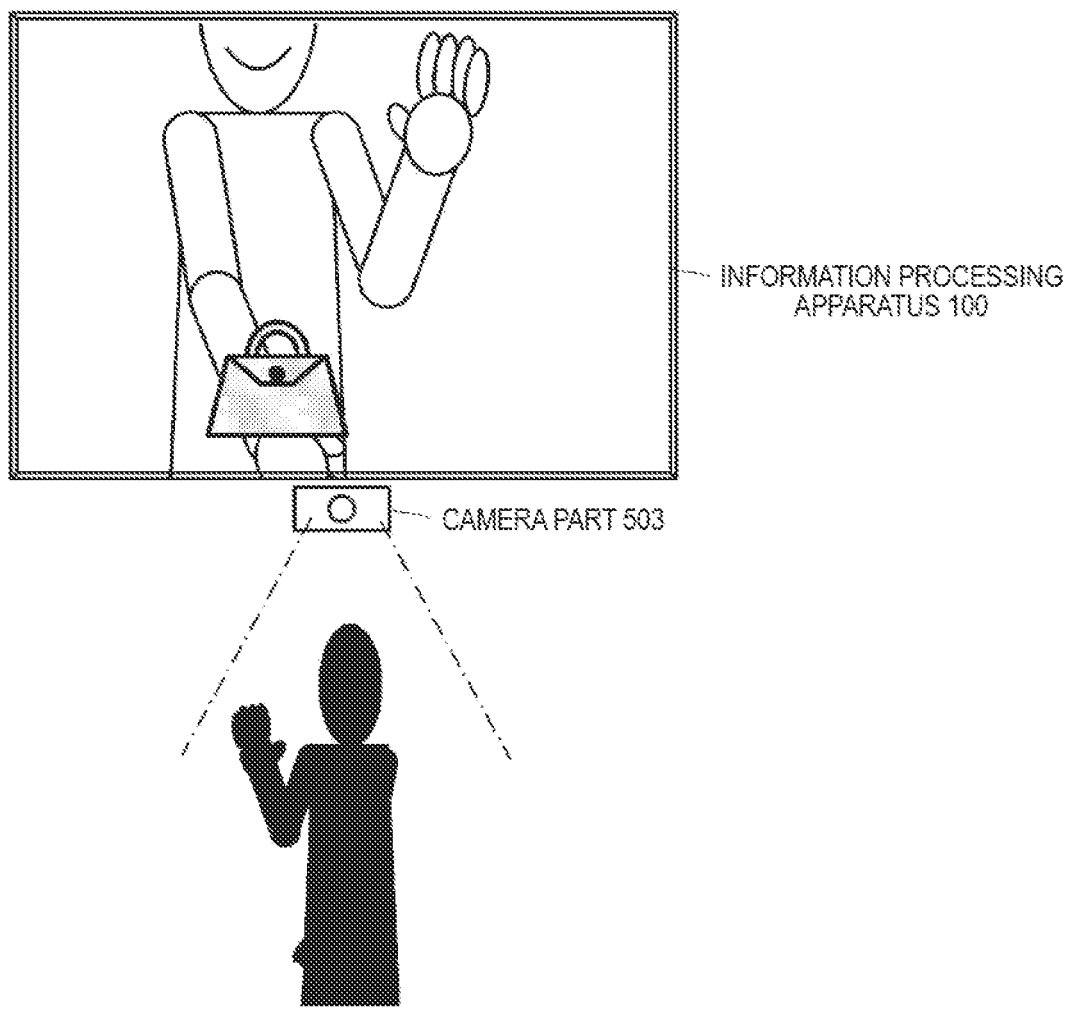

In any case of the above (1) to (3), unless the correct magnitude relation between the images simultaneously displayed is displayed, the user cannot properly use the displayed video. For example, if the users video-chatting have the sizes or positions of displayed faces thereof varied from each other (FIG. 38A), a face-to-face property with someone to chat to is failed and good conversation is not made. In addition, unless the sizes and positions the user's figure and instructor's figure are uniformed (FIG. 39A), the user may not easily find out the difference between his/her motion and the instructor's motion and may not get the point to be altered or improved, not producing adequate results of the lessons. Unless the commercial product sample image is superimposed on the user's own video who poses as if to pick up the commercial product at the adequate location with the correct magnitude relation, the user may not easily determine whether or not the commercial product fits him/her, making precisely fitting difficult (FIG. 40A).

Contrary to this, the information processing apparatus 100 according to the embodiment normalizes the images with each other using information on the image scale or corresponding region to display in parallel or to be superimposed in the case of displaying the video contents of a plurality of sources in parallel or to be superimposed. In normalization, an image processing such as a digitally zoom process is performed on digital image data including the still image and moving picture. In a case where one of the images displayed in parallel or to be superimposed is an image taken by the camera part 503, an actual camera is optically controlled such as pan, tilt and zoom.

The normalization process on an image can be easily achieved the information of a user's face size, age, and orientation obtained by the face recognition, and information of a body shape or size obtained by the human recognition. In the parallel or superimposed displaying of a plurality of images, one of the images is automatically subjected to a process of mirroring or rotating to facilitate the operation with respect to the other image.

Figure 38B:
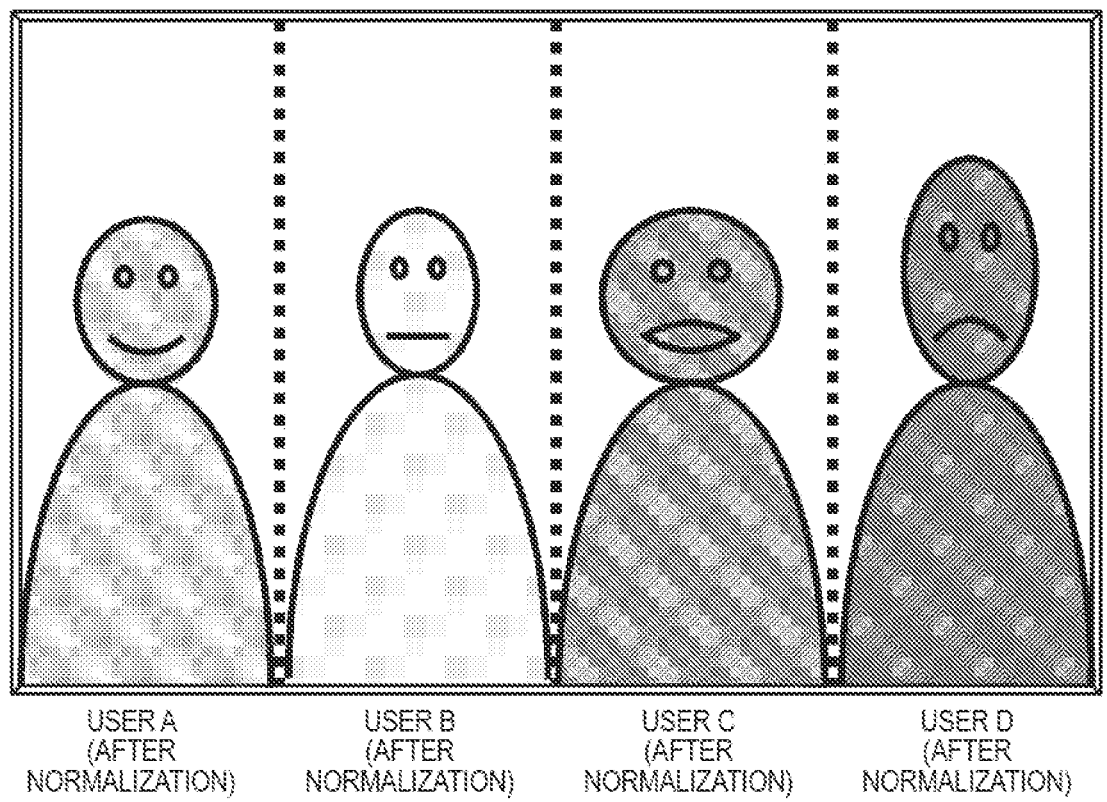
FIG. 38B is a diagram showing a situation where the normalization process performed across a plurality of images allows the users video-chatting to be displayed with the sizes or positions of their faces being uniformed.
Figure 39B:
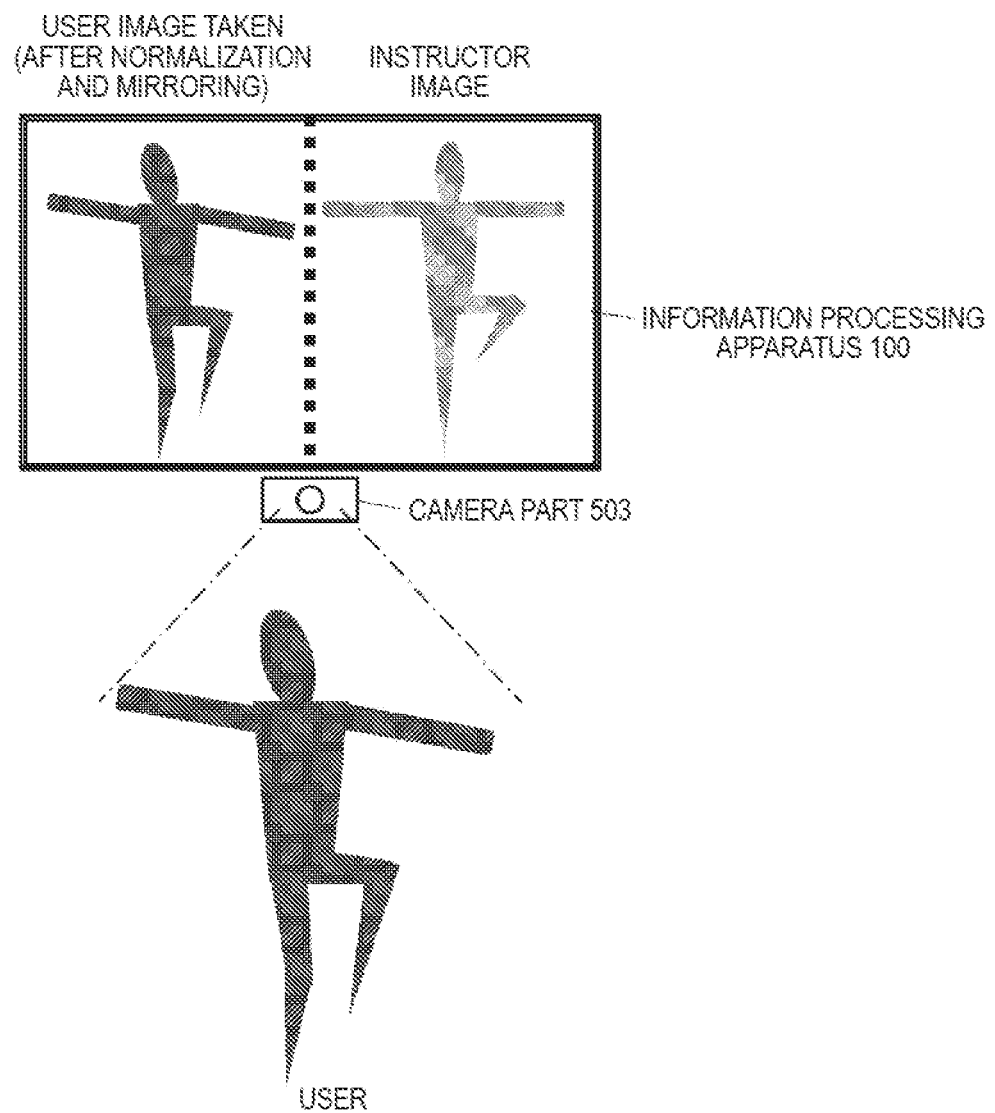
FIG. 39B is a diagram showing a situation where the normalization process performed across a plurality of images allows the user's figure and the instructor's figure to be displayed on the screen in parallel with the sizes or positions of their faces being uniformed.
Figure 39C:
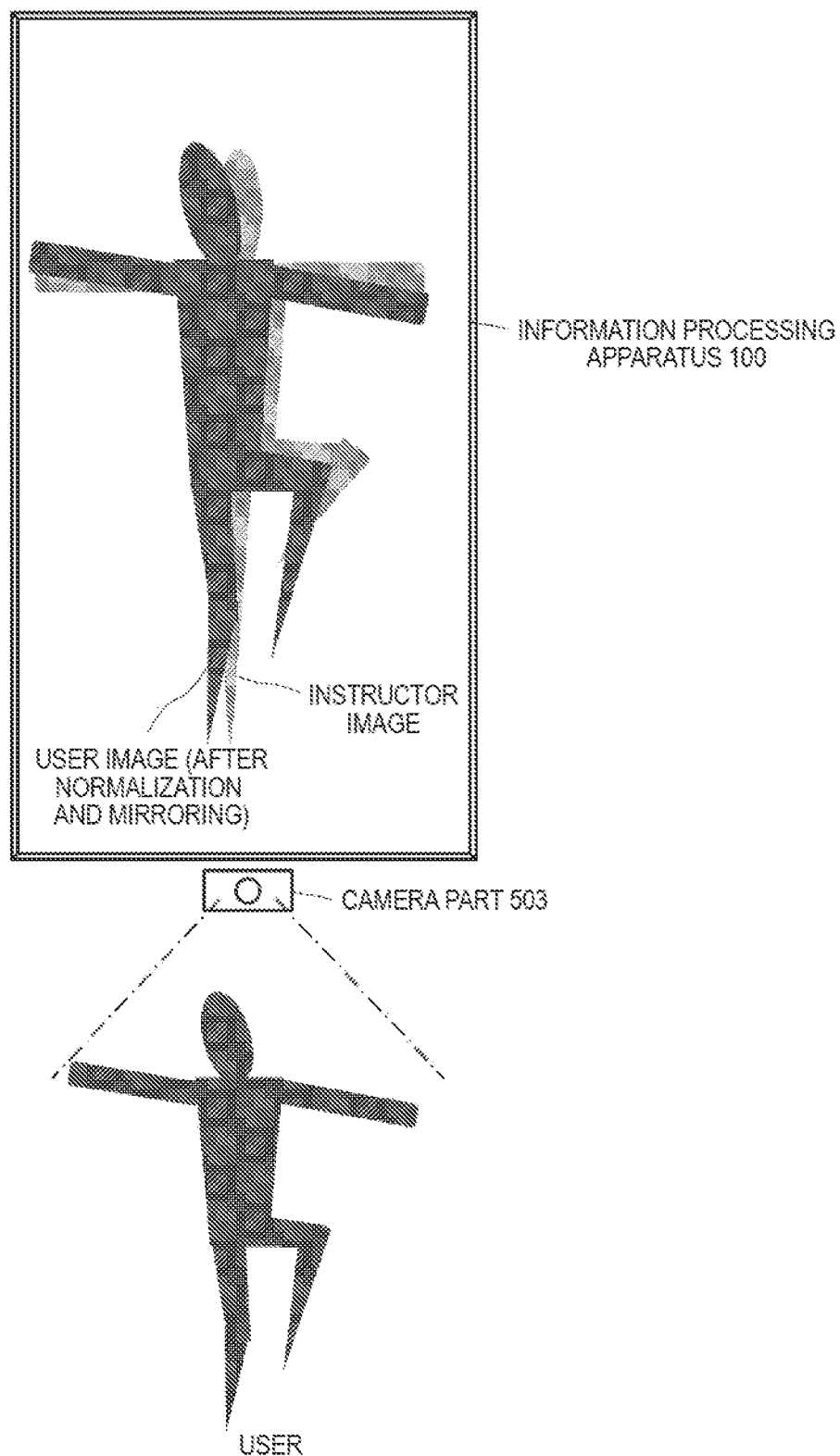
FIG. 39C is a diagram showing a situation where the normalization process performed across a plurality of images normalizes the user's figure, which is displayed to be superimposed on the instructor's figure.
Figure 40B:
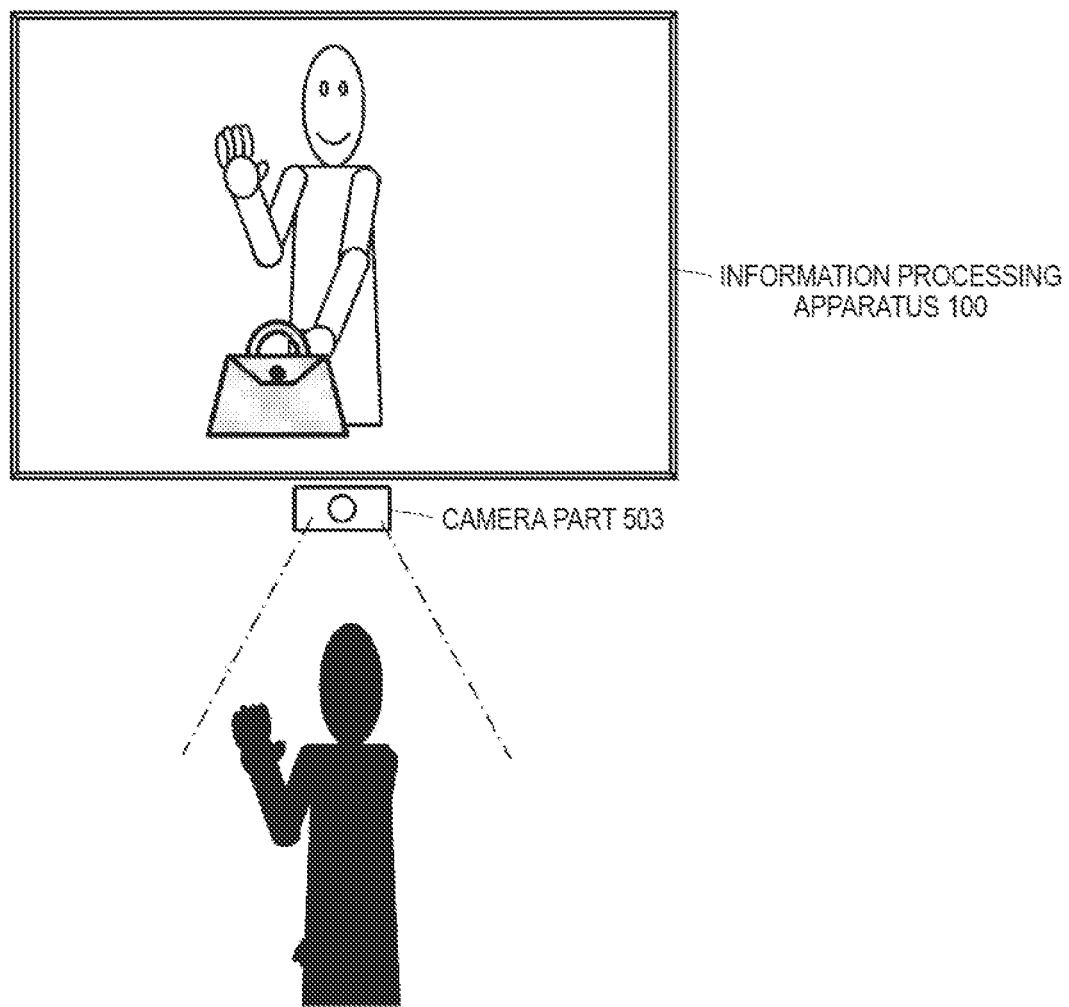
FIG. 40B is a diagram showing a situation where the normalization process performed across a plurality of images allows the commercial product sample image to be displayed to be superimposed on the user's own video at an adequate location with the correct magnitude relation.

FIG. 38B shows a situation where the normalization process performed across a plurality of images allows the users video-chatting to be displayed with the sizes or positions of their faces being uniformed. FIG. 39B shows a situation where the normalization process performed across a plurality of images allows the user's figure and the instructor's figure to be displayed on the screen in parallel with the sizes or positions of their faces being uniformed. FIG. 40B shows a situation where the normalization process performed across a plurality of images allows the commercial product sample image to be superimposed on the user's own video who poses as if to pick up the commercial product at an adequate location with the correct magnitude relation. Here, in FIG. 39B or FIG. 40B, the user is subjected to not only the normalization process on the magnitude relation but also the mirroring in order to easily correct his/her attitude from the image taken by the camera part 503. Additionally, the rotation process may be performed, if necessary, in some cases. If the normalization process can be performed on the user's figure and the instructor's figure, these are not only displayed in parallel as shown in FIG. 39B but also can be displayed to be superimposed on each other as shown in FIG. 39C, allowing the user to easily visually confirm a difference between his/her attitude and the instructor's attitude.

Figure 41:
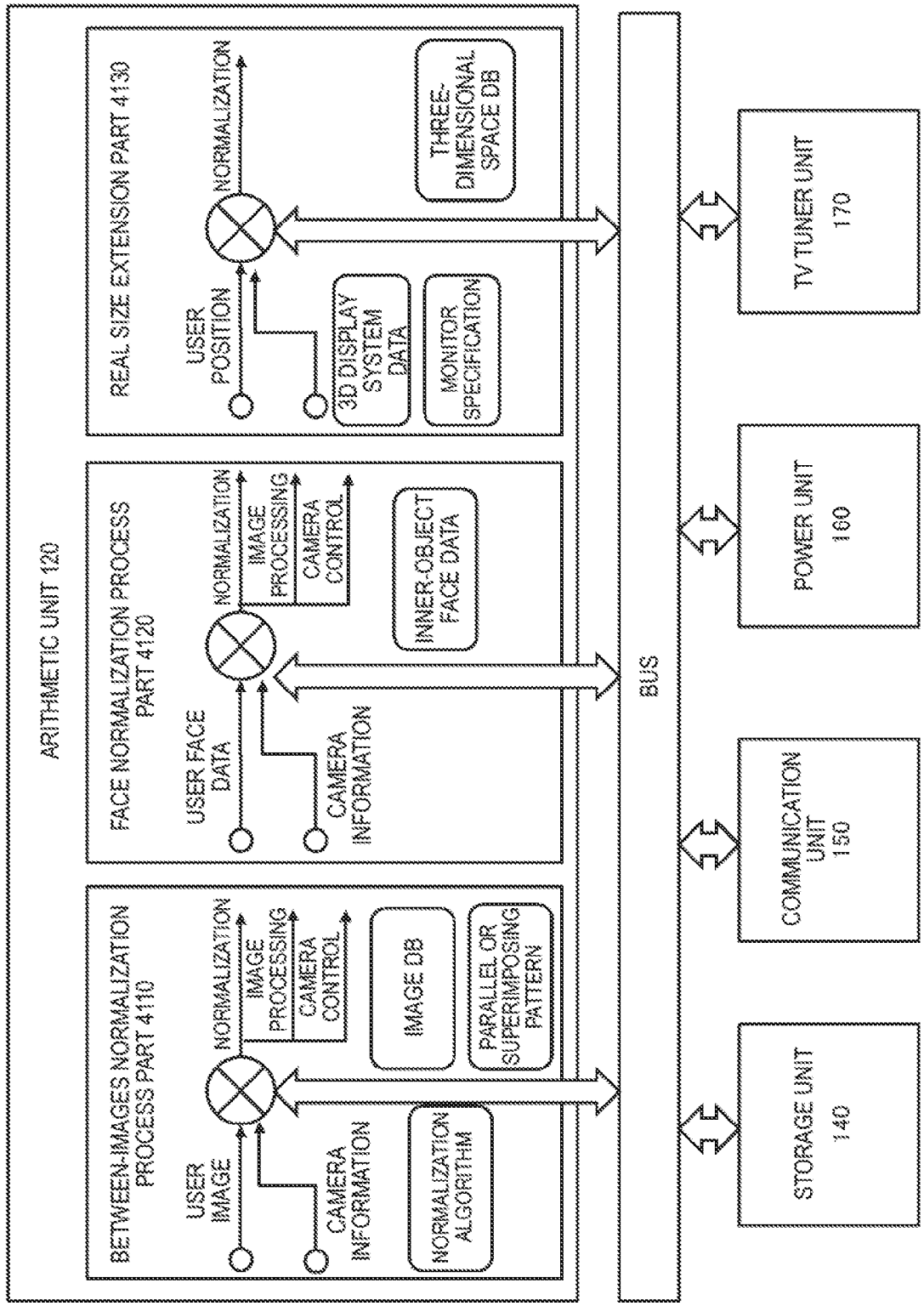
FIG. 41 is a diagram showing an internal configuration for the arithmetic unit 120 to perform the normalization process on an image.

FIG. 41 shows an internal configuration for the arithmetic unit 120 to perform the normalization process on an image. The arithmetic unit 120 includes a between-images normalization process part 4110, face normalization process part 4120, and real size extension part 4130. However, at least one function block of the between-images normalization process part 4110, face normalization process part 4120, and real size extension part 4130 is also conceived to be implemented over the cloud server which is connected via the communication unit 150.

The between-images normalization process part 4110 performs the normalization process such that the correct magnitude relation between the user's face image and other objects are displayed among a plurality of images.

The between-images normalization process part 4110 inputs the user image taken by the camera part 503 through the input interface integration part 520. At that time, the camera information of the camera part 503 such as pan, tilt and zoom when the user image is taken is also together acquired. The between-images normalization process part 4110 acquires other objects images which are displayed in parallel with or to be superimposed on the user image and acquires a pattern for parallel or superimposing display of the user image and other objects images from a image database. The image database may be sometimes located in the storage unit 140 or in a database server accessed via the communication unit 150.

Then, the between-images normalization process part 4110 performs the image processing on the user image such as the extending, rotating and mirroring in accordance with a normalization algorithm with such that the magnitude relation with other objects or attitude is correct, and generates the camera control information for controlling the camera part 503 such as pan, tilt and zoom such that an appropriate user image is taken. The process by the between-images normalization process part 4110 allows the user image to be displayed with the correct magnitude relation with other objects images being attained as shown in FIG. 40B, for example.

The face normalization process part 4120 performs the normalization process such that the user's face image taken by the camera part 503 are displayed with the correct magnitude relation with a face image within another operated object (e.g., the instructors' face in the image reproduced from the storage medium or the face of another user to chat).

The face normalization process part 4120 inputs the user image taken by the camera part 503 through the input interface integration part 520. At that time, the camera information of the camera part 503 such as pan, tilt and zoom when the user image is taken is also together acquired. The face normalization process part 4120 acquires the face image within another operated object displayed in parallel with or to be superimposed on the taken user image through the storage unit 140 or communication unit 150.

Then, the face normalization process part 4120 performs the image processing on the user image such as the extending, rotating and mirroring with the correct magnitude relation of mutual face image being attained, and generates the camera control information for controlling the camera part 503 such as pan, tilt and zoom such that an appropriate user image is taken. The process by the face normalization process part 4120 allows the user image to be displayed with the correct magnitude relation with other face images being attained as shown in FIG. 38B, FIG. 39B, and FIG. 39C, for example.

Further, the real size extension part 4130 achieves 3D displaying with respect to the parallel or superimposed displaying of a plurality of images achieved on the screen of the display part 603 in the between-images normalization process part 4110 or between-images normalization process part 4110, that is, with a depth direction being taken into account. Note that in a case of 3D display by use of a binocular system or light beam reconstruction system only in the horizontal direction, a desired effect can be obtained only at a viewing position estimated upon generating a 3D video. An omnidirectional light beam reconstruction system can display in real size from any position.

The real size extension part 4130 detects a viewpoint position of the user also in the binocular system and light beam reconstruction system only in the horizontal direction to correct the 3D video onto that position, and thereby similar real size displaying can be obtained from any position.

For example, JP 2002-300602A, JP 2005-149127A, and JP 2005-142957A already assigned to the present applicant are to be referred to.

F. Video Content Display Method in Rotating Screen

As is already described, the information processing apparatus 100 body according to the embodiment is attached in a state of being rotatable and detachable on the wall by a rotation and attachment mechanism 180, for example. The body is operated to be rotated while the information processing apparatus 100 is powered on, that is, the operated object is being displayed on the display part 603, which is accompanied by that the operated object is subjected to the rotation process such that the user may observe the operated object in a correct attitude.

An explanation is given below of a method for optimally adjust a display formation of video contents at any rotation angle or during transition of the rotation of the information processing apparatus 100 body.

As the display formation of video contents at any rotation angle or during transition of the rotation, there can be included three formations (1) display formation in which the video content is not out of the screen at all at any rotation angle (2) display formation in which a content of interest in the video content becomes maximum is at each rotation angle, and (3) display formation in which the video content is rotated so as not to bring about an invalid region.

Figure 42:
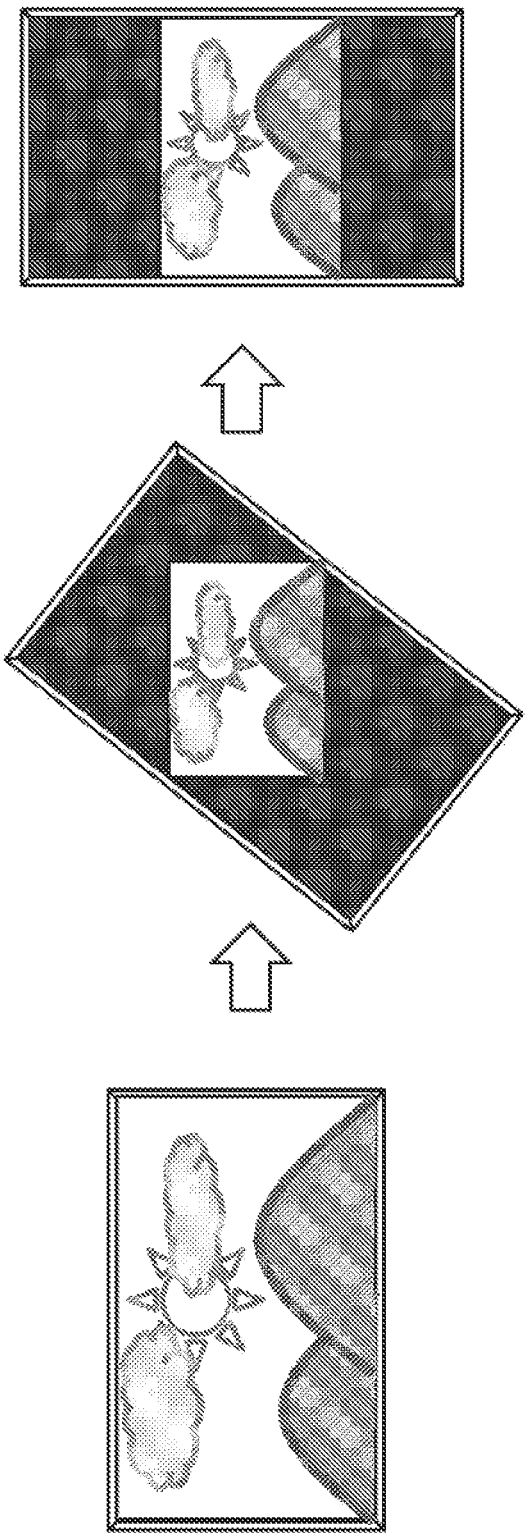
FIG. 42 is a diagram showing a display formation in which an entire region of video content is displayed such that the video content is not out of the screen at all at any rotation angle.

FIG. 42 illustrates the display formation in which an entire region of video content is displayed such that the video content is not out of the screen at all at any rotation angle while the information processing apparatus 100 (screen) is being counterclockwise rotated by 90 degrees. As is shown in the figure, when horizontally long video content is displayed a screen in landscape orientation, if the screen is counterclockwise rotated by 90 degrees so as to be in portrait orientation, the video content is reduced in size and an invalid region expressed in black appears in the screen. During a transition while the screen is moved from the landscape orientation to the portrait orientation, the video content becomes the minimum in size.

If at least a part of the video content is out of the screen, the video content as a copyrighted work disadvantageously loses the identity. The display formation as shown in FIG. 42 is always assured of the identity as a copyrighted work at any rotation angle or during transition of the rotation. In other words, this display formation can be said to be appropriate to a protected content.

Figure 43:
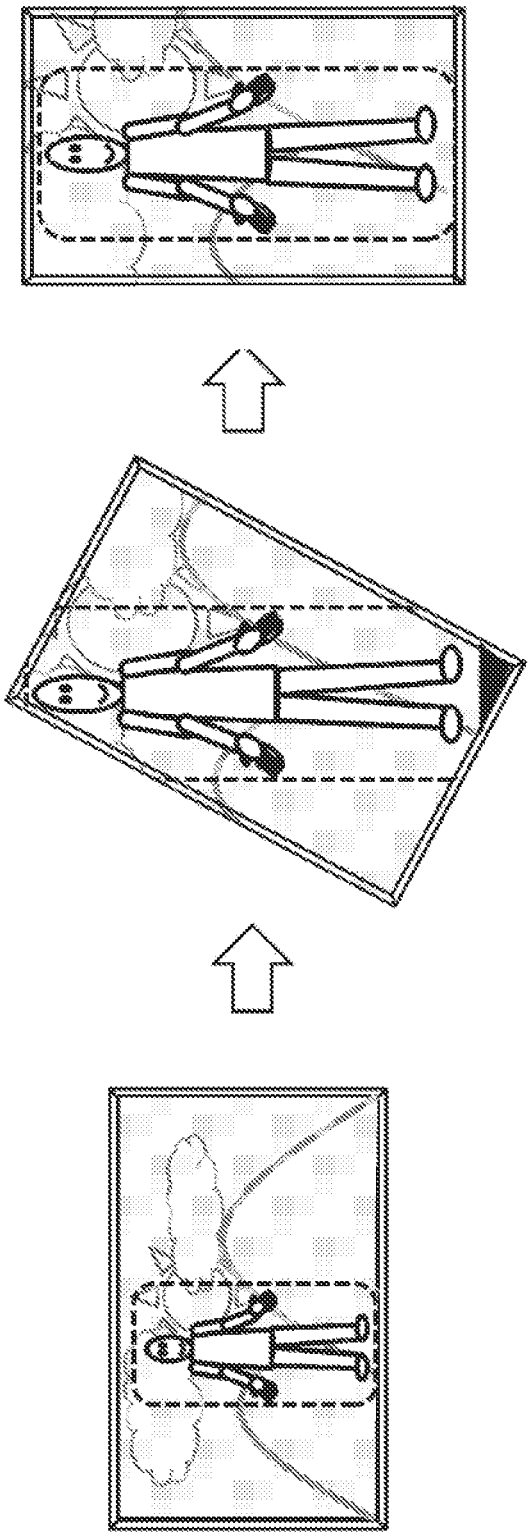
FIG. 43 is a diagram showing a display formation in which a region of interest in the video content becomes maximum at each rotation angle.

FIG. 43 illustrates the display formation in which a region of interest in the video content becomes maximum at each rotation angle while the information processing apparatus 100 (screen) is being counterclockwise rotated by 90 degrees. In the figure, a region containing a subject enclosed with a dotted line in the video content is set as a region of interest in order that this region of interest becomes maximum at each rotation angle. If the region of interest, which has a vertically long shape, is moved from the landscape orientation to the portrait orientation, the video content extends. During transition from the landscape orientation to the portrait orientation, the region of interest extends to the maximum in a screen diagonal direction. During transition from the landscape orientation to the portrait orientation, the invalid region expressed in black appears in the screen.

As a display formation focusing on the region of interest in the video content, a modification example is also considered in which the video content is rotated with a size of the region of interest kept constant. The region of interest seems to be smoothly rotated with the screen rotation, but the invalid region is extended.

Figure 44:
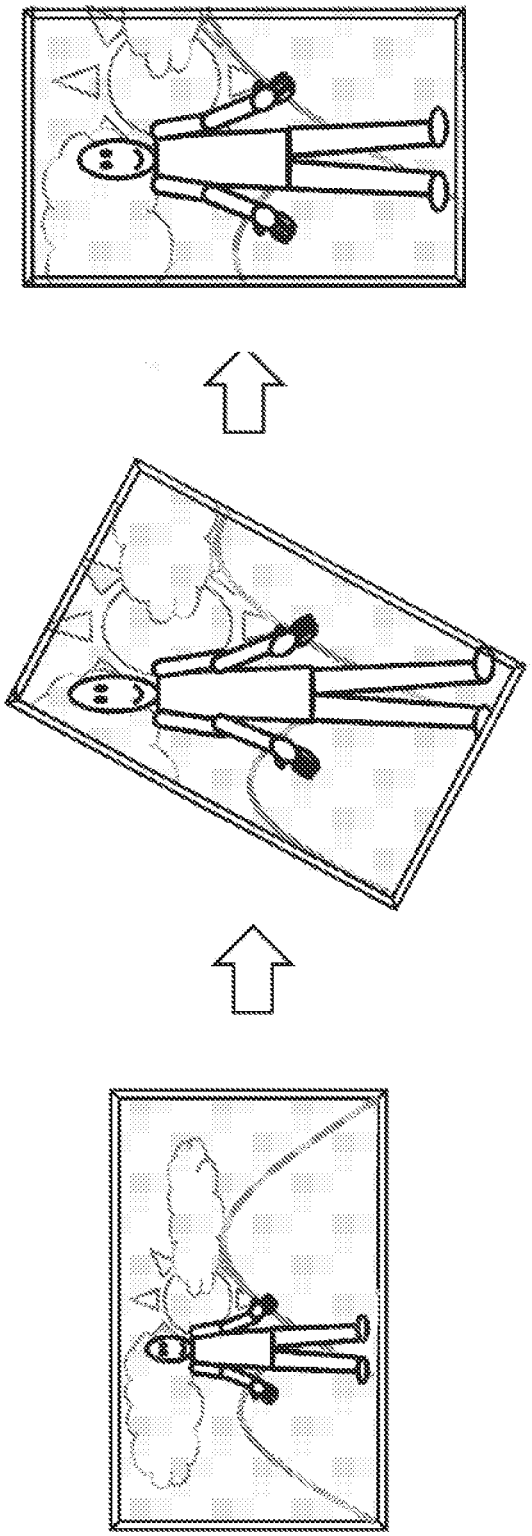
FIG. 44 is a diagram showing a display formation in which the video content is rotated so as not to bring about an invalid region.

FIG. 44 illustrates the display formation in which the video content is rotated so as not to bring about an invalid region while the information processing apparatus 100 (screen) is being counterclockwise rotated by 90 degrees.

Figure 45:
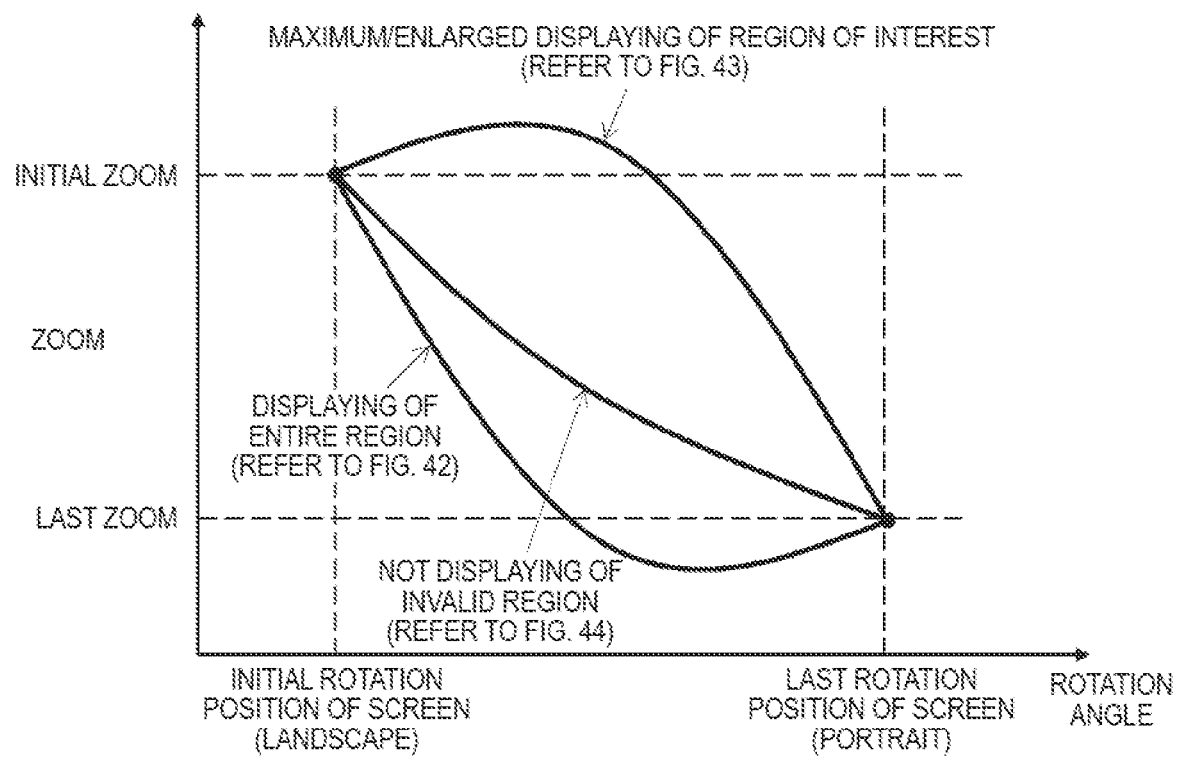
FIG. 45 is a diagram showing a zoom ratio relationship for the video content with respect to a rotational position among the display formations shown in FIG. 42 to FIG. 44.

FIG. 45 shows a zoom ratio relationship for the video content with respect to a rotational position among the display formations shown in FIG. 42 to FIG. 44. In the display formation in which the video content is not out of the screen at all at any rotation angle shown in FIG. 42, the content can be protected but a big invalid region brings about during transition. Additionally, the video is reduced in size during transition, which raises a concern that the user may be given an uncomfortable feeling. In the display formation in which the region of interest in the video content becomes maximum at each rotation angle shown in FIG. 43, the region of interest can be more smoothly displayed during transition while the screen is rotated, but the invalid region brings about during transition. In the display formation shown in FIG. 44, the invalid region does not bring about during transition, but the video content extends bigger during transition, which raises a concern that the user observing may be given an unnatural impression.

Figure 46:
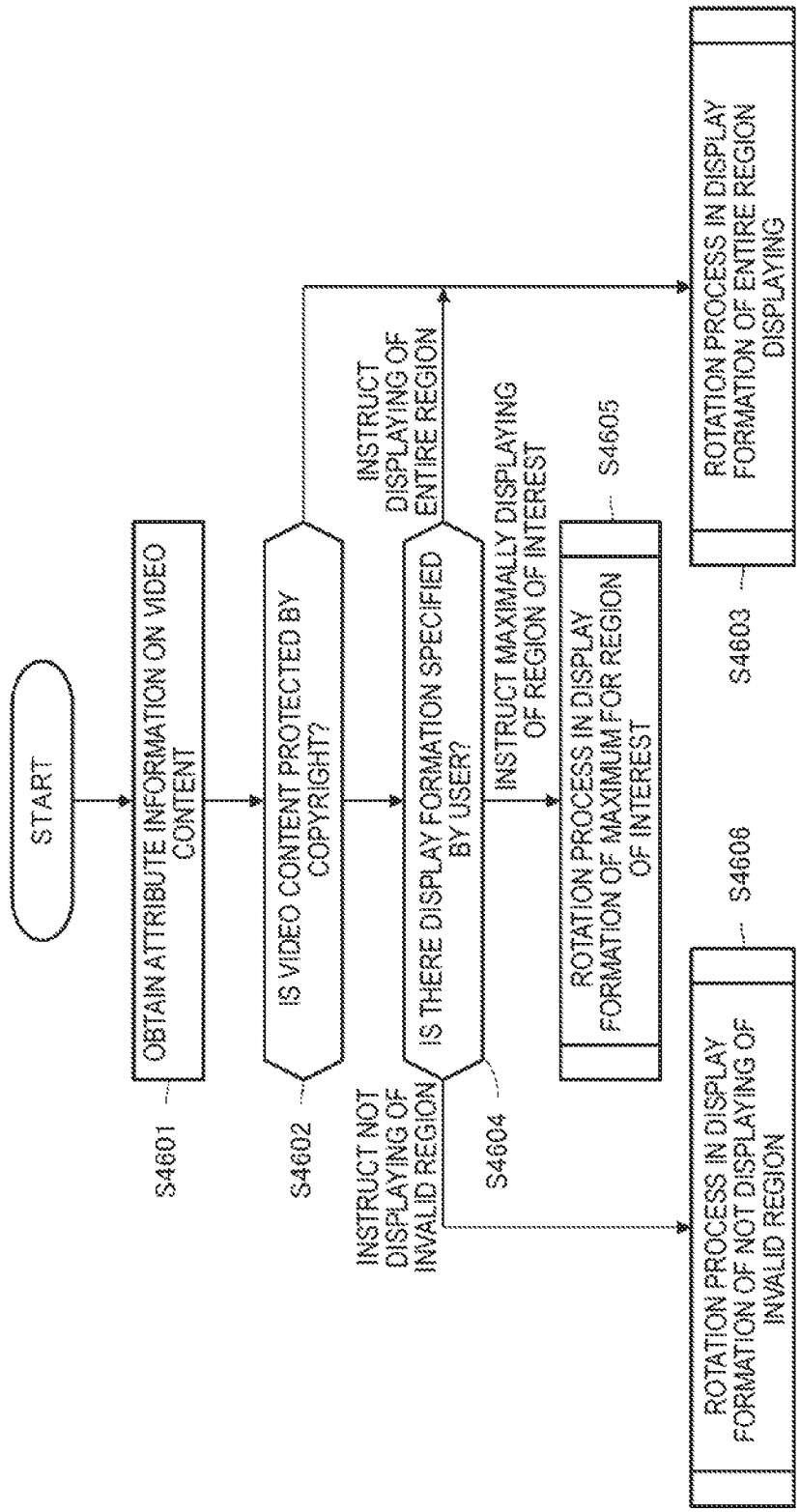
FIG. 46 is a flowchart showing a procedure for controlling the display formation of video contents by the arithmetic unit 120 when rotating the information processing apparatus 100.

FIG. 46 shows a procedure for controlling the display formation of video contents by the arithmetic unit 120 when rotating the information processing apparatus 100 (screen of the display part 603) in a form of a flowchart. The procedure is activated in response to detecting by the rotation and attachment mechanism 180 that the information processing apparatus 100 body is rotating or detecting by the triaxial sensor 515 that the rotational position of the information processing apparatus 100 body is varied, for example.

When the information processing apparatus 100 (the screen of the display part 603) is rotated, the arithmetic unit 120 firstly obtains attribute information on the video content displayed on the screen (step S4601). Then, whether or not the video content displayed on the screen is a content protected by copyright or the like is checked (step S4602).

Here, if the video content displayed on the screen is a content protected by copyright or the like (Yes at step S4602), the arithmetic unit 120 selects the display formation as shown in FIG. 42 in which an entire region of video content is displayed such that the video content is not out of the screen at all at any rotation angle (step S4603).

If the video content displayed on the screen is not a content protected by copyright or the like (No at step S4602), subsequently whether or not there is the display formation specified by the user is checked (step S4604).

When the user selects the display formation in which an entire region of the video content is displayed, the process proceeds to step S4603. When the user selects the display formation in which the region of interest is maximally displayed, the process proceeds to step S4605. When the user selects display formation in which the invalid region is not displayed, the process proceeds to step S4606. When the user does not select any display formation, a display formation set as a default value of the above three display formations is selected.

Figure 47:
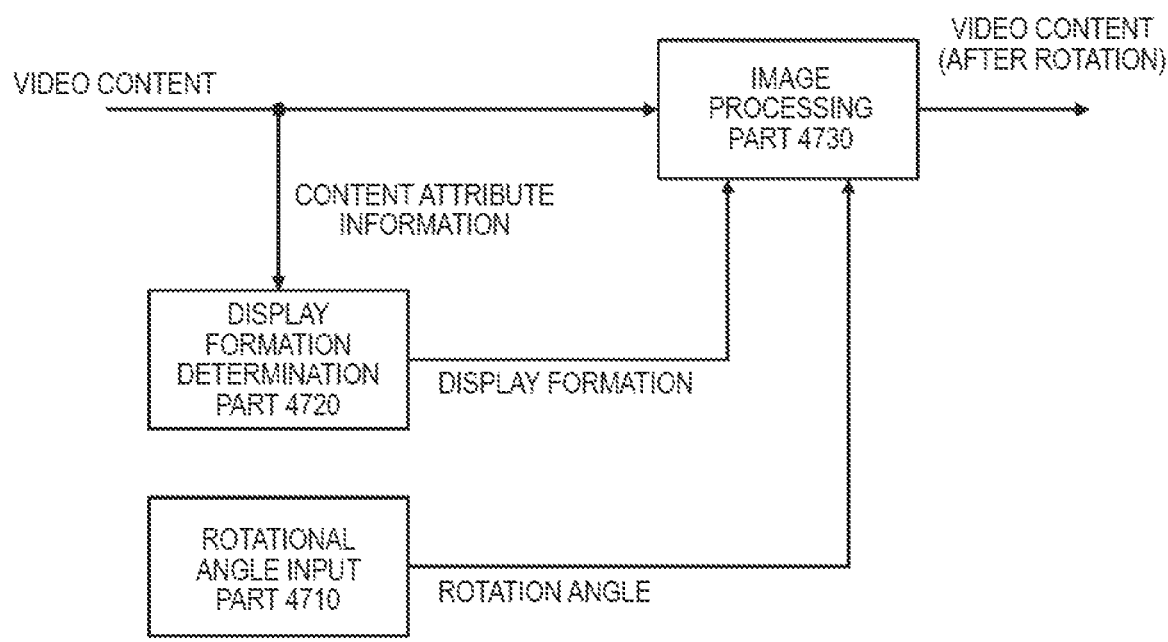
FIG. 47 is a diagram showing an internal configuration for the arithmetic unit 120 to perform an adjustment process on the display formation of the video contents when the information processing apparatus 100 body is at any rotation angle or during transition of the rotation.

FIG. 47 shows an internal configuration for the arithmetic unit 120 to perform an adjustment process on the display formation of the video contents when the information processing apparatus 100 body is at any rotation angle or during transition of the rotation. The arithmetic unit 120 includes a display formation determination part 4710, rotational position input part 4720, and image processing part 4730, and adjusts the display formation of video contents reproduced from the received TV broadcast or medium.

The display formation determination part 4710 determines a display formation in which the video content is rotated when the information processing apparatus 100 body is at any rotation angle or during transition of the rotation, in accordance with the procedure shown in FIG. 46.

The rotational position input part 4720 inputs the rotational position of the information processing apparatus 100 body (or the screen of the display part 602) obtained by way of the rotation and attachment mechanism 180 or triaxial sensor 515 via the input interface integration part 520.

The image processing part 4730 performs the image processing in accordance with the display formation determined by the display formation determination part 4710 such that the video content reproduced from the received TV broadcast or medium is conformed to the screen of the display part 603 which is tilted by the rotation angle inputted to the rotational position input part 4720.

G. Technology Disclosed in the Description

Technologies disclosed in the description may be configured as follows.

(101) An information processing apparatus including a display part, a user detection part to detect a user present in the surround the display part, and an arithmetic part to process an operated object displayed on the display part in response to that the user detection part detects the user.

(102) The information processing apparatus described in the above (101) in which the user detection part has a proximity sensor provided to in each of four side edge portions a screen of the display part and detects the user present in the vicinity of each side edge.

(103) The information processing apparatus described in the above (101) in which the arithmetic part sets a user occupancy region for each detected user and a common region shared between the users in the screen of the display part depending on a location of the user detected by the user detection part.

(104) The information processing apparatus described in the above (103) in which the arithmetic part displays one or more operated objects as a target to be operated by the user on the screen of the display part.

(105) The information processing apparatus described in the above (104) in which the arithmetic part optimizes the operated object in the user occupancy region.

(106) The information processing apparatus described in the above (104) in which the arithmetic part performs a rotation process such that the operated object in the user occupancy region is changed in an orientation so as to frontally face the user.

(107) The information processing apparatus described in the above (104) in which the arithmetic part performs the rotation process such that the operated object moved from the common region or another user occupancy region to the user occupancy region is changed in an orientation so as to frontally face the user.

(108) The information processing apparatus described in the above (107) in which the arithmetic part controls a rotation direction in performing the rotation process on the operated object when the user drags the operated object to move between the regions depending a position where the user operates with respect to a position of gravity center the operated object.

(109) The information processing apparatus described in the above (103) in which the arithmetic part displays a detection indicator presenting that the user is newly detected when a user occupancy region for a user newly detected by the user detection part is set in the screen of the display part.

(110) The information processing apparatus described in the above (104) further including a data transmission and reception part to transmit and receive data to and from a terminal carried by the user.

(111) The information processing apparatus described in the above (110) in which the data transmission and reception part performs a data transmission and reception process with the terminal carried by the user who is detected by the user detection part and the arithmetic part makes the operated object corresponding to data received from the terminal carried by the user appear in the user occupancy region.

(112) The information processing apparatus described in the above (104) in which the arithmetic part copies or divides the operated object to or into the user occupancy region at a move destination in response to the operated object is moved between the user occupancy regions of the respective users.

(113) The information processing apparatus described in the above (112) in which the arithmetic part displays a copy of an operated object created as another data in the user occupancy region at the move destination.

(114) The information processing apparatus described in the above (112) has the arithmetic part that displays a copy of operated object to be another window for the application capable of being operated in association between the users in a user occupancy region at a move destination.

(115) A information processing method including a user detection step of detecting a user present in the surround, and an arithmetic step of processing an operated object to be displayed in response to detecting the user in the user detection step.

(116) A computer program written in a computer-readable format causing to a computer to function as a display part, a user detection part to detect a user present in the surround the display part, and an arithmetic part to process an operated object displayed on the display part in response to that the user detection part detects the user.

(201) A information processing apparatus including a display part, a user position detection part to detect a user position with respect to the display part, a user state detection part to detect a user state with respect to a display screen of the display part, and an arithmetic part to control a GUI displayed on the display part depending on the user position detected by the user position detection part and the user state detected by the user state detection part.

(202) The information processing apparatus described in the above (201) in which the arithmetic part controls a frame or information density of one or more operated objects as a target to be operated by the user displayed on the display part depending on the user position or the user state.

(203) The information processing apparatus described in the above (201) in which the arithmetic part controls the frame of the operated object displayed on the screen depending on whether or not the user is in a state of viewing the screen of the display part.

(204) The information processing apparatus described in the above (201) in which the arithmetic part controls the information density of the operated object displayed on the screen of the display part depending on the user position.

(205) The information processing apparatus described in the above (201) in which the arithmetic part controls selection of the operated object displayed on the screen of the display part depending on whether or not the user is at a position where personal authentication is enabled.

(206) The information processing apparatus described in the above (201) further including one or more input means for the user to operate the operated object displayed on the screen of the display part, and the arithmetic part controls the frame of the operated object displayed on the screen depending whether or not the user is in a state of operating the operated object by way of the input means.

(207) A information processing apparatus including a display part, one or more input means for a user to operate an operated object displayed on a screen of the display part, a user position detection part to detect a user position with respect to the display part, a user state detection part to detect a user state with respect to a display screen of the display part, an arithmetic part to optimize the input means depending on the user position detected by the user position detection part and the user state detected by the user state detection part.

(208) The information processing apparatus described in the above (207) in which the arithmetic part controls the optimization of the input means depending on whether or not the user is in a state of viewing the screen of the display part.

(209) The information processing apparatus described in the above (207) in which the arithmetic part optimizes the input means in a state where the user is viewing the screen of the display part depending on the user position detected by the user position detection part.

(210) An information processing apparatus including a display part, a user position detection part to detect a user position with respect to the display part, a plurality of distance detection systems to detect a distance to the user from the screen of the display part, an arithmetic part to control switching of the distance detection system depending on the user position detected by the user position detection part.

(211) The information processing apparatus described in the above (210) in which the arithmetic part always turns on a function of the distance detection system to detect a distance to the user in the long distance.

(212) The information processing apparatus described in the above (210) in which the arithmetic part turns on a function of the distance detection system to detect a distance to the user around and function as a recognition process only in a range where a sufficient recognition accuracy is obtained.

(213) An information processing method including a user position detection step of detecting a user position with respect to a display screen, a user state detection step of detecting a user state with respect to the display screen, and an arithmetic step controlling a GUI displayed on the display screen depending on the user position detected in the user position detection step and the user stated detected in the user state detection step.

(214) An information processing method including a user position detection step of detecting a user position with respect to a display screen, a user state detection step of detecting a user state with respect to the display screen, an arithmetic step of optimizing one or more input means for a user to operate an operated object displayed on the display screen depending on the user position detected in the user position detection step and the user stated detected in the user state detection step.

(215) An information processing method including a user position detection step of detecting a user position with respect to a display screen, and an arithmetic step of controlling switching of a plurality of distance detection systems to detect a distance to the user from the display screen depending on the user position detected in the user position detection step.

(216) A computer program written in a computer-readable format causing to a computer to function as a display part, a user position detection part to detect a user position with respect to the display part, a user state detection part to detect a user state with respect to a display screen of the display part, and an arithmetic part to control a GUI displayed on the display part depending on the user position detected by the user position detection part and the user state detected by the user state detection part.

(217) A computer program written in a computer-readable format causing to a computer to function as display part, one or more input means for the user to operate the operated object displayed on the screen of the display part, a user position detection part to detect a user position with respect to the display part, a user state detection part to detect a user state with respect to a display screen of the display part, and an arithmetic part to optimize the input means depending on the user position detected by the user position detection part and the user state detected by the user state detection part.

(218) A computer program written in a computer-readable format causing to a computer to function as a display part, a user position detection part to detect a user position with respect to the display part, a plurality of distance detection systems to detect a distance to the user from the screen of the display part, an arithmetic part to control switching of the distance detection system depending on the user position detected by the user position detection part.

(301) An information processing apparatus including a display part, an object image acquisition part to acquire an image of an object displayed on a screen of the display part, a real size acquisition part to acquire information on a real size of the object displayed on the screen of the display part, and an arithmetic part to process the object image on the basis of the real size of the object acquired by the real size acquisition part.

(302) The information processing apparatus described in the above (301) further including a display performance acquisition part to acquire information on display performance having a screen size and resolution of the display part, and the arithmetic part processes such that the object image is displayed in a real size on the screen of the display part on the basis of the real size of the object acquired by the real size acquisition part and the display performance acquired by the display performance acquisition part.

(303) The information processing apparatus described in the above (301) in which in simultaneously displaying a plurality of object images acquired by the object image acquisition part on the screen of the display part, the arithmetic part processes the plurality of object images such that a correct magnitude relation between the plurality of object images is displayed.

(304) The information processing apparatus described in the above (301) further includes a camera part, and a real size estimation part to estimate the real size of the object included in an image taken by the camera part.

(305) The information processing apparatus described in the above (301) further a camera part, an image recognition part to recognize user's face included in an image taken by the camera part to obtain face data, a distance detection part to detect a distance to the user, and a real size estimation part to estimate a real size of the user's face on the basis of the user face data and the distance to the user.

(306) An information processing method including an object image acquisition step of acquiring an image of an object displayed on a screen, a real size acquisition step of acquiring information on a real size of the object displayed on the screen, and an arithmetic step of processing the object image on the basis of the real size of the object acquired by the real size acquisition step.

(307) A computer program written in a computer-readable format causing to a computer to function as a display performance acquisition part to acquire information on display performance having a screen size and resolution of the display part, and the arithmetic part processes such that the object image is displayed in a real size on the screen of the display part on the basis of the real size of the object acquired by the real size acquisition part and the display performance acquired by the display performance acquisition part.

(401) An information processing apparatus including a camera part, a display part, and an arithmetic part to normalize an image of a user taken by the camera part in displaying on a screen of the display part.

(402) The information processing apparatus described in the above (401) in which an object image acquisition part to acquire an image of an object displayed on a screen of the display part, and a parallel or superimposing pattern acquisition part to acquire a parallel or superimposing pattern for displaying the user image and the object image in parallel or to be superimposed on each other on the screen of the display part, and the arithmetic part optimizes the user image and the object with a correct magnitude relation and position thereof being attained, and displays the user image and the object after optimization in parallel or to be superimposed on each other in accordance with the acquired parallel or superimposing pattern.

(403) The information processing apparatus described in the above (402) in which the arithmetic part controls the camera part for optimizing the user image taken by the camera part.

(404) The information processing apparatus described in the above (401) further including a user face data acquisition part to acquire face data of the user taken by the camera part, and an inner-object face data acquisition part to acquire face data in the object displayed on the screen of the display part, and the arithmetic part optimizes the user face data and the face data in the object with a correct magnitude relation and position thereof being attained.

(405) The information processing apparatus described in the above (404) in which the arithmetic part controls the camera part for normalizing the user image taken by the camera part.

(406) An information processing method including an object image acquisition step of acquiring an object image displayed on a screen, a parallel or superimposing pattern acquisition step of acquiring a parallel or superimposing pattern for displaying the user image and the object image in parallel or to be superimposed on each other on the screen of the display part, an optimization step of optimizing the user image and the object with a correct magnitude relation and position thereof being attained, and an image processing step of displaying the user image and the object after optimization in parallel or to be superimposed on each other in accordance with the acquired parallel or superimposing pattern.

(407) An information processing method including a user face data acquisition step of acquiring face data of a user taken by a camera part, and an inner-object face data acquisition step of acquiring face data in an object displayed on a screen, and an optimization step of optimizing the user face data and the face data in the object with a correct magnitude relation and position thereof being attained.

(408) A computer program written in a computer-readable format causing to a computer to function as a camera part, a display part, an arithmetic part to optimize an image of a user taken by the camera part in displaying on a screen of the display part.

(501) An information processing apparatus including:
a display part to display video content on a screen;
a rotation angle detection part to detect a rotation angle of the screen;
a display formation determination part to determine a display formation of video content at any rotation angle of the screen or during transition of the rotation; and
an image processing part to perform an image processing in accordance with the display formation determined by the display formation determination part such that the video content is conformed to the screen which is tilted by the rotation angle detected by the rotation angle detection part.

(502) The information processing apparatus according to (501), wherein
the display formation determination part determines from a plurality of display formations including three formations of a display formation in which the video content is not out of the screen at all at any rotation angle, a display formation in which a content of interest in the video content becomes maximum at each rotation angle, and a display formation in which the video content is rotated so as not to bring about an invalid region.

(503) The information processing apparatus according to (501), wherein the display formation determination part determines the display formation at any rotation angle of the screen and during transition of the rotation on the basis of attribute information the video content has.

(504) The information processing apparatus according to (501), wherein the display formation determination part determines, with respect to the protected video content, a display formation in which the video content is not out of the screen at all at any rotation angle.

(505) An information processing method including:

a rotation angle detection step of detecting a rotation angle of a screen on which video content is displayed;

a display formation determination step of determining a display formation of video content at any rotation angle of the screen or during transition of the rotation; and an image processing step of performing an image processing in accordance with the display formation determined by the display formation determination step such that the video content is conformed to the screen which is tilted by the rotation angle detected by the rotation angle detection step.

(506) A computer program written in a computer-readable format for causing a computer to function as a display part to display video content on a screen;

a rotation angle detection part to detect a rotation angle of the screen;

a display formation determination part to determine a display formation of video content at any rotation angle of the screen or during transition of the rotation; and an image processing part to perform an image processing in accordance with the display formation determined by the display formation determination part such that the video content is conformed to the screen which is tilted by the rotation angle detected by the rotation angle detection part.

INDUSTRIAL APPLICABILITY

Hereinabove, the technology disclosed in the description is explained with reference to the specific embodiment. However, it is obvious that a modification or substitution of the relevant embodiment may be made by those skilled in the art without departing from the scope of the technology disclosed in the description.

In the description, the explanation is given focusing on an embodiment in which a TV receiver having a large screen is assumed as the information processing apparatus 100 applied with the technology disclosed in the present specification. However, the technology disclosed in the description is not limited thereto. An information processing apparatus other than the TV receiver such as a personal computer or tablet terminal, and an information processing apparatus having a screen size not large can be also similarly applied with the technology disclosed in the description.

In conclusion, the technology disclosed in the description has been described is in a form of an example and the described content of the description should not be construed in a limited way. The claims should be consulted in order to determine the gist of the technology disclosed in the description.

REFERENCE SIGNS LIST

100 . . . Information processing apparatus
110 . . . Input interface unit
120 . . . Arithmetic unit
130 . . . output interface unit
140 . . . Storage unit
150 . . . Communication unit
160 . . . Power unit
170 . . . TV tuner unit
180 . . . Rotation and attachment mechanism
501 . . . Remote control reception part, 502 . . . Signal analyzer
503 . . . Camera part, 504 . . . Image recognition part
505 . . . Microphone part, 506 . . . Audio recognition part
507 . . . Distance sensor, 508 . . . Signal analyzer
509 . . . Touch detector, 510 . . . Signal analyzer
511 . . . proximity sensor, 512 . . . Signal analyzer
513 . . . Very-close-range communication part, 514 . . . Signal analyzer
515 . . . Triaxial sensor part, 516 . . . GPS reception part, 517 . . . Signal analyzer
520 . . . Input interface integration part
601 . . . Content display part, 602 . . . GUI display part
603 . . . Display part, 604 . . . Speaker part
605 . . . Illumination display part, 606 . . . Illumination part
710 . . . Monitor region division part
711 . . . Device database, 712 . . . Region pattern database
720 . . . Object optimum processing part, 721 . . . Optimum processing algorithm
730 . . . Device cooperative data transmission and reception part, 731 . . . transmission and reception process algorithm
2310 . . . Display GUI optimization part, 2320 . . . Input means optimization part
2330 . . . Distance detection system switching part
3210 . . . Real size display part, 3220 . . . Real size estimation part
3230 . . . Real size extension part
4110 . . . Between-images normalization process part, 4120 . . . Face normalization process part
4130 . . . Real size extension part
4710 . . . Display formation determination part, 4720 . . . Rotational position input part
4730 . . . Image processing part

The invention claimed is:

1. An information processing apparatus comprising:
a display screen to display video content; and
an arithmetic unit connected to a memory having a program stored therein, said arithmetic unit upon executing the program being configured to operate as
a rotation angle input part to input a rotation angle of the display screen,
a display formation determination part to determine a display formation of the video content at any rotation angle of the screen or during transition of a rotation from among a plurality of available display formations, and
an image processing part to perform an image processing in accordance with the display formation determined by the display formation determination part such that the video content is conformed to the screen which is tilted by the rotation,
in which the arithmetic unit is configured to determine whether the video content is protected by copyright and the display formation determination part is configured to utilize a determination result therefrom in determining the display formation of the video content.

2. The information processing apparatus according to claim 1, wherein the plurality of available display formations include (i) a display formation in which the video content is not out of the screen at all at any rotation angle, (ii) a display formation in which a content of interest in the video content becomes maximum at each rotation angle, and (iii) a display formation in which the video content is rotated so as not to bring about an invalid region.

3. The information processing apparatus according to claim 1, wherein the arithmetic unit is configured to obtain attribute information of the video content before determining whether the video content is protected by copyright.

4. The information processing apparatus according to claim 2, wherein the display formation determination part is configured to determine the display formation to be the display formation in which the video content is not out of the screen at all at any rotation angle when the arithmetic unit determines the video content is protected by copyright.

5. An information processing method for use with an information processing apparatus having a display screen, said method comprising:
   inputting a rotation angle of the display screen having video content displayed thereon;
   determining whether the video content is protected by copyright;
   determining a display formation of the video content at any rotation angle of the screen or during transition of a rotation from among a plurality of available display formations by utilizing a determination result as to whether the video content is protected by copyright; and
   performing an image processing in accordance with the determined display formation such that the video content is conformed to the screen which is tilted by the rotation.

6. A non-transitory computer readable storage medium having stored thereon a computer program which when executed causes a computer to function as
   an arithmetic unit having:
      a rotation angle input part to input a rotation angle of a display screen having video content displayed thereon,
      a display formation determination part to determine a display formation of the video content at any rotation angle of the screen or during transition of a rotation from among a plurality of available display formations, and
      an image processing part to perform an image processing in accordance with the display formation determined by the display formation determination part such that the video content is conformed to the screen which is tilted by the rotation,
   in which in functioning as the arithmetic unit the computer determines whether the video content is protected by copyright and utilizes a determination result therefrom for the display formation determination part in determining the display formation of the video content.

* * * * *